United States Patent [19]
Miyazaki

[11] Patent Number: 5,347,479
[45] Date of Patent: Sep. 13, 1994

[54] SMALL-SIZE WAVELET TRANSFORM APPARATUS

[75] Inventor: Takashi Miyazaki, Tokyo, Japan

[73] Assignee: NEC Corporation, Tokyo, Japan

[21] Appl. No.: 995,059

[22] Filed: Dec. 22, 1992

[30] Foreign Application Priority Data

Dec. 27, 1991 [JP] Japan ................................. 3-345885
Dec. 27, 1991 [JP] Japan ................................. 3-345887

[51] Int. Cl.$^5$ ............................................... G06F 7/38
[52] U.S. Cl. ........................................................ 364/725
[58] Field of Search ............... 364/723, 724.1, 724.01, 364/724.13, 724.05, 725, 728.01, 727

[56] References Cited

U.S. PATENT DOCUMENTS

| | | | |
|---|---|---|---|
| 4,766,561 | 8/1988 | Thompson et al. | 364/724.13 |
| 4,974,187 | 11/1990 | Lawton | 364/728.01 |
| 5,051,991 | 9/1991 | Szczutkowski | 370/108 |

OTHER PUBLICATIONS

Cody, "The Fast Wavelet Transform", Dr. Dobb's Journall, Apr. 1992, pp. 16–18, 20, 24, 26, 28.
CCITT SGXV Working Party XV/1 Specialists Group on Coding for Visual Telephony, "Draft Revision of Recommendation H.261", Tokyo, Nov. 7-10, 1989.
M. Ohta et al., "Wavelet Picture Coding with Transform Coding Approach", IEICE Trans. Fundamentals, vol. E75-A, No. 7, Jul. 1992, pp. 776–785.

Primary Examiner—Jerry Smith
Assistant Examiner—Chuong D. Ngo
Attorney, Agent, or Firm—Foley & Lardner

[57] ABSTRACT

In a wavelet transform apparatus including a plurality of series of delay units and at least one convolution calculating circuit to form a two-band analysis filter circuit, the two-band analysis filter circuit, i.e., the convolution calculating circuit is operated in multiplicity.

51 Claims, 33 Drawing Sheets

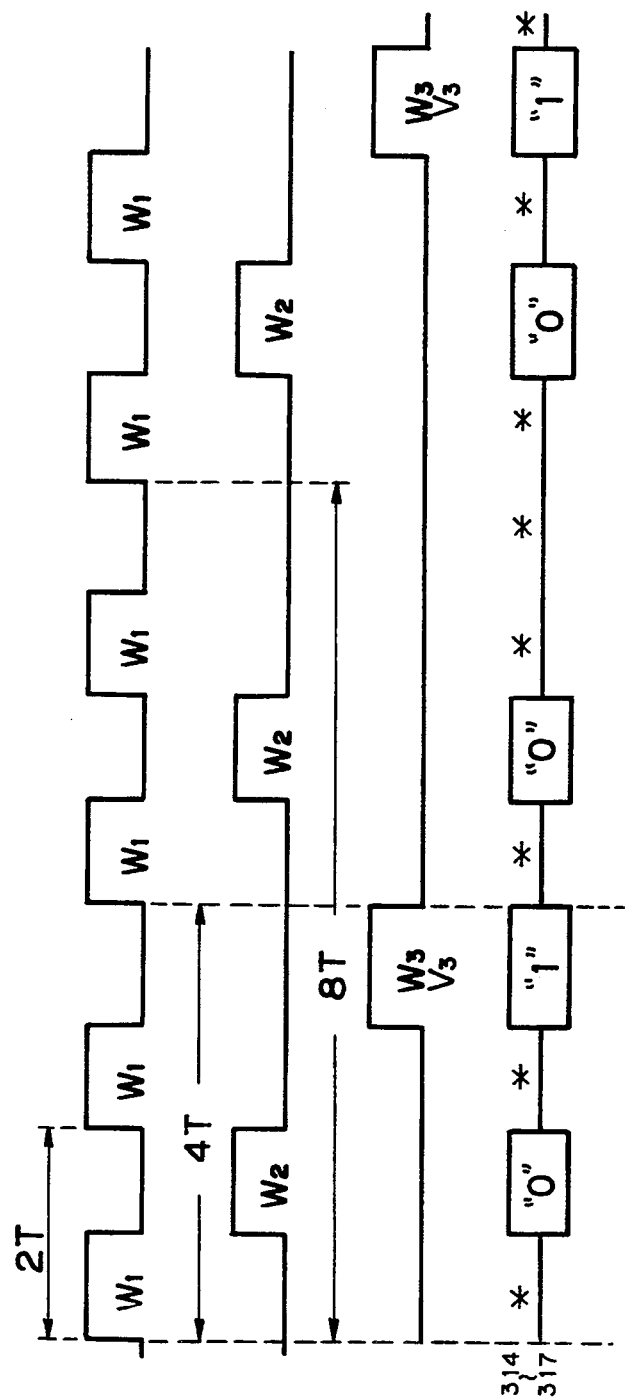

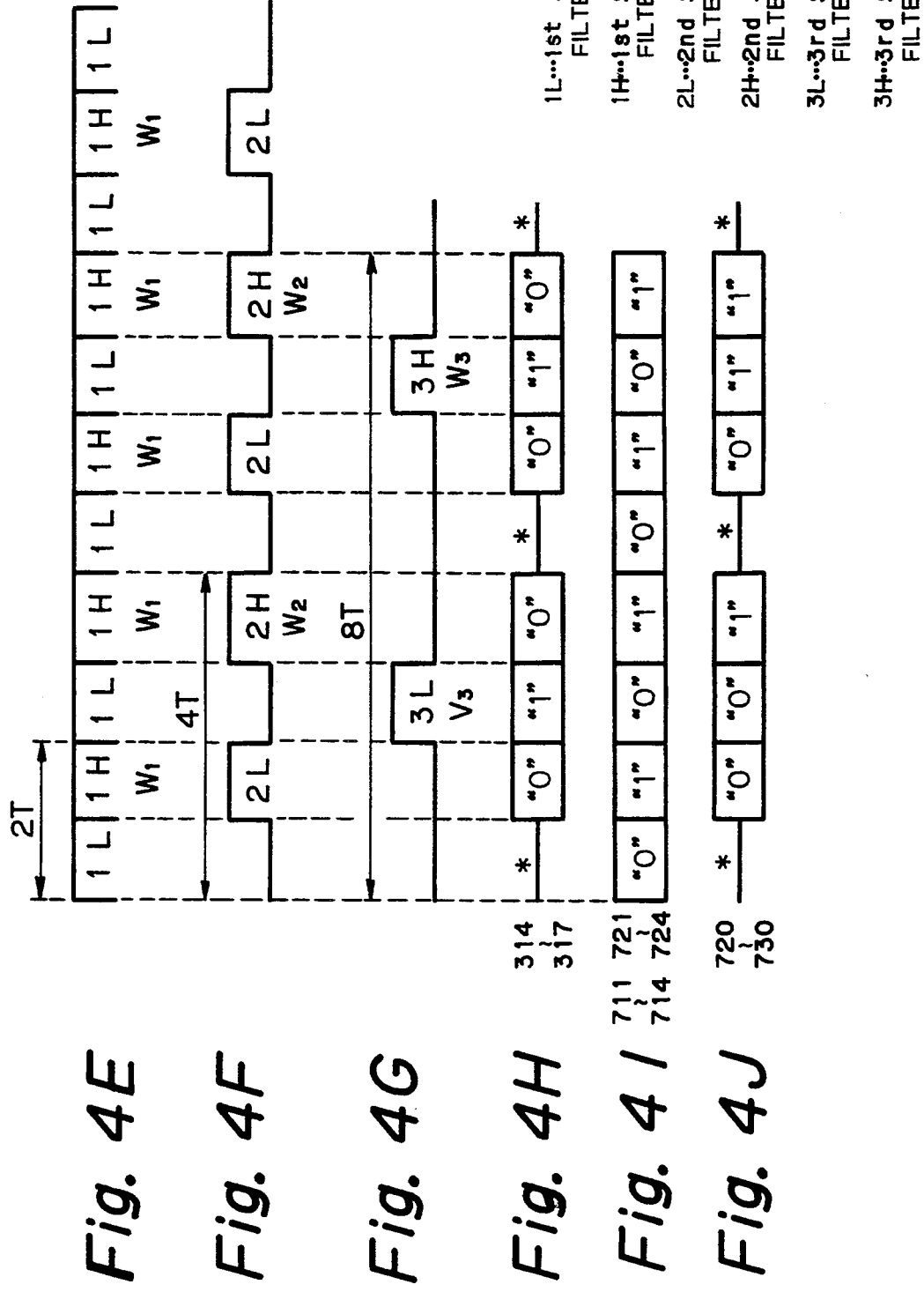

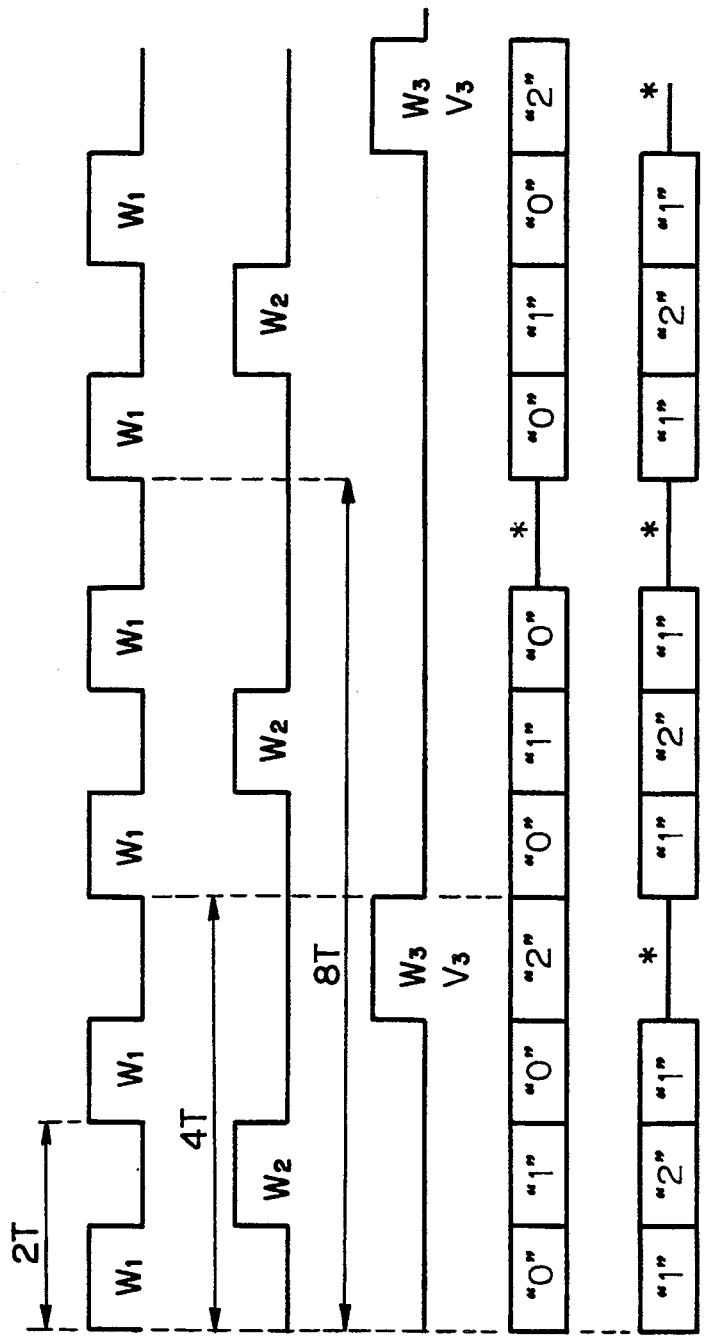

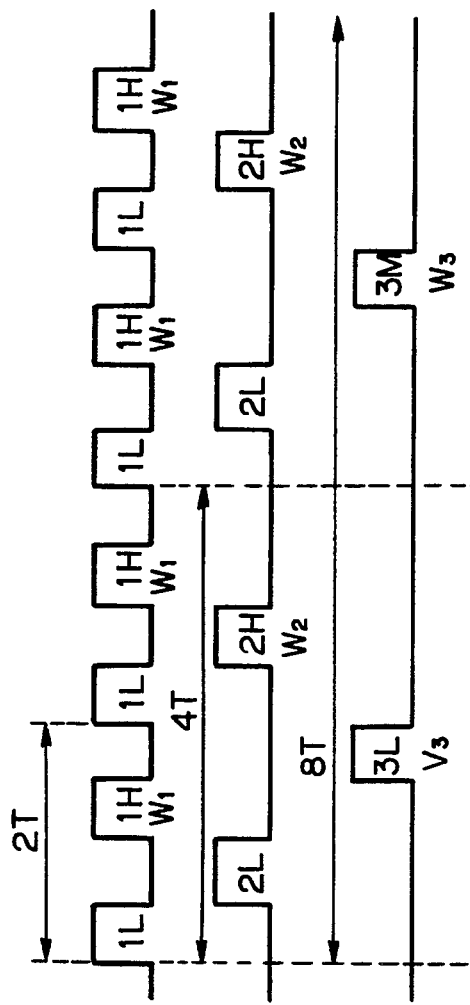

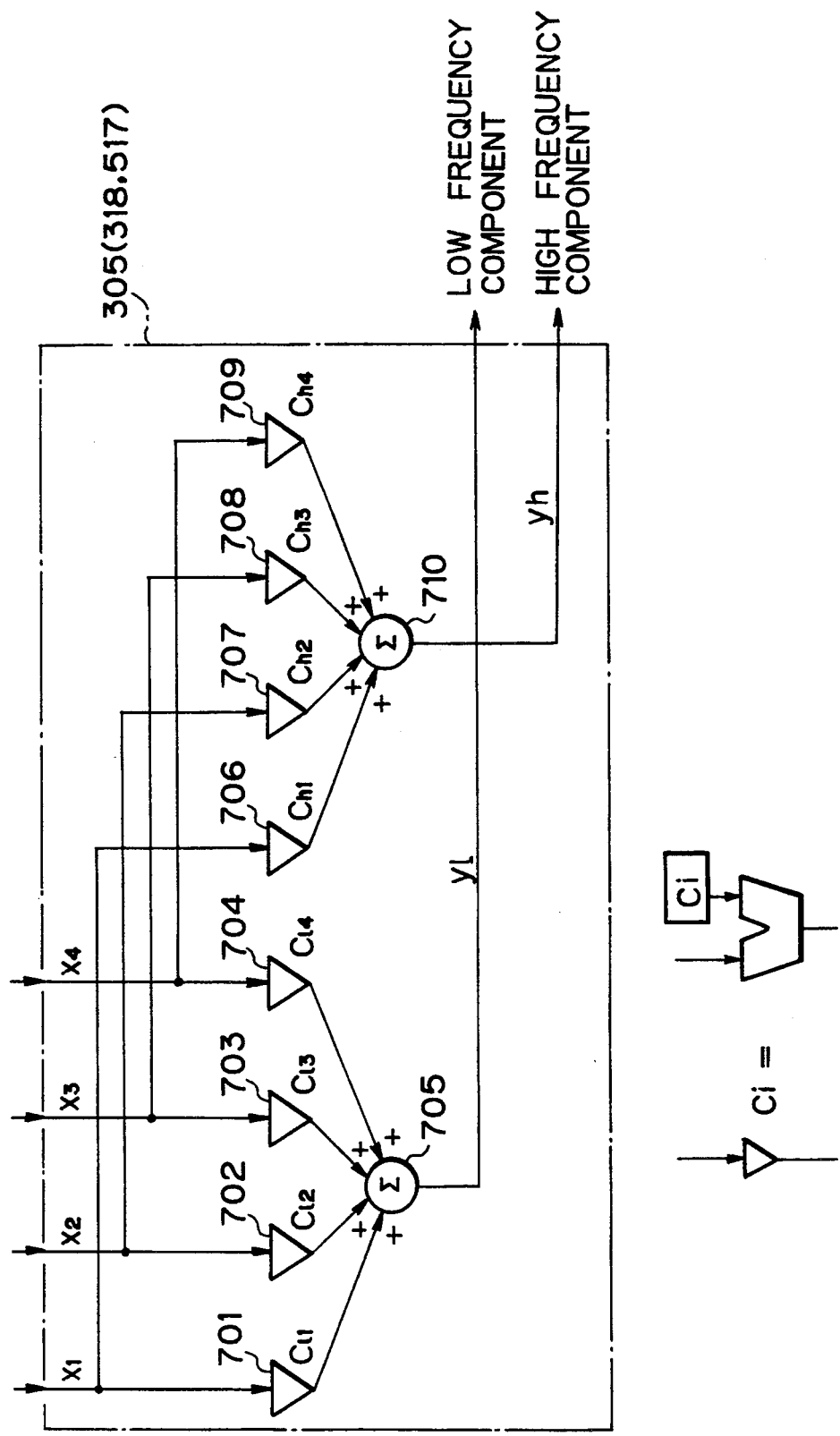

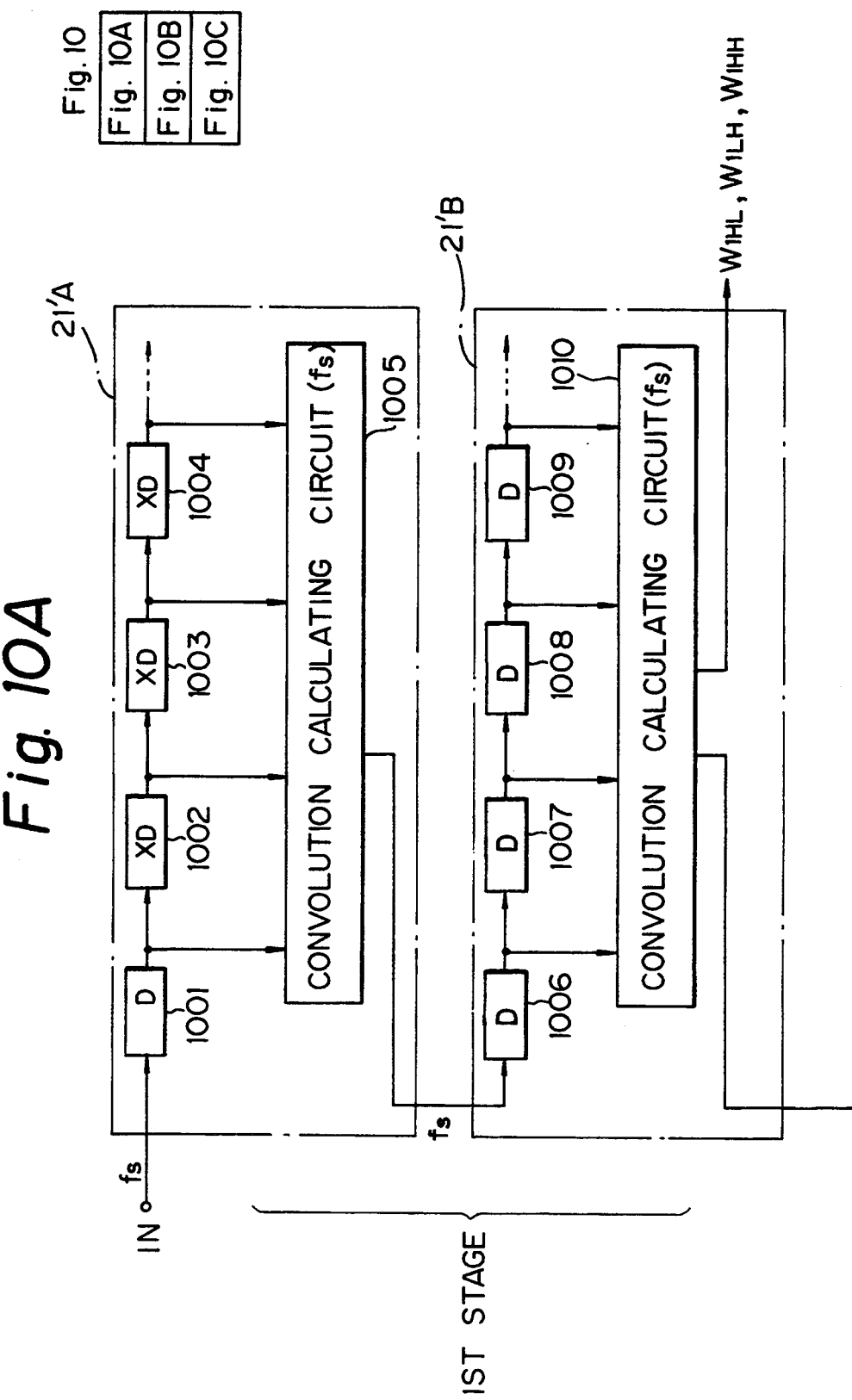

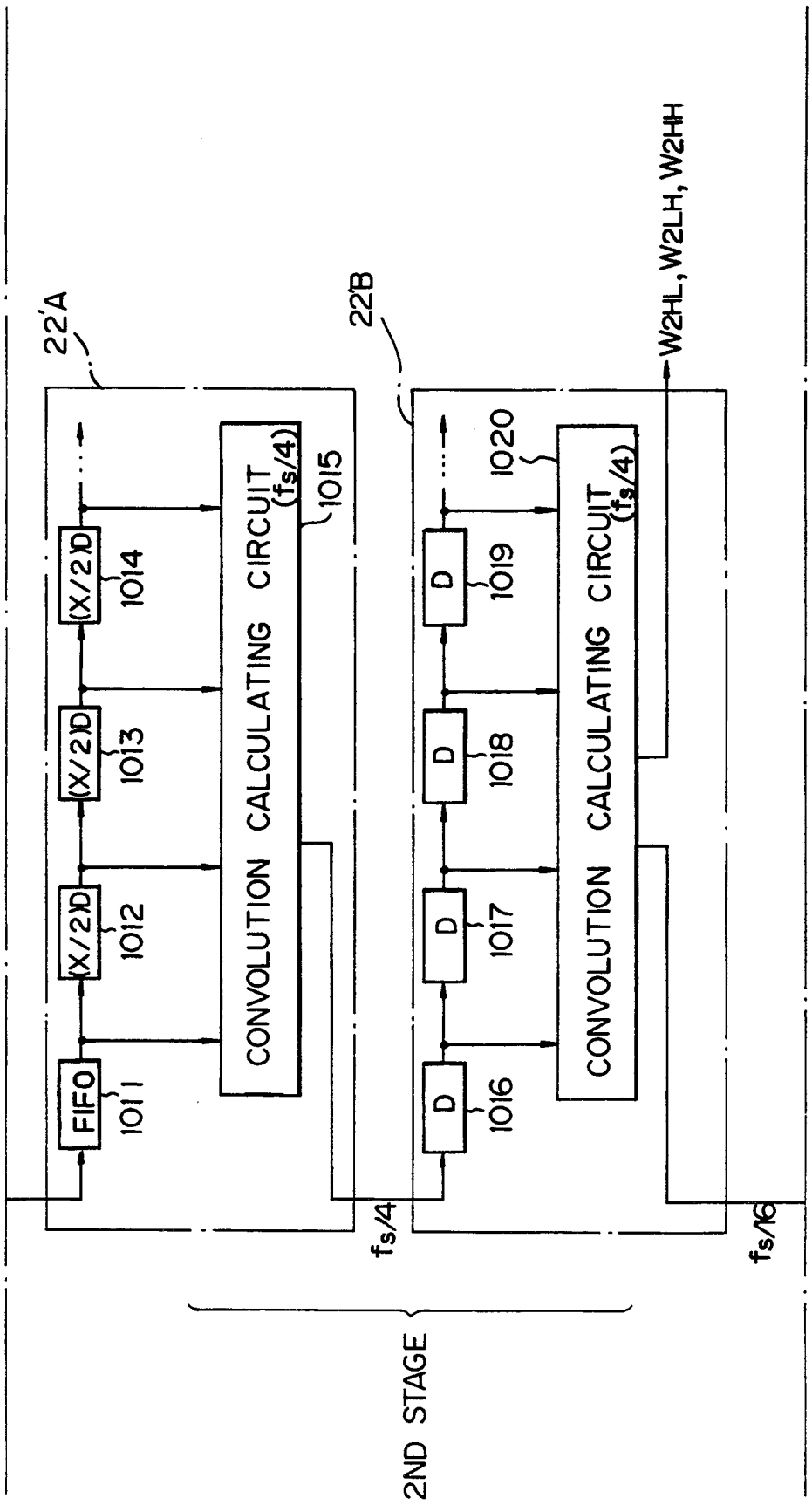

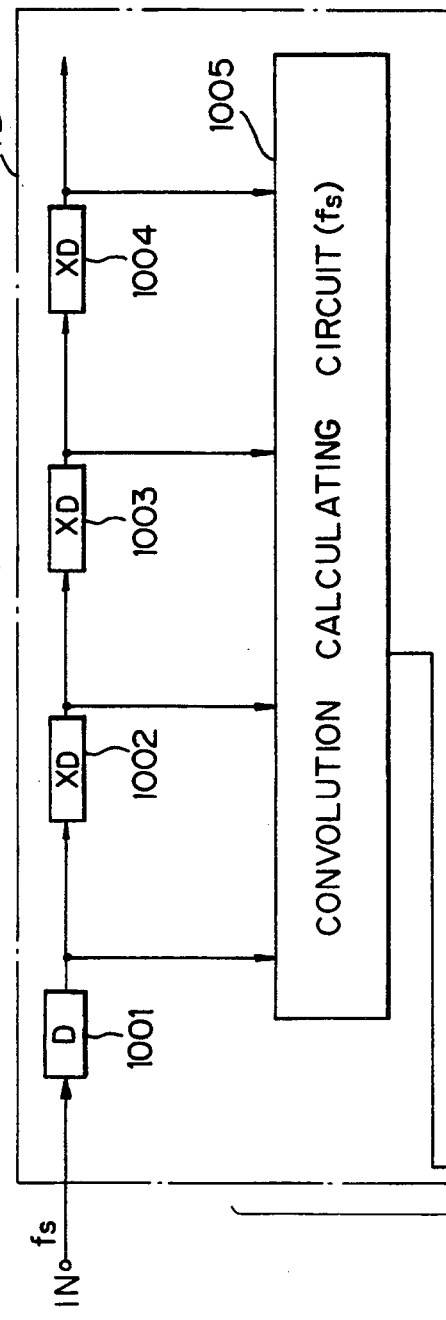
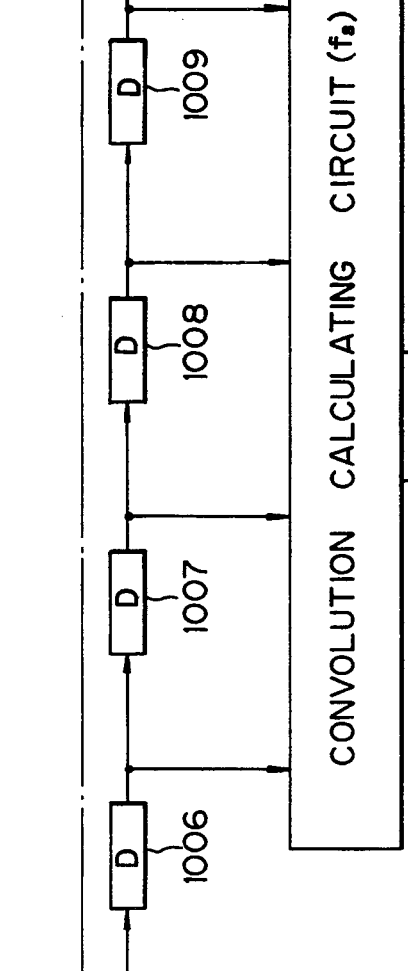
Fig. 14A

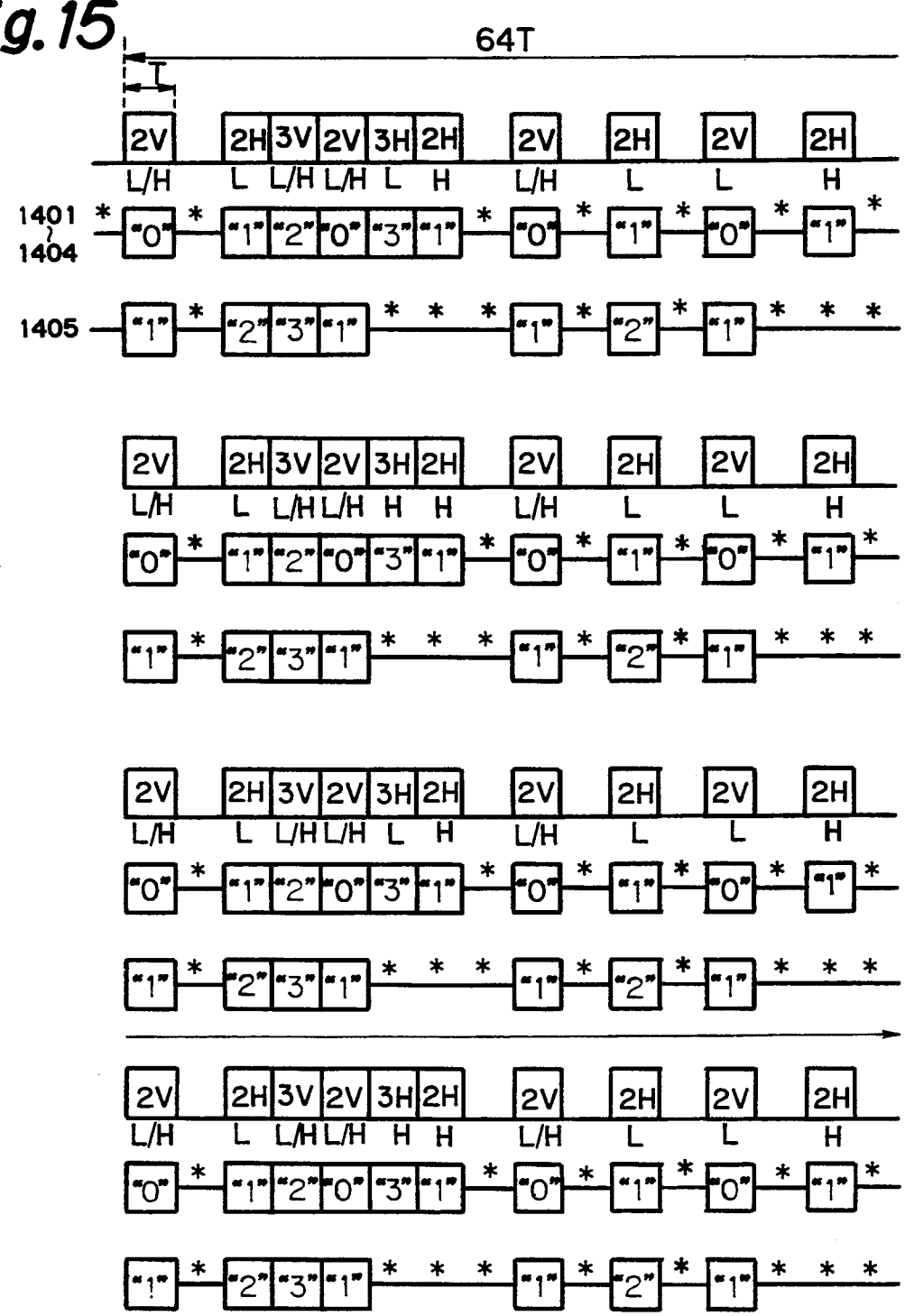

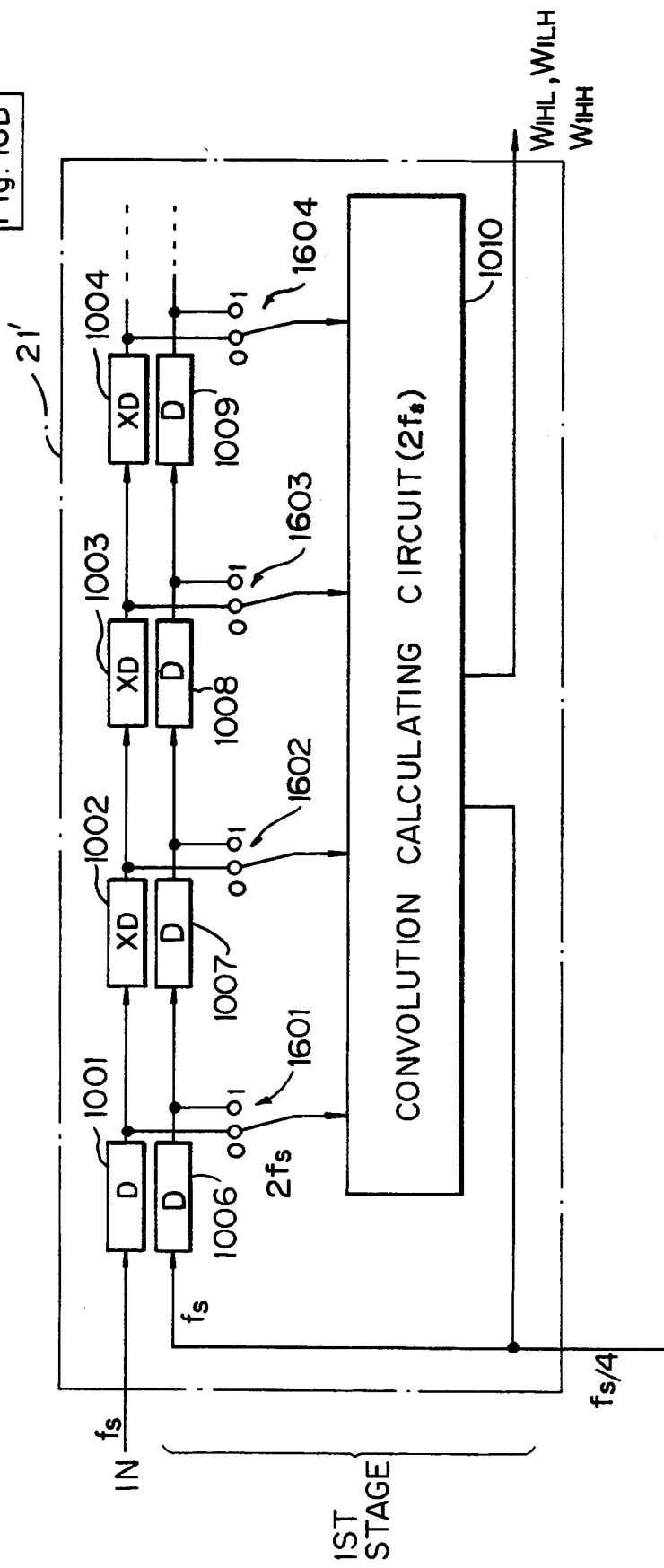

SMALL-SIZE WAVELET TRANSFORM APPARATUS

BACKGROUND OF THE INVENTION

1. Field of the Invention

The present invention relates to a coder for an audio signal, a video signal, and the like, and more particularly, to a wavelet transform apparatus for a wavelet coding.

2. Description of the Related Art

Generally, discrete cosine transform (DCT) coding is well known as transform coding, however, this coding has two serious drawbacks, i.e., a blocking effect and a mosquito noise (or corona effect). That is, the blocking effect is mainly derived from the quantization errors in lower frequency coefficients, and the mosquito noise is mainly derived from the quantization errors in higher frequency coefficients. To overcome these two drawbacks, wavelet coding has been developed (see: M. Ohta et al, "Wavelet Picture Coding with Transform Coding Approach", IEICE TRANS. FUNDAMENTALS, Vol. E75-A, No. 7, July 1992).

A prior art wavelet transform apparatus for a one-dimensional signal such as a audio signal includes a plurality of stages of two-band analysis filter circuits, each for performing a two-band analysis filter operation upon a signal to generate a high frequency component signal and a low frequency component signal. In order to carry out such an operation, each of the two-band analysis filter circuits includes a highpass downsampling filter (HPF) and a lowpass downsampling filter (LPF), each having a series of delay units and a convolution calculating circuit. That is, if the number of stages is n, the number of convolution calculating circuits is 2n. This will be explained in detail later.

Similarly, a prior art wavelet transform apparatus for a two-dimensional signal such as a video signal includes a plurality of stages of four-band analysis filter circuits, each for performing a vertical two-band analysis filter operation upon a signal to generate a vertical high frequency component signal and a vertical low frequency component signal, performing a horizontal two-band analysis filter operation upon the vertical high frequency component signal to generate a horizontal high vertical high frequency component signal and a horizontal low vertical high frequency component signal, and performing a horizontal tow-band analysis filter operation upon the vertical low frequency component signal to generate a horizontal high vertical low frequency component signal and a horizontal low vertical low frequency component signal. In order to carry out such operations, each of the four-band analysis filter circuits includes a vertical two-split subband filter formed by a vertical highpass filter (VHPF) and a vertical lowpass filter (VLPF), a horizontal two-split subband filter formed by a horizontal highpass filter (HHPF) and a horizontal lowpass filter (HLPF), and another horizontal two-split subband filter formed by a horizontal highpass filter (HHPF) and a horizontal lowpass filter (HLPF). Also, in this case, each of the filters has a series of delay units and a convolution calculating circuit. That is, if the number of stages is n, the number of convolution calculating circuits is 6n. This will be explained in detail later.

However, the above-mentioned prior art wavelet transform apparatus is large in size, due to the large number of filters (i.e., convolution calculating circuits). Particularly, the large number of multipliers included in the convolution calculating circuits increases the size of the wavelet transform apparatus.

SUMMARY OF THE INVENTION

It is an object of the present invention to provide a small-size wavelet transform apparatus.

According to the present invention, two-band analysis filter circuits, i.e., convolution circuits are operated in multiplicity, thus reducing the number of two-split subband filters, i.e., the number of convolution calculating circuits. Therefore, according to the present invention, one two-band analysis filter circuit carries out a plurality of two-band analysis filter operations to reduce the number of the two-band analysis filter circuits, (filters), i.e., the number of convolution calculating circuits.

BRIEF DESCRIPTION OF THE DRAWINGS

The present invention will be more clearly understood from the description as set forth below, compared with the prior art, with reference to the accompanying drawings, wherein:

FIGS. 4A through 4J are timing diagrams for explaining the operation of the circuit of FIG. 3;

FIG. 6A through 6L are timing diagrams for explaining the operation of the circuit of FIG. 5;

FIGS. 7A, 7B, and 7C are circuit diagrams of the convolution calculating circuit of FIGS. 3 and 5;

FIG. 9 is a block diagram illustrating a combination of FIGS. 9A and 9B;

FIG. 10 is a block diagram illustrating a combination of FIGS. 10A, 10B and 10C;

FIGS. 10A, 10B and 10C are a block diagram illustrating a third embodiment of the wavelet transform apparatus according to the present invention;

FIGS. 11A through 11F are timing diagrams for explaining the operation of the circuit of FIG. 10;

FIG. 14 is a block diagram illustrating a combination of FIGS. 14A and 14B;

FIGS. 14A and 14B are a block diagram illustrating a fourth embodiment of the wavelet transform apparatus according to the present invention;

FIG. 15 is a timing diagram for explaining the operation of the circuit of FIG. 14;

FIG. 16 is a block diagram illustrating a combination of FIGS. 16A and 16B;

FIGS. 16A and 16B are a block diagram illustrating a fifth embodiment the wavelet transform apparatus according the present invention;

DESCRIPTION OF THE PREFERRED EMBODIMENTS

First, a prior art one-dimensional wavelet transform apparatus for a one-dimensional signal such as a audio signal will be explained with reference to FIGS. 1 and 2.

Figure 1:
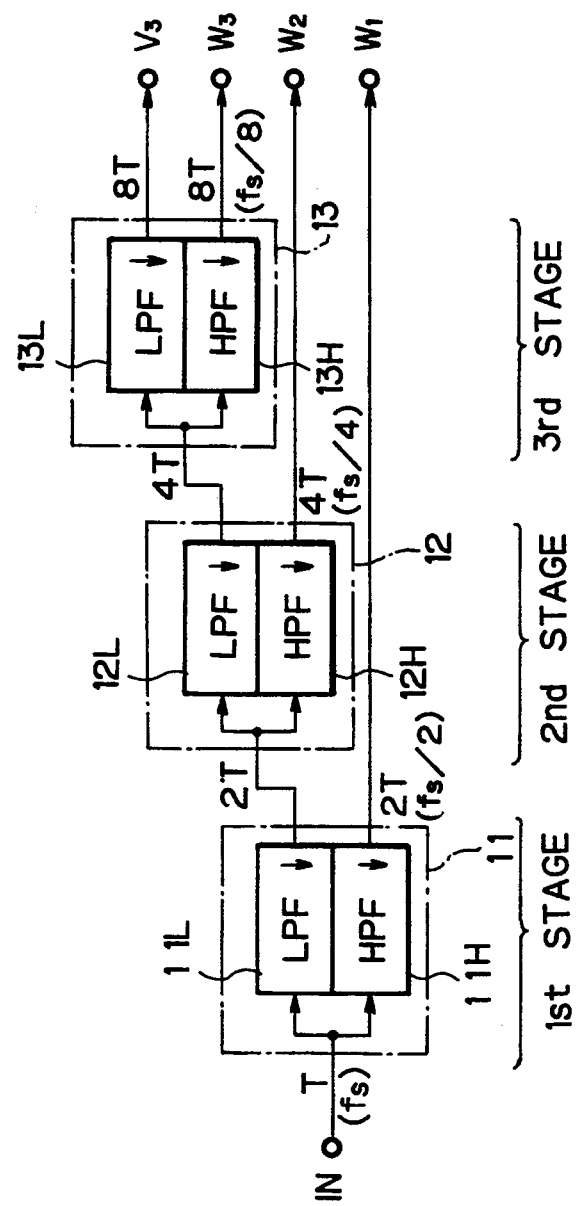
FIG. 1 is a block diagram illustrating a prior art one-dimensional wavelet transform apparatus.

In FIG. 1, the frequency band space of a one-dimensional input signal IN of a plurality of bits, is divided by three stages of two-band analysis filter circuits 11, 12 and 13 into four frequency band spaces $W_1$, $W_2$, $W_3$ and $V_3$. That is, the resolution level is 3. The two-band analysis filter circuit 11 receives the input signal IN at a clock period T and splits it into a high frequency component $W_1$ and a low frequency component. In this case, in the two-band analysis filter circuit 11, a highpass filter 11H including a downsampler generates the high frequency component $W_1$ at a clock period 2T, and a lowpass filter ill including a downsampler generates the low frequency component at the clock period 2T. Also, the is two-band analysis filter circuit 12 receives the low frequency component from the lowpass filter 11L at the clock period 2T and splits it into a high frequency component $W_2$ and a low frequency component. In this case, in the two-band analysis filter circuit 12, a highpass filter 12H including a downsampler generates the high frequency component $W_2$ at a clock period 4T, and a lowpass filter 12L including a downsampler generates the low frequency component at the clock period 4T. Further, the two-band analysis filter circuit 13 receives the low frequency component from the lowpass filter 12L at the clock period 4T and splits it into a high frequency component $W_3$ and a low frequency component $V_3$. In this case, in the two-band analysis filter circuit 13, a highpass filter 13H including a downsampler generates the high frequency component $W_3$ at a clock period 8T, and a lowpass filter 13L including a downsampler generates the low frequency component $V_3$ at the clock period 8T.

For example, the two-band analysis filter circuit 11 (12, 13) is formed by two finite impulse response (FIR) filters serving as the highpass filter and the lowpass filter which, in this case, include downsamplers. That is, the lowpass filter 11L (12L, 13L) includes a series of delay units 201 to 204 clocked at a clock period T (2T, 4T), and a convolution calculating circuit 205 formed by multipliers 2051 to 2054 having lowpass filter coefficients $C_{l1}$, $C_{l2}$, $C_{l3}$ and $C_{l4}$, an adder 2055, and a downsampler 2056. Similarly, the highpass filter 11H (12H, 13H) includes a series of delay units 206 to 209 clocked at the clock period T (2T, 4T), and a convolution calculating circuit 210 formed by multipliers 2101 to 2104 having highpass filter coefficients $C_{h1}$, $C_{h2}$, $C_{h3}$ and $C_{h4}$, an adder 2105, and a downsampler 2106.

Figure 2:
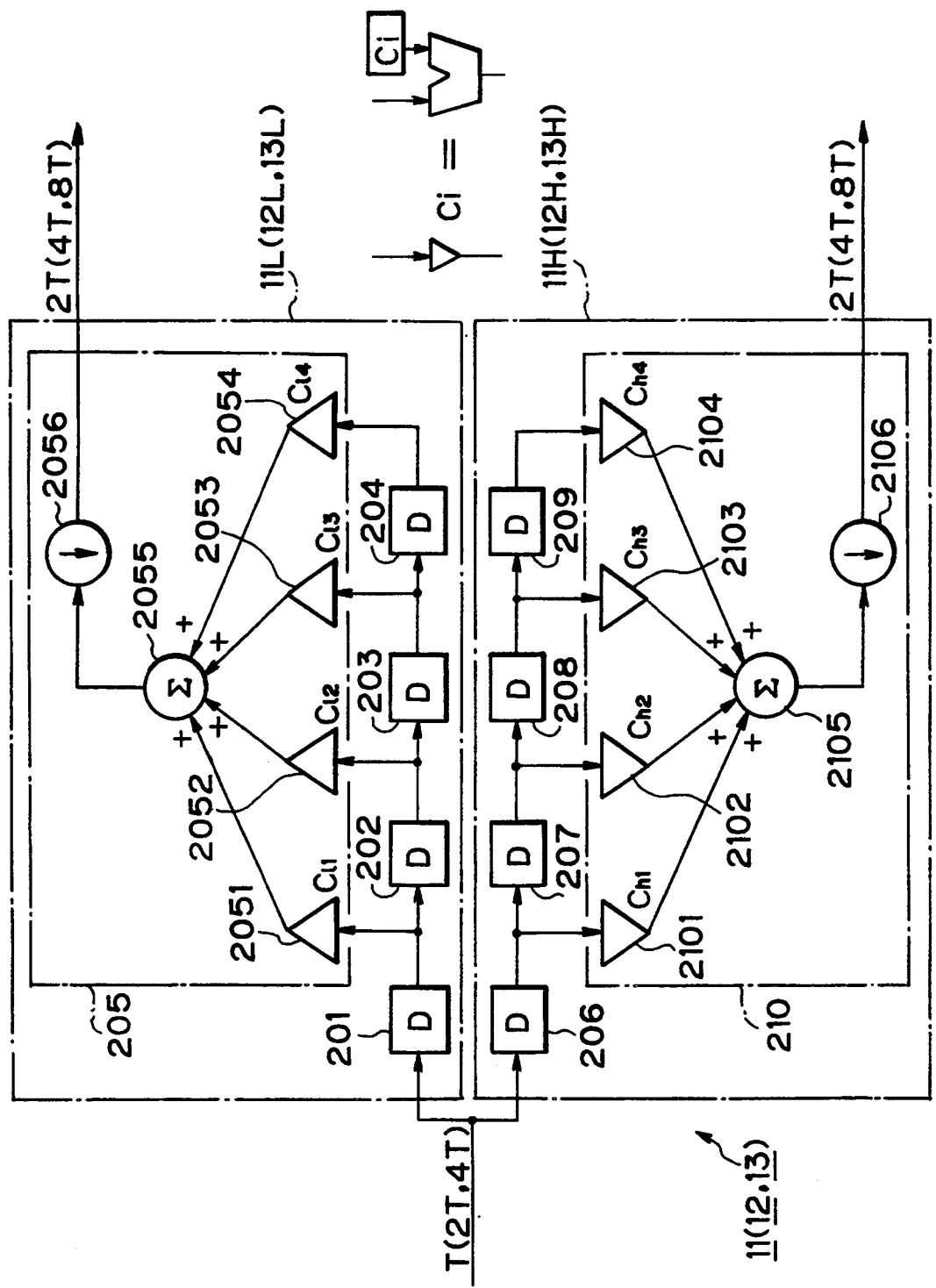
FIG. 2 is a detailed circuit diagram of the two-band analysis filter circuit of FIG. 1.

In the one-dimensional wavelet transform apparatus of FIGS. 1 and 2, however, the number of filters, i.e., the number of convolution calculating circuits, which is, in this case, 6, is large. Particularly, since each multiplier has a large size, the increased number of convolution calculating circuits increases the wavelet transform apparatus in size.

The inventor recognized the fact that, if a filter module operated at the frequency $f_s$ ($=1/T$) which is a sampling frequency of the input signal IN is incorporated into each of the filters 11L, 11H, 12L, 12H, 13L and 13H, such a filter module overfunctions. That is, every other data calculated by each of the filters is decimated by each downsampler incorporated therein. Therefore, in the first stage two-band analysis filter circuit 11, although the filter 11L (11H) without its downsampler is operated at the frequency $f_s$, the entire filter 11L (11H) with its downsampler is operated at a frequency $f_s/2$. In view of this, the inventor found the first stage, i.e., the lowpass filter 11L and the highpass filter 11H can be formed by only one filter module operated at the frequency $f_s$ ($=f_s/2+f_s/2$). Also, the two-band analysis filter circuit 12 operates at a half clock rate as the two-band analysis filter circuit 11, and the two-band analysis filter circuit 13 operates at a half clock rate as the two-band analysis filter circuit 12, and as a result, tile two-band analysis filter circuits 12 and 13 are often freed from operation. In other words, the efficiency of the post stages is low. That is, if each of the filters 12L, 12H, 13L and 13H is formed by a filter module operated at the frequency $f_s$, such a filter module further overfunctions. If each of the filters 12L and 12H without downsamplers can operate at a frequency $f_s/4$, the entire of the second stage is operated at a frequency $f_s/2$ ($=f_s/4\times2$). Also, if each of the filters 13L and 13H without downsamplers can operate at a frequency $f_s/8$, the entire of the third stage is operated at a frequency $f_s/4$ ($=f_s/8\times2$). Generally, the entire of the (N-th stage IN=2, 3, . . . ) is operated at a frequency $f_s/2^N$. In this case, $$f_s/2 \text{ (2nd stage)} + f_s/4 \text{ (3rd stage)} \ldots + f_s/2^N \text{ (N-th stage)} < f_s$$

Therefore, the entire of the second to N-th stages can be formed by only one filter module operated at the frequency $f_s$. In other words, the entire one-dimensional wavelet transform apparatus of FIG. 1 can be formed by two filter modules operated at the frequency $f_s$, which is explained below.

Figure 3:
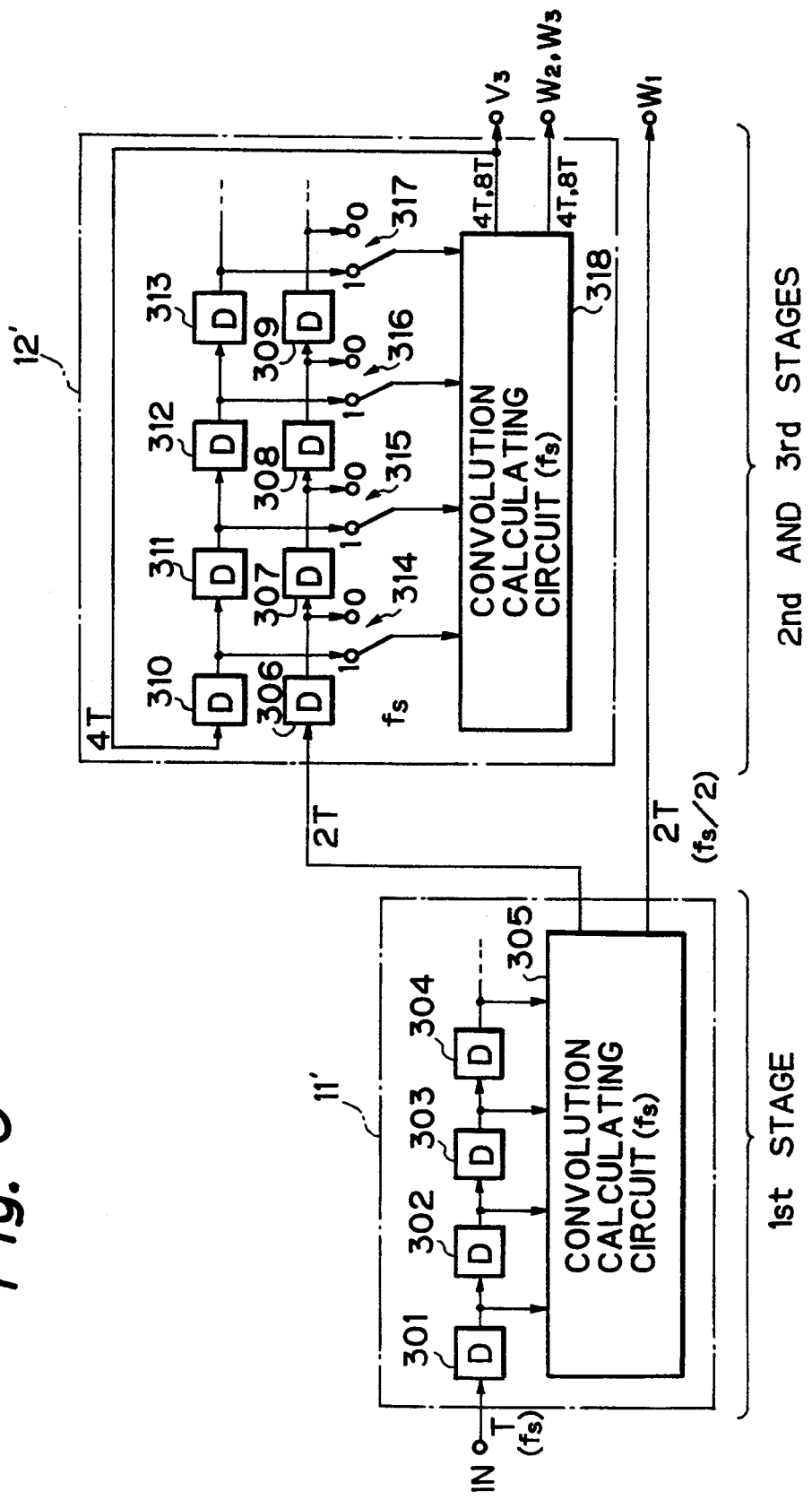
FIG. 3 is a block diagram illustrating a first embodiment of the wavelet transform apparatus according to the present invention.

In FIG. 3, which illustrates a first embodiment of the present invention, three stages of two-band analysis filter operations are carried out to divide the frequency band space of the input signal IN into four frequency band spaces $W_1$, $W_2$, $W_3$ and $V_3$, in the same way as in FIG. 1, however, only two two-band analysis filter circuits 11' and 12' each of which has a convolution calculating circuit (filter) operated at the frequency $f_s$ are provided. The two-band analysis filter circuit 11' includes delay units 301 to 304 each having a size of 1, i.e., having a capacity of storing one element, and a convolution calculating circuit 305, thereby carrying out a first-stage two-band analysis filter operation. That is, the input signal IN is input to the series of delay units 301 to 304 in synchronization with the clock period T, and the outputs of the delay units 301 to 304 are supplied in parallel to the convolution calculation circuit 305. As a result, the convolution calculating circuit 305 performs a convolution upon the outputs of the delay units 301 to 304 to generate a high frequency component signal $W_1$ and a low frequency component signal simultaneously in synchronization with a clock period 2T as shown in FIG. 4A, or alternately in synchronization with the clock period 2T as shown in FIG. 4E.

The two-band analysis filter circuit 12' includes delay units 306 to 309 each having a size of 1, i.e., having a capacity of storing one element, delay units 310 to 313 each having a size of 1, i.e., having a capacity of storing one element, selectors 314 to 317, and a convolution calculating circuit 318, thereby carrying out second and third-stage two-band analysis filter operations. That is, the low frequency component signal of the two-band analysis filter circuit 11' is input to the series of delay units 306 to 309 in synchronization with the clock period 2T, and the outputs of the delay units 306 to 309 are supplied in parallel via the positions "0" of the selectors 314 to 317 to the convolution calculation circuit 318. As a result, the convolution calculating circuit 318 performs a convolution upon the outputs of the delay units 306 to 309 to generate a high frequency component signal $W_2$ and a low frequency component signal simultaneously in synchronization with a clock period 4T as shown in FIG. 4B, or alternately in synchronization with the clock period 4T as shown in FIG. 4F. Also, this low frequency component signal is input to the series of delay units 310 to 313 in synchronization with the clock period 4T, and the outputs of the delay units 310 to 313 are supplied in parallel via the positions 1 of the selectors 314 to 317 to the convolution calculation circuit 318. As a result, the convolution calculating circuit 318 performs a convolution upon the outputs of the delay units 310 to 313 to generate a high frequency component signal $W_3$ and a low frequency component signal $V_3$ simultaneously in synchronization with a clock period 8T as shown in FIG. 4C, or alternately in synchronization with the clock period 8T as shown in FIG. 4G. In this case, the position sequence of the selectors 314 to 317 is *, "0", *, "1", *, "0", * and * within the period 8T, where * designates a non-selected state, as shown in FIG. 4D, or *, "0" "1" and "0" within the period 4T as shown in FIG. 4H.

Also, if the entire of the N-th stage (N=1, 2, ...) is operated at a frequency $f_s/2^N$, $f_s$ (1st stage) + $f_s/2$ (2nd stage) + $f_s/4$ (3rd stage) ... +

$f_s/2^N$ (N-th stage) < $2f_s$

Therefore, the entire of the first to N-th stages can be formed by only filter module operated at the frequency $2f_s$. In other words, the entire one-dimensional wavelet transform apparatus of FIG. 1 can be formed by only one filter module operated at the frequency $2f_s$, which is explained below.

Figure 5:
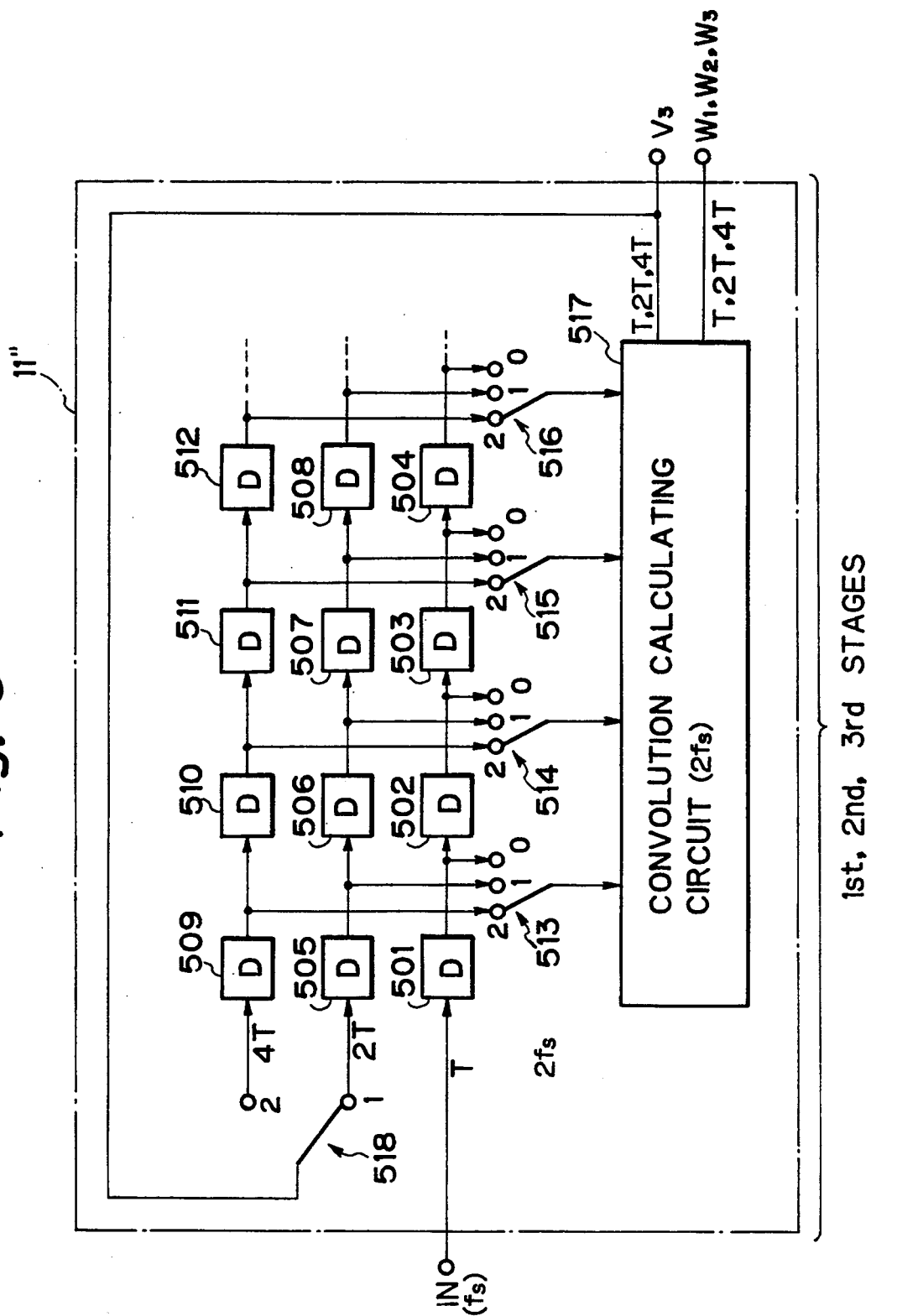
FIG. 5 is a block diagram illustrating a second embodiment of the wavelet transform apparatus according to the present invention.

In FIG. 5, which illustrates a second embodiment of the present invention, three stages of two-band analysis filter operations are carried out to divide the frequency band space of the input signal. IN into four frequency band spaces $W_1$, $W_2$, $W_3$ and $V_3$, in the same way as in FIG. 1, however, only one two-band analysis filter circuit 11" which has a convolution calculating circuit (filter) operated at the frequency $2f_s$ is provided. The two-band analysis filter circuit 11" includes delay units 501 to 504 each having a size of 1, i.e., having a capacity of storing one element, delay units 505 to 508 each having a size of 1, i.e., having a capacity of storing one element, delay units 509 to 512 each having a size of 1, i.e., having a capacity of storing one element, selectors 513 to 516, a convolution calculating circuit 517 operated at the frequency $2f_s$ (=2/T), and a selector 518, thereby carrying out first, second and third-stage two-band analysis filter operations. That is, the input signal IN is input to the series of delay units 501 to 504 in synchronization with the clock period T, and the outputs of the delay units 501 to 504 are supplied in parallel via the positions 0 of the selectors 513 to 516 to the convolution calculation circuit 517. As a result, the convolution calculating circuit 517 performs a convolution upon the outputs of the delay units 501 to 504 to generate a high frequency component signal $W_2$ and a low frequency component signal simultaneously in synchronization with a clock period 2T as shown in FIG. 6A or alternately in synchronization with the clock period 2T as shown in FIG. 6F. Also, this low frequency component signal is input to the series of delay units 505 to 508 in synchronization with the clock period 2T, and the outputs of the delay units 505 to 508 are supplied in parallel via the positions 1 of the selectors 513 to 516 to the convolution calculation circuit 517. Also, in this case, the position of the selector 516 is "1". As a result, the convolution calculating circuit 517 performs a convolution upon the outputs of the delay units 505 to 508 to generate a high frequency component signal $W_2$ and a low frequency component signal simultaneously in synchronization with a clock period 4T as shown in FIG. 6B or alternately in synchronization with the clock period 4T as shown in FIG. 6G. Also, this low frequency component signal is input to the series of delay units 509 to 512 in synchronization with the chock period 4T, and the outputs of the delay units 509 to 512 are supplied in parallel via the positions "1" of the selectors 513 to 516 to the convolution calculation circuit 517. Also, in this case, the position of the selector 518 is "2". As a result, the convolution calculating circuit 517 performs a convolution upon the outputs of the delay units 509 to 512 to generate a high frequency component signal $W_3$ and a low frequency component signal $V_3$ simultaneously in synchronization with the clock period 8T as shown in FIG. 6C or alternately in synchronization with the clock period 8T as shown in FIG. 6H. In other words, the position sequence of the selectors 513 to 516 is "0", "1", "0", "2", "0", "1", "0" and * within the period 8T, as shown in FIG. 6D or "0", "1", "0", "2", "0", "1", "0" and * within the period 4T, as shown in FIG. 6I. Also, the position sequence of the selector 518 is *, "1", *, "2", *, "1", * and * within the period 4T, as shown in FIG. 6E or "1", "2", *, *, "1", *, * and * as shown in FIG. 6J.

Thus, the wavelet transform apparatus of FIG. 5 is smaller in size compared with that of FIG. 3.

As explained above, in both the wavelet transform apparatus of FIGS. 3 and 5, downsamplers are not provided, the number of two-band analysis filter circuits, i.e., the number of convolution calculating circuits is reduced as compared with the prior art wavelet transform apparatus of FIGS. 1 and 2.

The convolution calculating circuits 305 and 318 of FIG. 3 and the convolution calculating circuit 517 of FIG. 5 are explained next in detail with reference to FIGS. 7A, 7B, and 7C.

In FIG. 7A, the convolution calculating circuit 305 (318, 517) includes multipliers 701, 702, 703 and 704 for multiplying inputs $X_1$, $X_2$, $X_3$ and $X_4$ thereof by lowpass filter coefficients $C_{l1}$, $C_{l2}$, $C_{l3}$ and $C_{l4}$, and an adder 705 for summing the output values of the multipliers 701, 702, 703 and 704, to calculate a convolution (low frequency component signal) $Y_l$ by $$Y_L = \Sigma C_{Li} X_i$$

Also, the convolution calculating circuit 305 (318, 517) includes multipliers 706, 707, 708 and 709 for multiplying the inputs $X_1$, $X_2$, $X_3$ and $X_4$ thereof by highpass filter coefficients $C_{h1}$, $C_{h2}$, $C_{h3}$ and $C_{h4}$, and an adder 710 for summing the output values of the multipliers 705, 706, 707 and 708, to calculate a convolution (high frequency component signal) $Y_h$ by $$Y_h = \Sigma C_{hi} X_i$$

Thus, the convolution calculating circuit 305 (318, 317) of FIG. 7A generates the low frequency component signal and the high frequency component signal simultaneously, and therefore, in this case, the wavelet transform apparatus of FIGS. 3 and 5 can operate as shown in FIGS. 4A, 4B, 4C and 4D and FIGS. 6A, 6B, 6C, 6D and 6E.

Figure 7B:
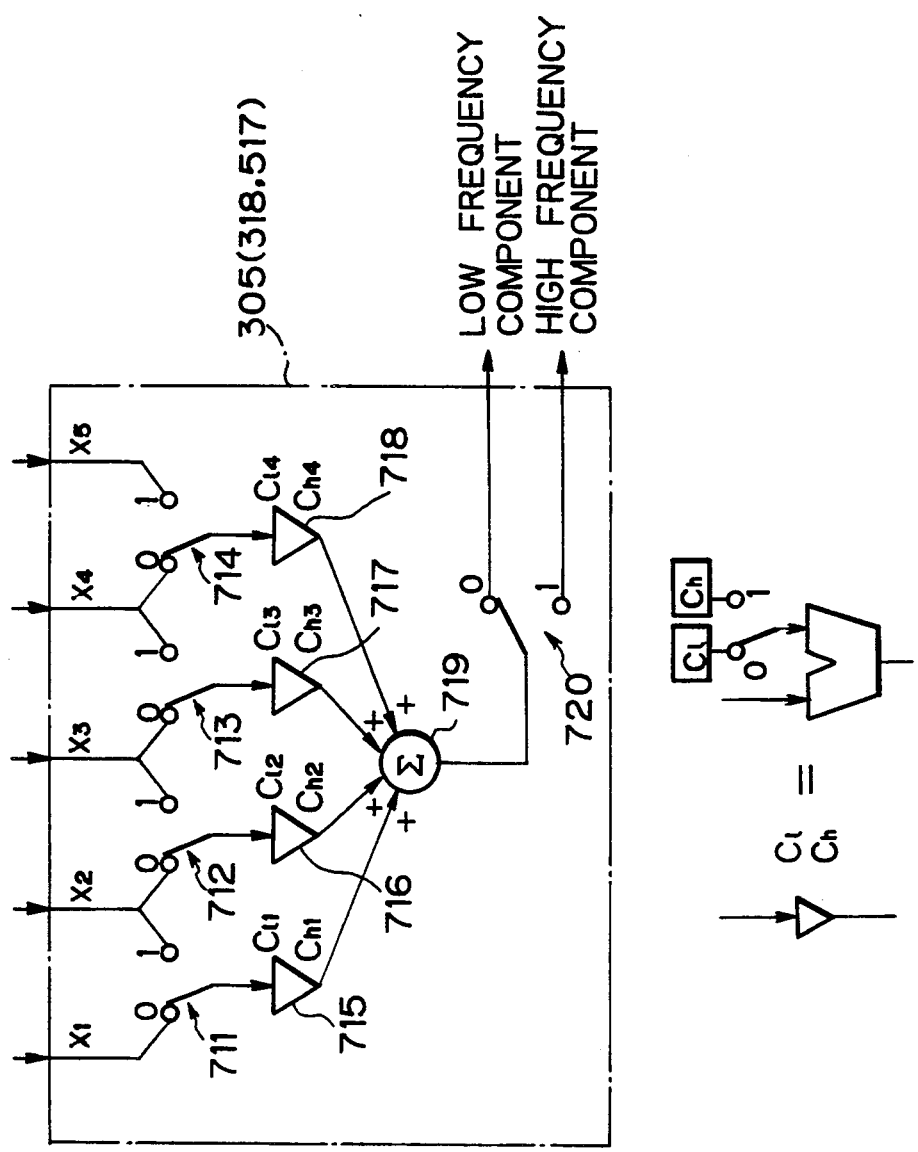

In FIG. 7B, the convolution calculating circuit 305 (318, 517) includes selectors 711, 712, 713, and 714, multipliers 715, 716, 717 and 718 for multiplying inputs $X_1$, $X_2$, $X_3$, $X_4$, and $X_5$ thereof by lowpass filter coefficients $C_{l1}$, $C_{l2}$, $C_{l3}$ and $C_{l4}$, and highpass filter coefficients $C_{h1}$, $C_{h2}$, $C_{h3}$ and $C_{h4}$, alternately, an adder 719 for summing the output values of the multipliers 715, 716, 717 and 718, to calculate a convolution (low frequency component signal) and a convolution (high frequency component signal) alternately, and a selector 720 for switchably outputting the low frequency component signal and the high frequency component signal alternately at its two terminals. The position sequence of the selectors 711, 712, 713, and 714, and the position sequence of the selector 720 are "0" and "1" within the period 2T as shown in FIG. 4I, or "0", "0", "1", "0", "0", "1", "1", and * within the period 4T as shown in FIG. 6K. Note that the coefficient sequence of the multipliers 715, 716, 717, and 718 is also in synchronization with the position sequence of the selectors 711, 712, 713 and 714.

Also, the position sequence of the selector 720 applied to the convolution calculating circuit 305 of FIG. 3 is the same as that of the selectors 711 to 714. However, the position sequence of the selector 720 applied to the convolution calculating circuit 318 of FIG. 3 is *, "0", "0", "1", *, "0", "1", and "1" within the period 8T as shown in FIG. 4J, and the position sequence of the selector 720 applied to the convolution calculating circuit 517 of FIG. 5 is *, *, "1", "0", *, "1", "1", *, *, *, "1", "1", *, "1", "1", and * within the period 8T as shown in FIG. 6J.

In FIG. 7B, after a lowpass filter operation is performed upon data $X_1$, $X_2$, $X_3$ and $X_4$ through the positions "0" of the selectors 711 to 714, the positions of the selectors 711 to 714 are changed from "0" to "1" to perform a highpass filter operation upon data $X_2$, $X_3$, $X_4$ and $X_5$ through "1" of the selectors 711 to 714. In this case, the data $X_1$, $X_2$, $X_3$ and $X_4$ are simultaneously transferred by the delay units, and therefore, the data $X_2$, $X_3$, $X_4$ and $X_5$ are the same as the data $X_1$, $X_2$, $X_3$ and $X_4$, respectively. Thus, both of the lowpass filter operation and the highpass filter operation are performed upon the same data.

Figure 7C:
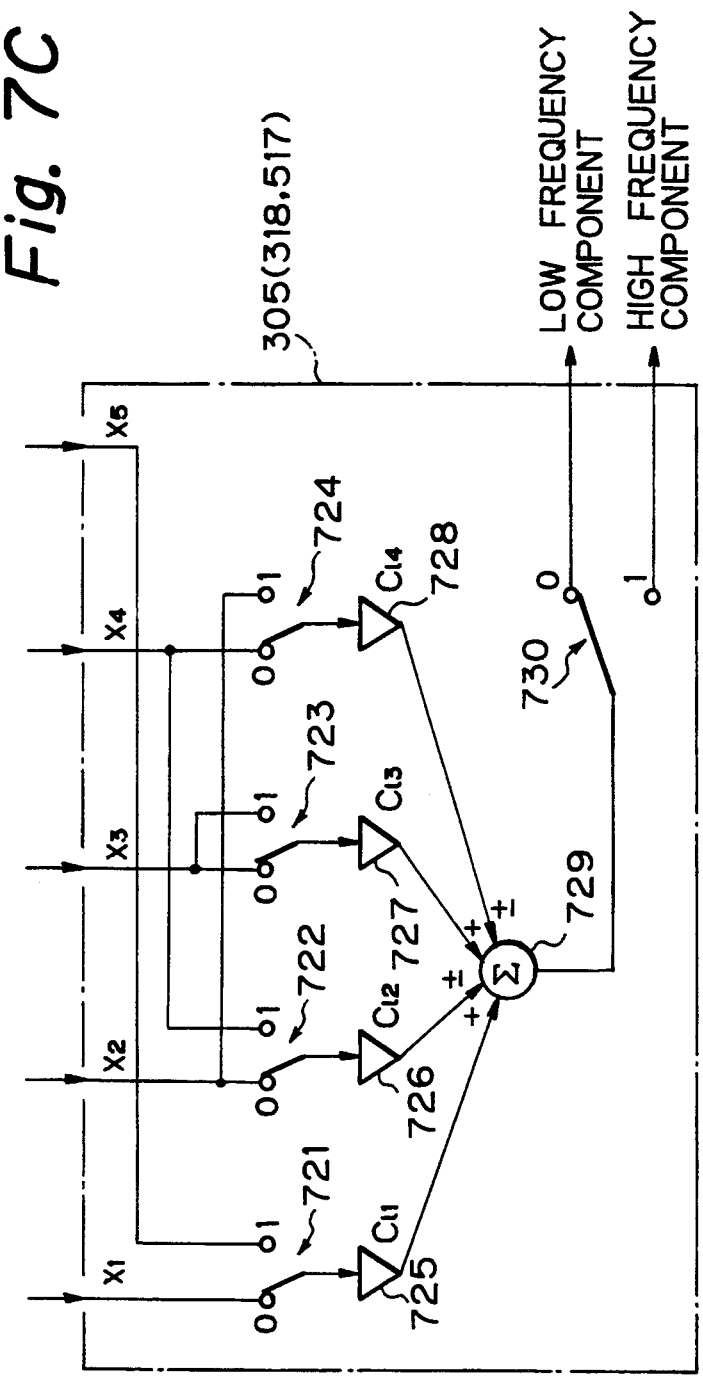

In FIG. 7C, use is made of the following relationship:

$$b_i = (-1)^i a_{m-i-1}$$

where $a_i$ is an i-th filtering coefficient of an M-tap lowpass filter, $b_i$ is an i-th filtering coefficient of an M-tap highpass filter, and $i = 0, 1, 2, \ldots, M-1$. That is, the convolution calculating circuit 305 (318, 517) includes selectors 721, 722, 723 and 724, multipliers 725, 726, 727 and 728 for multiplying inputs $X_1$, $X_2$, $X_3$, $X_4$ and $X_5$ thereof by lowpass filter coefficients $C_{l1}$, $C_{l2}$, $C_{l3}$ and $C_{l4}$, an adder 729 for summing the output values of the multipliers 725, 726, 727 and 728, to calculate a convolution (low frequency component signal) and a convolution (high frequency component signal) alternately, and a selector 730 for switchably outputting the low frequency component signal and the high frequency component signal alternately at its two terminals. In this case, the adder 729 serves as a subtractor for the output values of the multipliers 726 and 728. The position sequences of the selectors 721 722 723 and 724, the selector 730, and the adder 729 are the same as those of the selectors 711, 712, 713 and 714, the selector 720, and the adder 719. Thus, the operation of the convolution calculating circuit of FIG. 7C is the same as that of FIG. 7B.

Figure 8:
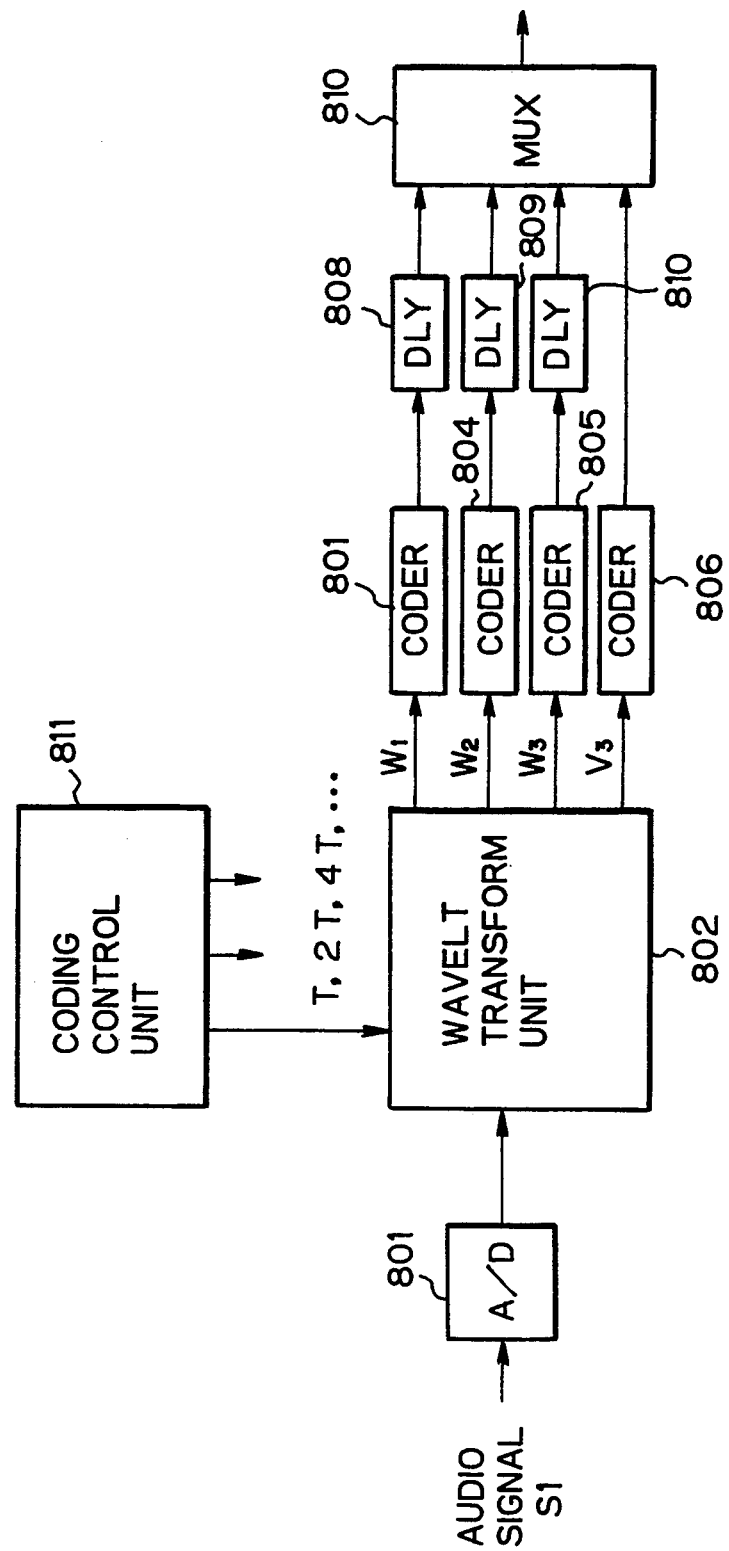
FIG. 8 is a block circuit illustrating a one-dimensional coder to which the one-dimensional wavelet transform apparatuses of FIGS. 3 and 5 are applied.

The wavelet transform apparatus of FIGS. 3 or 5 is applied to a coder as illustrated in FIG. 8. In FIG. 8, reference numeral 801 designates an analog/digital (A/D) converter for performing an A/D conversion upon a one-dimensional signal such as an audio signal S1. First, a digital output signal of a plurality of bits of the A/D converter 801 is supplied to a wavelet transform unit 802 which has the same configuration as the wavelet transform apparatus of FIGS. 3 or 5. As a result, the wavelet transform unit 802 divides the frequency band space of the input signal IN thereof into four frequency band spaces $W_1$, $W_2$, $W_3$ and $V_3$, as explained above. Then, the components $W_1$, $W_2$, $W_3$, and $V_3$ are compressed by digital bondwidth compression coders 803 to 806 and then, time delay compensations are performed thereon by delay units 808, 809 and 810. Compensated data is transmitted by a multiplexer 810 to a transmission line or the like. Reference numeral 811 designates a coding control unit for controlling the entire system of FIG. 8. For example, the coding control unit 811 supplies clock signals T, 2T, 4T, 8T and the like to the wavelet transform unit 802.

Figure 9A:
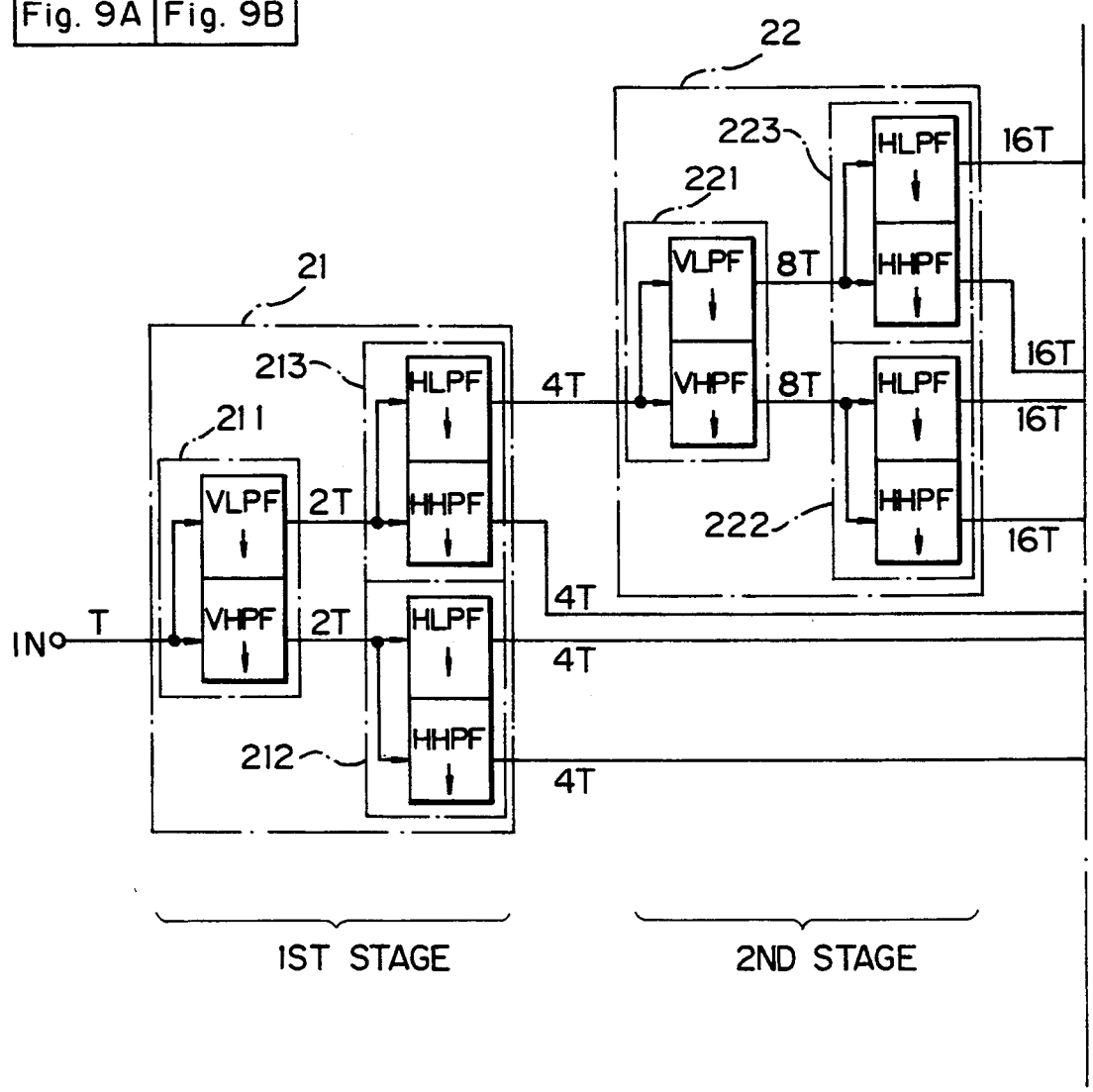
FIGS. 9A and 9B are a block diagram illustrating a prior art two-dimensional wavelet transform apparatus.
Figure 9B:
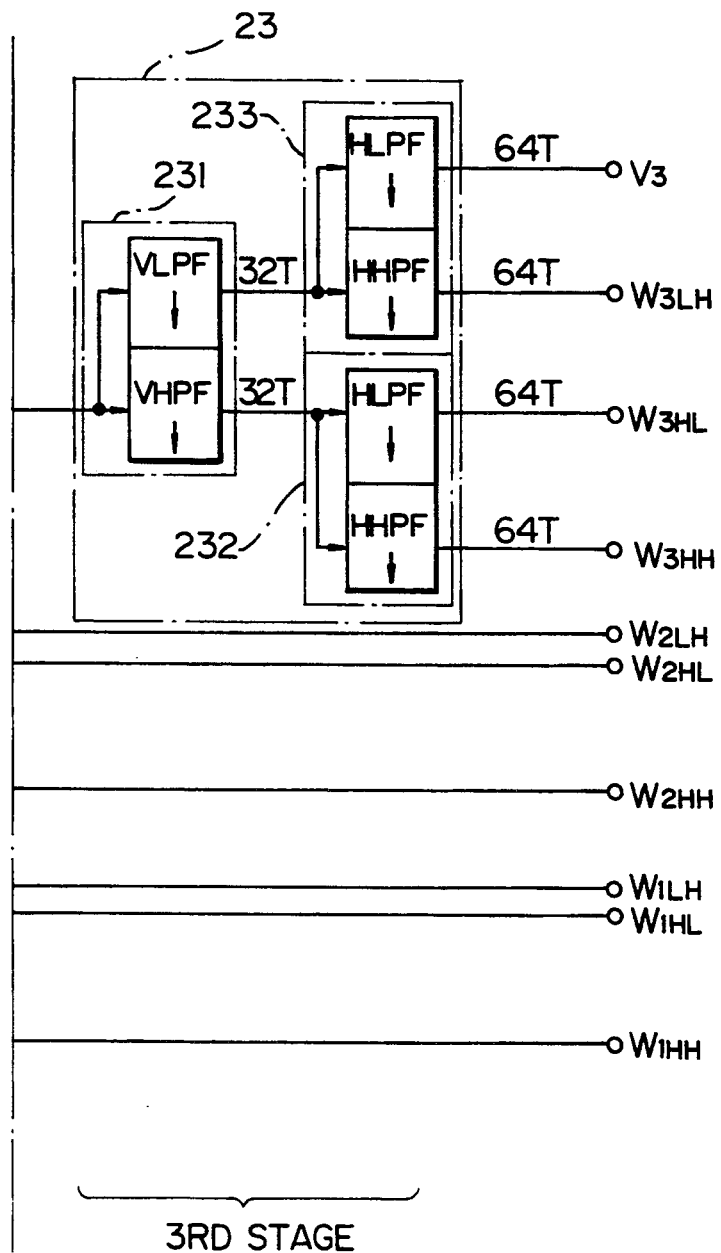

Next, a prior art two-dimensional wavelet transform apparatus for a two-dimensional signal such as a video signal will be explained with reference to FIG. 9. In FIG. 9, the frequency band space of a two-dimensional input signal IN of a plurality of bits is divided by three four-band analysis filter circuits 21, 22 and 23 into ten frequency band spaces $W_{1HH}$, $W_{1HL}$, $W_{1LH}$, $W_{2HH}$, $W_{2HL}$, $W_{2LH}$, $W_{3HH}$, $W_{3HL}$, $W_{3LH}$ and $V_3$.

The four-band analysis filter circuit 21 includes a vertical two-band analysis filter circuit 211
for carrying out a vertical two-band analysis filter operation, and two two-band analysis filter circuits 212 and 213 each for carrying out a horizontal two-band analysis filter operation. The vertical two-band analysis filter circuit 211 receives the input signal IN at a clock period T i.e., at the sampling frequency $f_s$ and splits it into a high frequency component and a low frequency component. In this case, in the two-band analysis filter circuit 211, a highpass filter VHPF including a downsampler generates the high frequency component at a clock period 2T, and a lowpass filter VLPF including a downsampler generates the low frequency component at the clock period 2T. Also, the two-band analysis filter circuit 212 receives the high frequency component from the highpass filter VHPF at the clock period 2T and splits it into a high frequency component $W_{1HH}$ and a low frequency component $W_{1HL}$. In this case, in the two-band analysis filter circuit 212, a highpass filter HHPF including a downsampler generates the high frequency component $W_{1HH}$ at a clock period 4T, and a lowpass filter HLPF including a downsampler generates the low frequency component $W_{1HL}$ at the clock period 4T. Further, the two-band analysis filter circuit 213 receives the low frequency component from the lowpass filter 211 at the clock period 4T and splits it into a high frequency component $W_{1LH}$ and a low frequency component. In this case, in the two-band analysis filter circuit 213, a highpass filter HHPF including a downsampler generates the high frequency component $W_{1LH}$ at a clock period 4T, and a lowpass filter HLPF including a downsampler generates the low frequency component at the clock period 4T.

Similarly, the four-band analysis filter circuit 22 includes a vertical two-band analysis filter circuit 221 for carrying out a vertical two-band analysis filter operation, and two two-band analysis filter circuits 222 and 223 each for carrying out a horizontal two-band analysis filter operation. The vertical two-band analysis filter circuit 221 receives low frequency component from the two-band analysis filter circuit 213 at the clock period 4T and splits it into a high frequency component and a low frequency component. In this case, in the two-band analysis filter circuit 221, a highpass filter VHPF including a downsampler generates the high frequency component at a clock period 8T, and a lowpass filter VLPF including a downsampler generates the low frequency component at the clock period 8T. Also, the two-band analysis filter circuit 222 receives the high frequency component from the highpass filter VHPF at the clock period 8T and splits it into a high frequency component $W_{2HH}$ and a low frequency component $W_{2HL}$. In this case, in the two-band analysis filter circuit 222, a highpass filter HHPF including a downsampler generates the high frequency component $W_{2HH}$ at a clock period 16T, and a lowpass filter HLPF including a downsampler generates the low frequency component $W_{2HL}$ at the clock period 16T. Further, the two-band analysis filter circuit 223 receives the low frequency component from the lowpass filter 211 at the clock period 8T and splits it into a high frequency component $W_{2LH}$ and a low frequency component. In this case, in the two-band analysis filter circuit 223, a highpass filter HHPF including a downsampler generates the high frequency component $W_{2LH}$ at a clock period 16T, and a lowpass filter HLPF including a downsampler generates the low frequency component at the clock period 16T.

Further, the four-band analysis filter circuit 23 includes a vertical two-band analysis filter circuit 231 for carrying out a vertical two-band analysis filter operation, and two two-band analysis filter circuits 232 and 233 each for carrying out a horizonital two-band analysis filter operation. The vertical two-band analysis filter circuit 231 receives the low frequency component from the two-band analysis filter circuit 223 at the clock period 16T and splits it into a high frequency component and a low frequency component. In this case, in the two-band analysis filter circuit 231, a highpass filter VHPF including a downsampler generates the high frequency component at a clock period 32T, and a lowpass filter VLPF including a downsampler generates the low frequency component at the clock period 32T. Also, the two-band analysis filter circuit 232 receives the high frequency component from the highpass filter VHPF at the clock period 32T and splits it into a high frequency component $W_{3HH}$ and a low frequency component $W_{3HL}$. In this case, in the two-band analysis filter circuit 232, a highpass filter HHPF including a downsampler generates the high frequency component $W_{3HH}$ at a clock period 64T, and a lowpass filter HLPF including a downsampler generates the low frequency component $W_{3HL}$ at the clock period 64T. Further, the two-band analysis filter circuit 223 receives the low frequency component from the lowpass filter 211 at the clock period 32T and splits it into a high frequency component $W_{3LH}$ and a low frequency component $V_3$. In this case, in the two-band analysis filter circuit 223, a highpass filter HHPF including a downsampler generates the high frequency component $W_{3LH}$ at a clock period 64T, and a lowpass filter HLPF including a downsampler generates the low frequency component at the clock period 64T.

For example, each of the two-band analysis filter circuits 211, 212, 213, 221, 222, 223, 231, 232 and 233 is formed by a circuit as illustrated in FIG. 2. In this case, the number of two-band analysis filter circuits. i.e., convolution calculating circuits, is $6 \times 3 = 18$, and therefore, the prior art two-dimensional wavelet transform apparatus as illustrated in FIG. 9 is large in size.

Also, the inventor recognized. the fact that, if a filter module operated at the sampling frequency $f_s(=1/T)$ is incorporated into each of the filters of FIG. 9, such a filter module overfunctions. That is, every other data calculated by each of the filters is decimated by each downsampler incorporated therein. Further, the four-band analysis filter circuit 22 operates at a quarter clock rate as the two-band analysis filter circuit 11, and the four-band analysis filter circuit 23 operates at a quarter clock rate as the four-band analysis filter circuit 22, and as a result, the four-band analysis filter circuits 22 and 23 are often freed from operation. In other words, the efficiency of the post stages is low. That is, if each of the filters is formed by a filter module operated at the frequency $f_s$, such a filter module further overfunctions. If each of the filters VLPF and VHPF of the four-band analysis filter circuit 21 without downsamplers can operate at a frequency $f_s/2$, the first stage vertical filtering operation is carried out at the frequency $f_s$. Also, if each of the filters HLPF and HHPF of the four-band analysis filter circuit 21 without downsamplers can operate at a frequency $f_s/4$, the first stage vertical filtering operation is carried out at the frequency $f_s$. Therefore, the entire of the first stage can be formed by two filter modules operated at the frequency $f_s$. Similarly, the entire of the second stage can be formed by two filter modules operated at a frequency $f_s/4$, and the entire of the third stage can be formed by two filter modules operated at a frequency $f_s/16$. Generally, the N-th stage (N=1, 2, . . . ) is operated at a frequency $f_s/4^{N-1}$, the entire of the N-th stage can be formed by two filter modules operated at the frequency $f_s/4^{N-1}$. In other words, the two-dimensional wavelet transform apparatus of FIG. 9 can be formed by six filter modules, which is explained below.

Figure 10C:
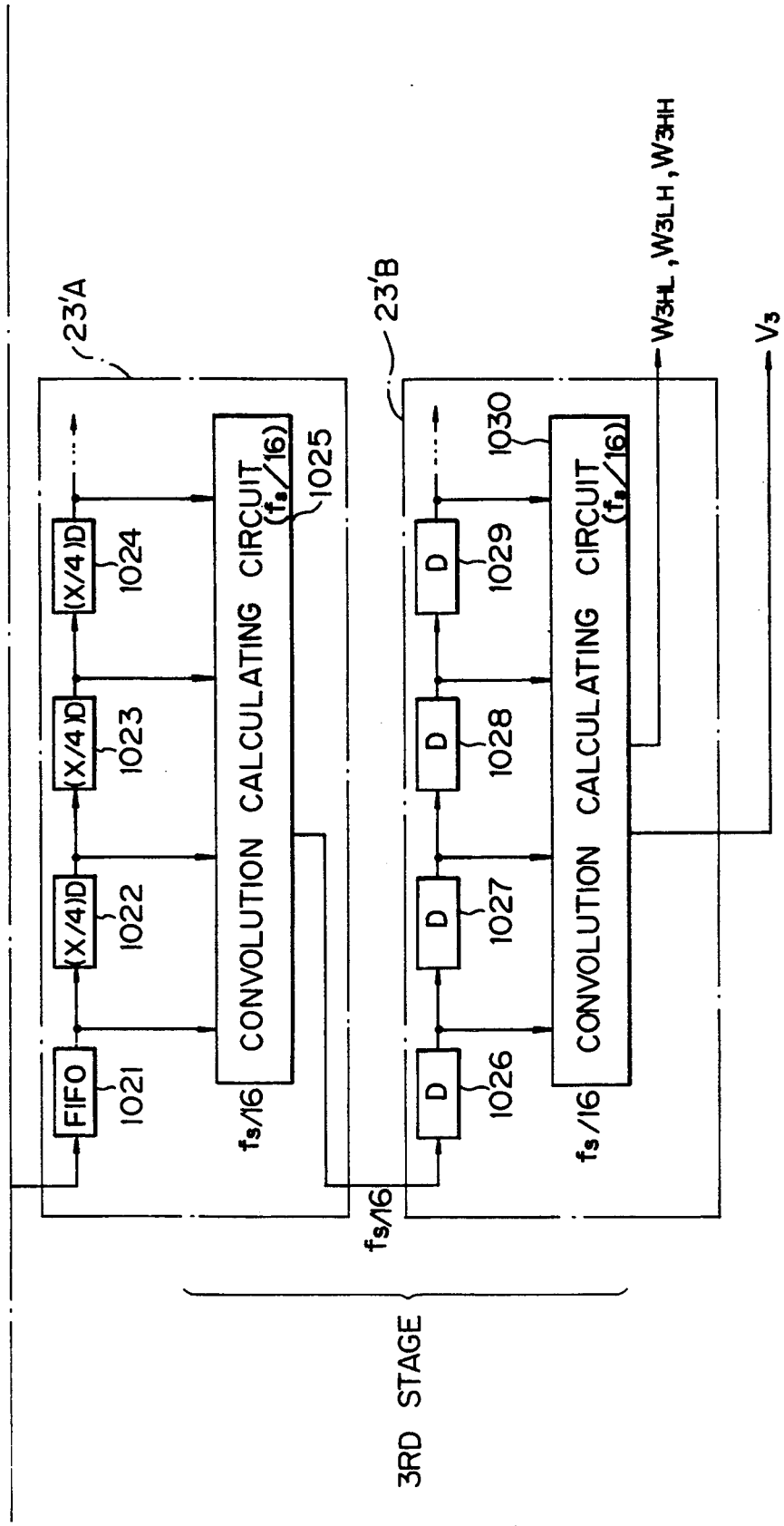

In FIG. 10, which illustrates a third embodiment of the present invention, three stages of four-band analysis filter operations are carried out to divide the frequency band space of the input signal IN into ten frequency band spaces $W_{1HH}$, $W_{1LH}$, $W_{1HL}$, $W_{2HH}$, $W_{2LH}$, $W_{2HL}$, $W_{3HH}$, $W_{3LH}$, $W_{3HL}$ and $V_3$, in the same way as in FIG. 9, however, only six convolution calculating circuits are provided. That is, each stage of the four-band analysis filter circuits 21 (22, 23) of FIG. 9 is replaced by two two-band analysis filter circuits 21' A and 21' B (22' A and 22' B, 23' A and 23' B) for performing a vertical two-band analysis filter operation and a horizontal two-band analysis filter operation, respectively. Note that the input signal IN is a two-dimensional signal for a picture having a horizontal size of X and a vertical size of Y.

In FIG. 10, the two-band analysis filter circuits 21' A and 21' B for the first stage is operated at the frequency $f_s(=1/T)$, the two-band analysis filter circuits 22' A and 22' B for the second stage is operated at the frequency $f_s/4$ $(=1/4T)$, and the two-band analysis filter circuits 23' A and 23' B for the third stage is operated at the frequency $f_s/16$ $(=1/16T)$.

Figure 11A:
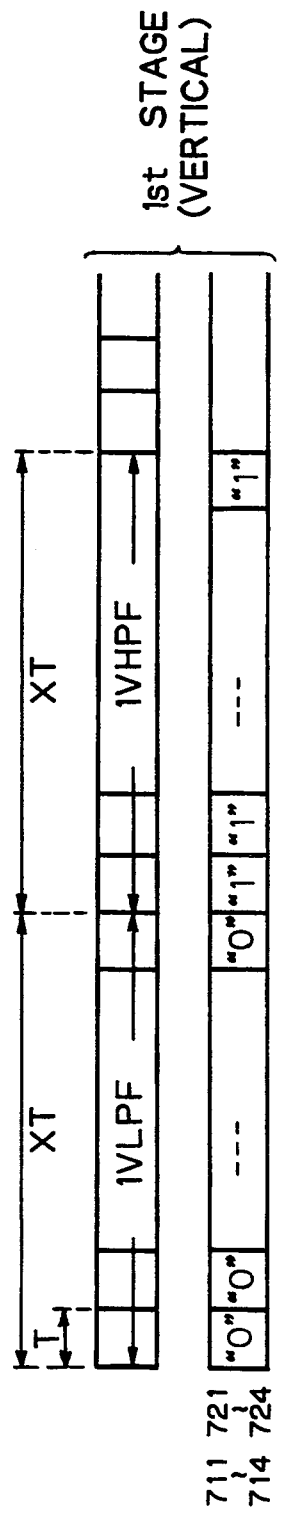
Figure 11B:
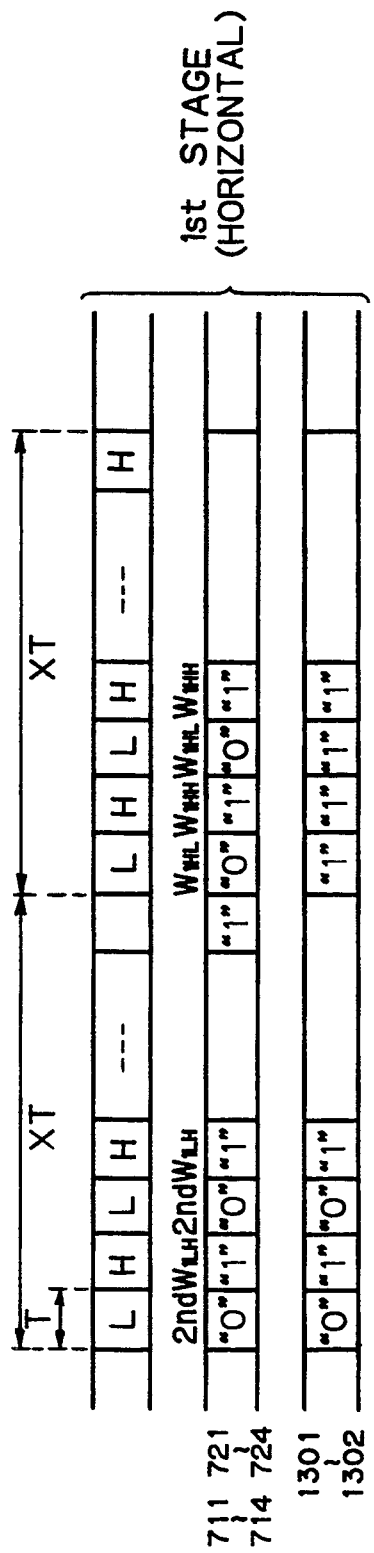
Figure 1:
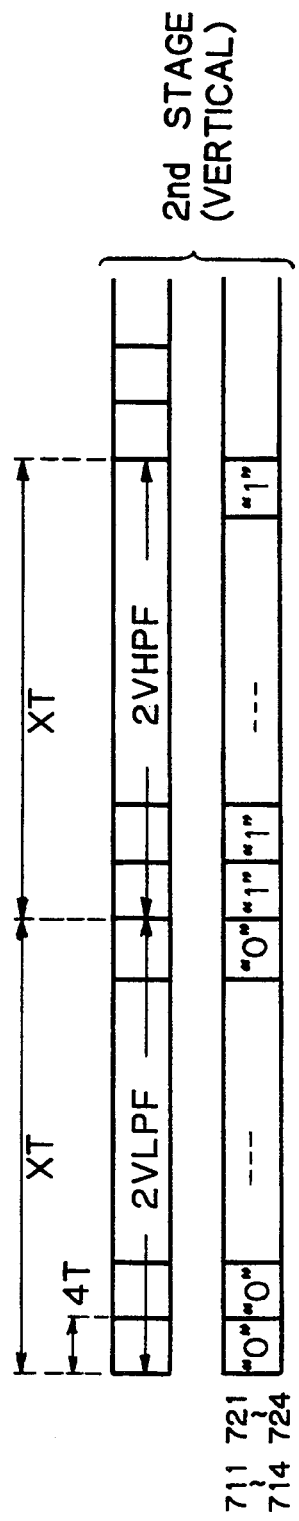
Figure 1:
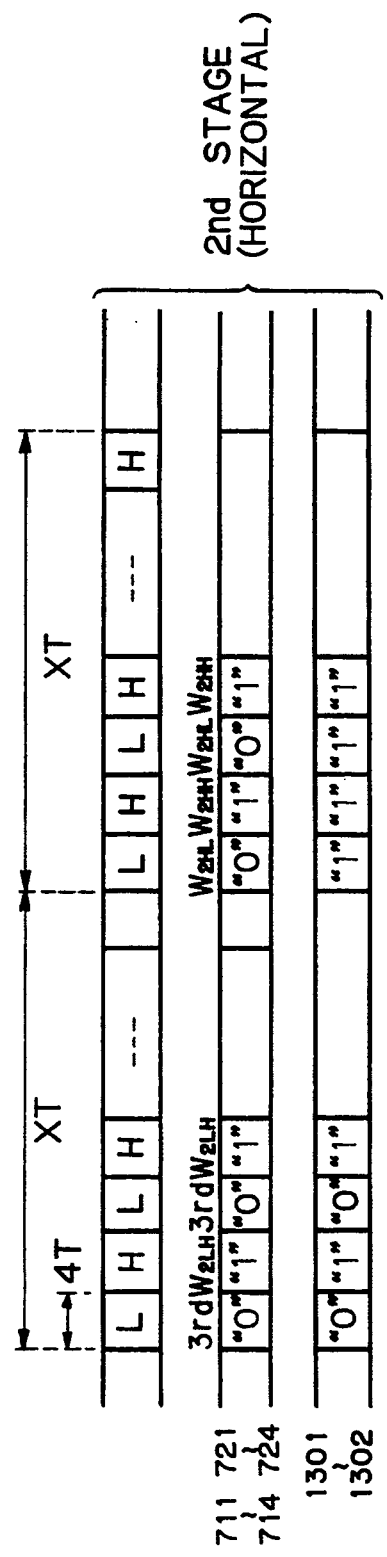
Figure 1:
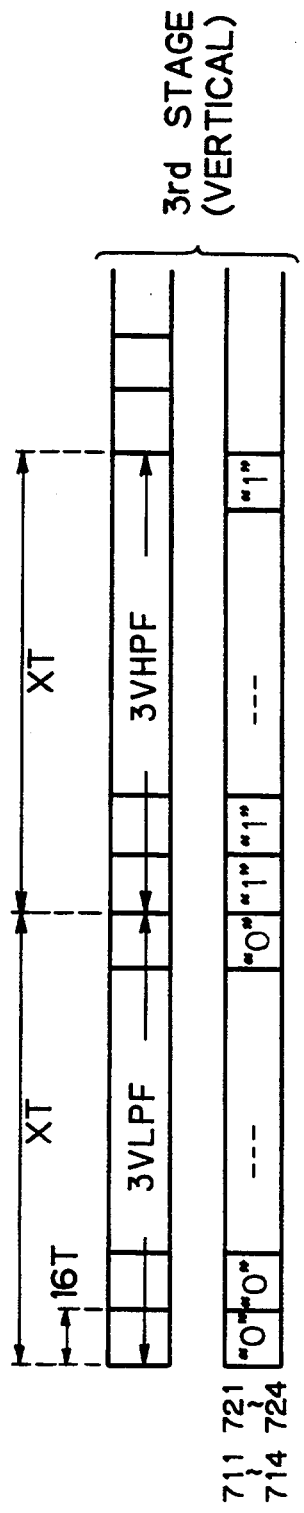
Figure 1:
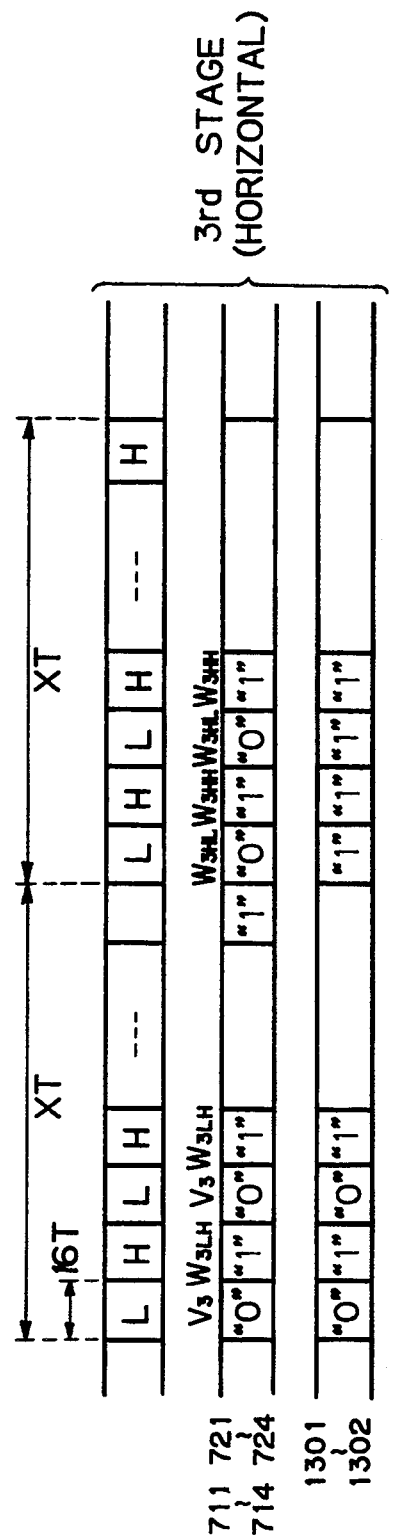

The two-band analysis filter circuit 21' A includes a delay unit having a size of 1, i.e., having a capacity of storing 1 element, delay units 1002 to 1004 each having a size of X, i.e., having a capacity of storing X elements, and a convolution calculating circuit 1005, thereby carrying out a first-stage vertical two-band analysis filter operation indicated by reference 1VLPF and 1VHPF in FIG. 11A. That is, the input signal IN is input to the series of delay units 1001 to 1004 in synchronization with the clock period T. and the outputs of the delay units 1001 to 1004 are supplied in parallel to the convolution calculation circuit 1005. In this case, the input signal IN is sampled at the frequency $f_s$, and therefore, the number of sampled data per one vertical line is X. As a result. the convolution calculating circuit 1005 performs convolutions upon the outputs of the delay units 1001 to 1004 to generate X vertical low frequency component signals for one vertical line as indicated by 1VLPF and X vertical high frequency component signals for another vertical line as indicated by 1VHPF. Also, the two-band analysis filter circuit 21' B includes delay units 1006 to 1009 each having a size of 1, .i.e., having a capacity of storing 1 element, and a convolution calculating circuit 1010, thereby carrying out a first-stage horizontal two-band analysis filter operation as shown in FIG. 11B. That is, vertical frequency component signals of the two-band analysis filter circuit 21' A are input to the series of delay units 1006 to 1009 in synchronization with the clock period T, and the outputs of the delay units 1006 to 1009 are supplied in parallel to the convolution calculation circuit 1010. As a result, the convolution calculating circuit 1010 performs convolutions upon the outputs of the delay units 1006 to 1009 to generate a horizontal low frequency component signal (L) and a horizontal high frequency component signal (H) alternately, in synchronization with a clock period T as shown in FIGS. 11B. As a result, a horizontal low vertical low frequency component, a horizontal low vertical high frequency component $W_{1HL}$, a horizontal high vertical, low frequency component $W_{1LH}$ and a horizontal high vertical high frequency component $W_{1HH}$ are obtained. The horizontal low vertical low frequency component is supplied to the two-band analysis filter circuit 22' A, but the other components $W_{1HL}$, $W_{1LH}$ and $W_{1HH}$ are output from the wavelet transform apparatus of FIG. 10. Thus, the two-band analysis filter circuits 21' A and 21' B divide the frequency band space of the input signal IN into four subband spaces, thus carrying out a first stage four-split filtering operation.

Also, the two-band analysis filter circuit 22' A includes a first-in first-out (FIFO) 1011 and delay units 1012 to 1014 each having a size of X/2, i.e., having a capacity of storing X/2 elements, and a convolution calculating circuit 1015, thereby carrying out a second-stage vertical two-band analysis filter operation. on as indicated by reference 2VLPF and 2VHPF in FIG. 11C. Note that the transfer of data from the two-band analysis filter circuit 21' B to the two-band analysis filter circuit 22' A is not steady as shown in FIG. 11B, and therefore, the FIFO 1011 is used for smoothing the stream of transferred data.

That is, the horizontal low frequency component signal of the two-band analysis filter circuit 21' B is input to the series of the FIFO 1011 and the delay units 1012 to 1014 in synchronization with the clock period 4T, and the outputs of the FIFO 1011 and the delay units 1012 to 1014 are supplied in parallel to the convolution calculation circuit 1015. In this case, the number of data per one vertical line is X/2. As a result, the convolution calculating circuit 1015 performs convolutions upon the outputs of the FIFO 1011 and the delay units 1012 to 1014 to generate X/4 vertical low frequency component signals for one vertical line as indicated by 2VLPF and X/4 vertical high frequency component signals for another vertical line as indicated by 2VHPF. Also, the two-band analysis filter circuit 22' B includes delay units 1016 to 1019 each having a size of 1, i.e., having a capacity of storing 1 element, and a convolution calculating circuit 1020, thereby carrying out a second-stage horizontal two-band analysis filter operation as shown in FIG. 11D. That is, the vertical frequency component signal of the two-band analysis filter circuit 22' A are input to the series of delay units 1016 to 1019 in synchronization with the clock period 4T, and the outputs of the delay units 1016 to 1019 are supplied in parallel to the convolution calculation circuit 1020. As a result, the convolution calculating circuit 1020 performs convolutions upon the outputs of the delay units 1016 to 1019 to generate a horizontal low frequency component signal (L) and a horizontal high frequency component signal (H) alternately, in synchronization with a clock period 4T as shown in FIG. 11D. As a result. a horizontal low frequency vertical low frequency component, a horizontal low frequency vertical high frequency component $W_{2HL}$ and a horizontal high frequency vertical low frequency component $W_{2LH}$, a horizontal high frequency vertical high frequency component $W_{2HH}$, are obtained. The horizontal low frequency vertical low frequency component is supplied to the two-band analysis filter circuit 23' A, but the other components $W_{2HL}$, $W_{2LH}$ and $W_{2HH}$ are output from the wavelet transform apparatus of FIG. 10. Thus, the two-band analysis filter circuits 22' A and 22' B divide the frequency band space of the horizontal low frequency vertical low frequency component signal of the two-band analysis filter circuit 21' B into four subband spaces, thus carrying out a second stage four-split filtering operation.

Further, the two-band analysis filter circuit 23' A includes an FIFO 1021 and delay units 1022 to 1024 each having a size of X/4, i.e., having a capacity of storing X/4 elements, and a convolution calculating circuit 1025, thereby carrying out a third-stage vertical two-band. analysis filter operation as indicated by reference 3VLPH and 3VHPF in FIG. 11E. Note that the FIFO 1021 is also used for smoothing the stream of data. That is, the horizontal low frequency component signal of the two-band analysis filter circuit 22' B is input to the series of the FIFO 1021 and delay units 1022 to 1024 in synchronization with the clock period 16T, and the outputs of the FIFO 1021 the delay units 1022 to 1024 are supplied in parallel to the convolution calculation circuit 1025. In this case, the number of data per one vertical line is X/4. As a result, the convolution calculating circuit 1025 performs convolutions upon the outputs of the FIFO 1021 and the delay units 1022 to 1024 to generate X/16 vertical low frequency component signals for one vertical line as indicated by 3VLPF and a vertical high frequency component signals for another vertical line as indicated by 3VHPF. Also, the two-band analysis filter circuit 23' B includes delay units 1026 to 1029 each having a size of 1, i.e., having a capacity of storing 1 element, and a convolution calculating circuit 1030, thereby carrying out a third-stage horizontal two-band analysis filter operation as shown in FIG. 11F. That is, the vertical frequency component signal of the two-band analysis filter circuit 23' A is input to the series of delay units 1026 to 1029 in synchronization with the clock period 16T. and the outputs of the delay units 1026 to 1029 are supplied in parallel to the convolution calculation circuit 1030. As a result, the convolution calculating circuit 1030 performs convolutions upon the outputs of the delay units 1026 to 1029 to generate a horizontal low frequency component signal (L) and a horizontal high frequency component signal (H) alternately, in synchronization with a clock period 16T as shown in FIG. 11F. As a result, a horizontal low frequency vertical low frequency component $V_3$, a horizontal low frequency vertical high frequency component $W_{3HL}$, a horizontal high frequency vertical low frequency component $W_{3LH}$ and a horizontal high frequency vertical high frequency component $W_{3HH}$, are obtained. Thus, the two-band analysis filter circuits 23' A and 23' B divide the frequency band space of the horizontal low frequency vertical low frequency component signal of the two-band analysis filter circuit 22' B into four subband spaces, thus carrying out a third stage four-split filtering operation.

Figure 12A:
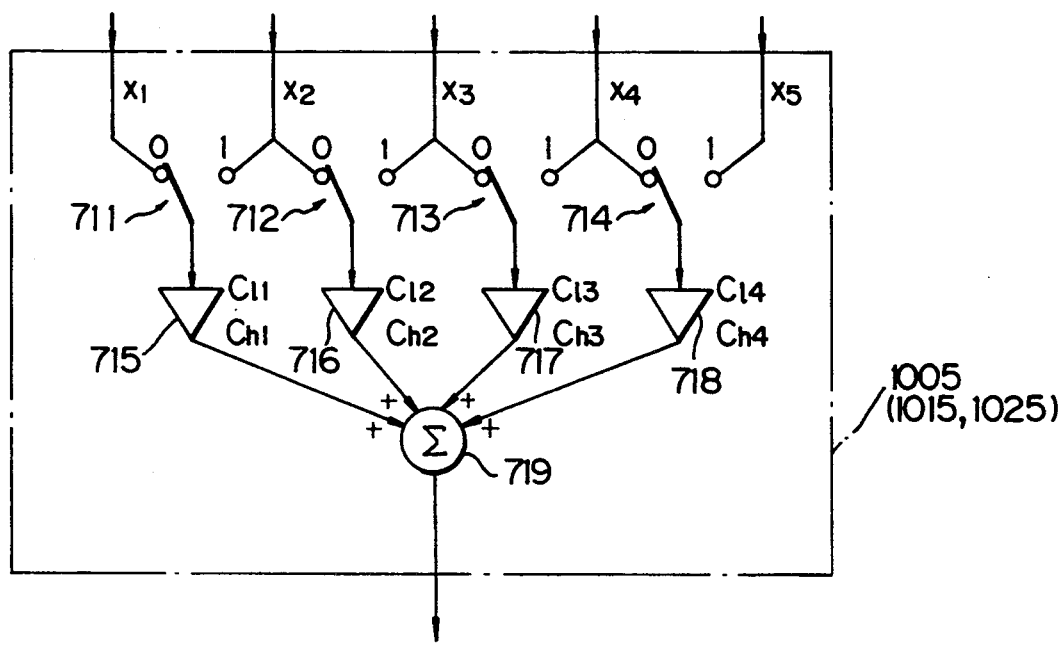
FIGS. 12A, 12B, 13A and 13B, are circuit diagrams of the convolution calculating circuit of FIG. 10.
Figure 12B:
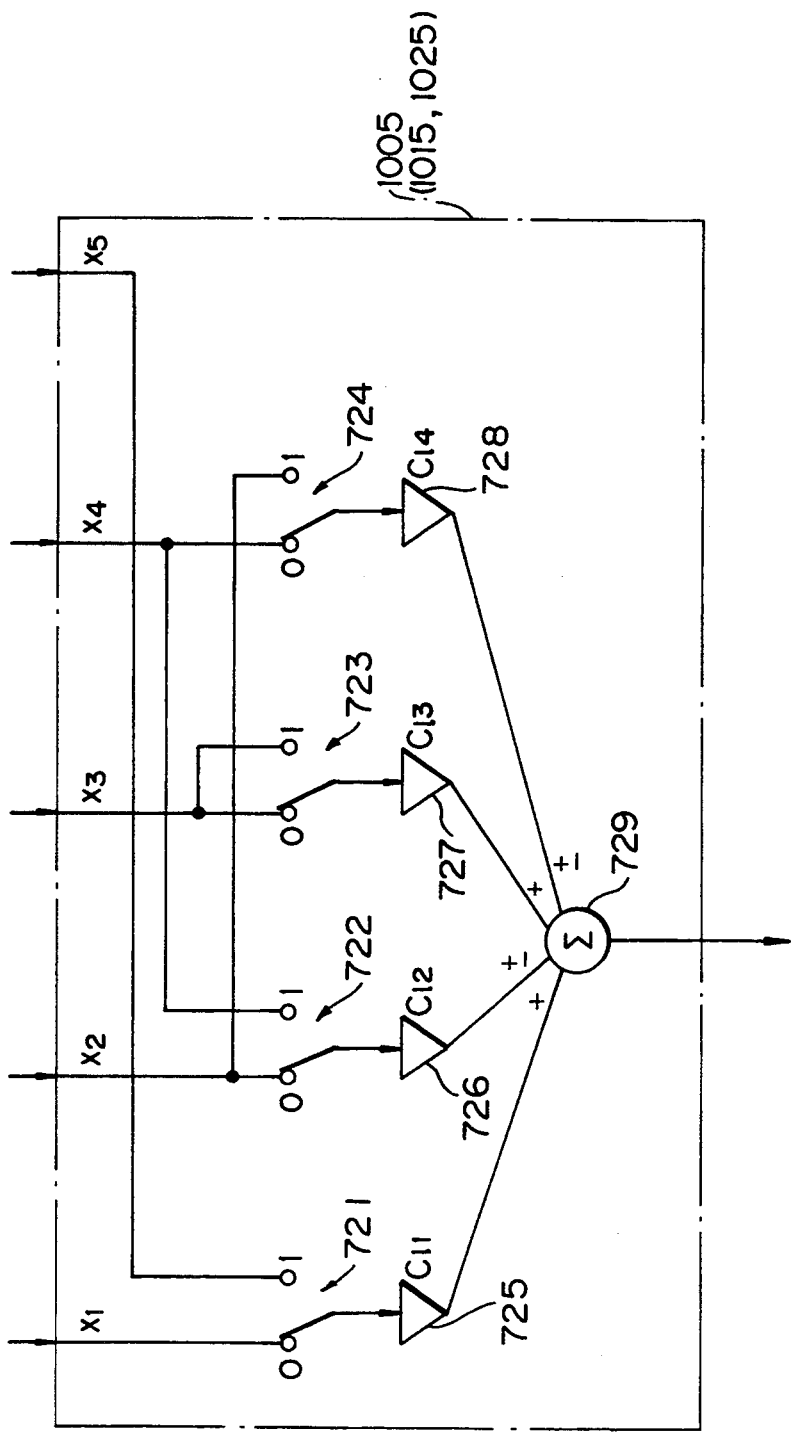
Figure 13A:
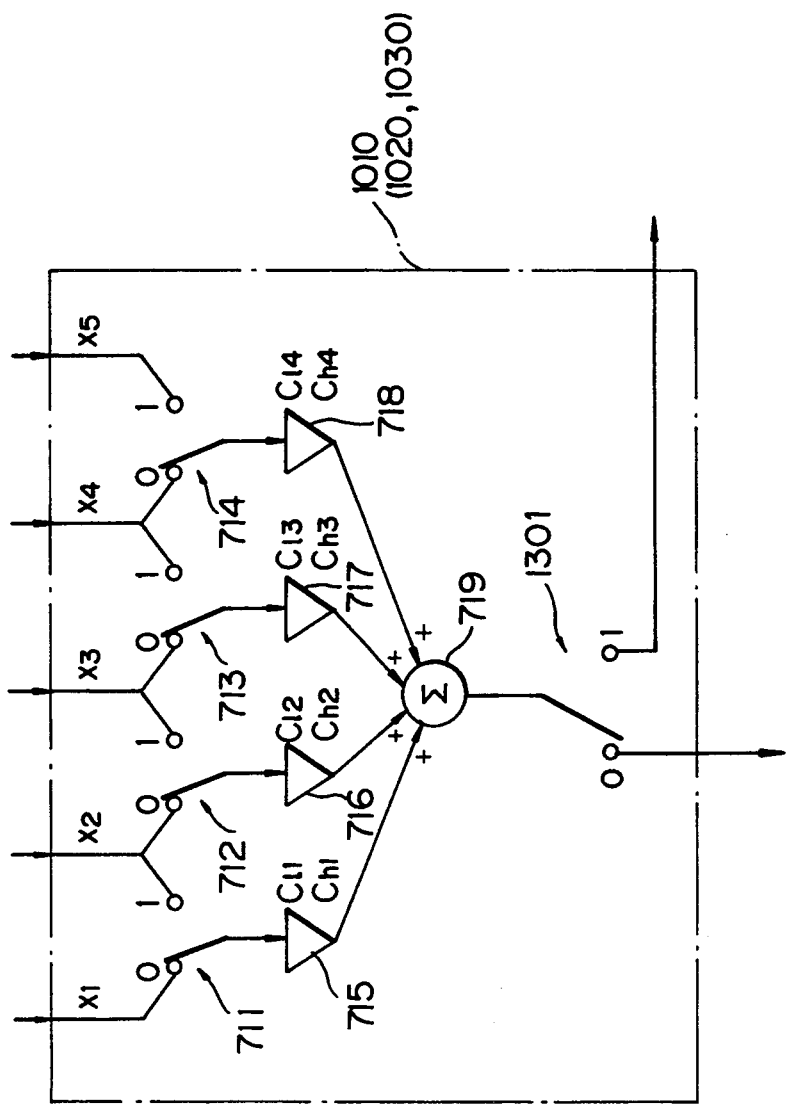
Figure 13B:
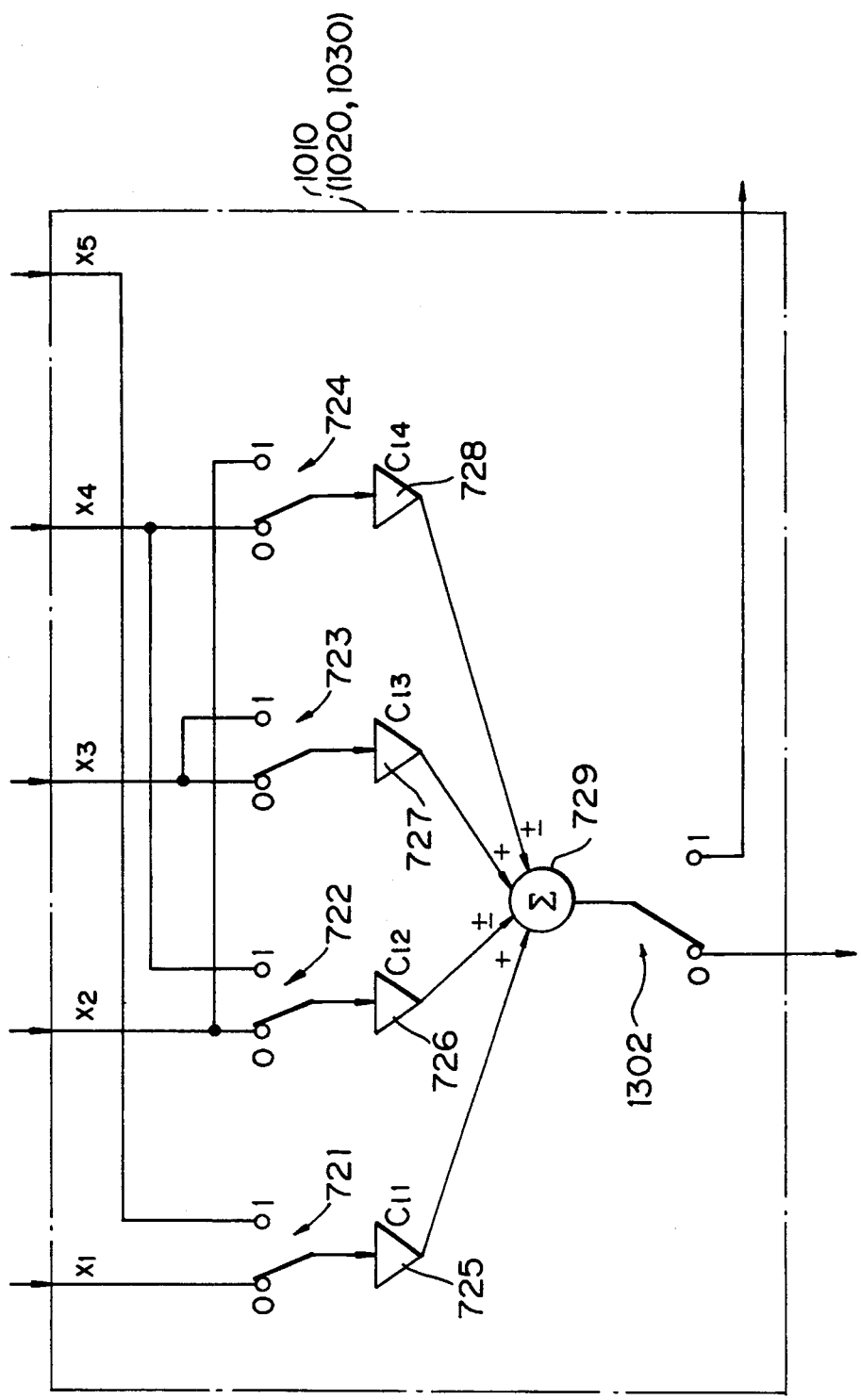

The convolution calculating circuit 1005 (1015, 1025) of FIG. 10 is explained with reference to FIGS. 12A and 12B. In FIGS. 13A and 13B. the selectors 720 and 730 are deleted from the elements of FIGS. 7B and 7C, thus alternately outputting a vertical low frequency component and a vertical high frequency component at each of their output terminals. In the case of the convolution calculating circuits 1005, 1015, and 1025 the position sequence of the selectors 711 to 714 of FIG. 12A, and the selectors 721 to 724 of FIG. 12B is changed as shown in FIGS. 11A, 11C and 11E, respectively.

The convolution calculating circuit 1010 (1020, 1030) of FIG. 10 is explained in detail with reference to FIGS. 13A and 13B. In FIGS. 13A and 13B, selectors 1301 and 1302 are added to the elements of FIGS. 12B and 12C, respectively. Also, in the case of the convolution calculating circuits 1010, 1020 and 1030, the position sequence of the selectors 711 to 714 of FIG. 13A and the selectors 721 to 724 of FIG. 13B is changed as shown in FIGS. 11B, 11D and 11E, respectively, thus alternately outputting a horizontal low vertical high frequency component and a horizontal high vertical high frequency component at each of their output terminals. Also, the position sequence of the selectors 1301 and 1302 of FIGS. 13A and 13B is changed as shown in FIGS. 11B, 11D and 11E, respectively, thus switchably outputting the horizontal low frequency vertical low frequency component and the other components such as $W_{1HL}$, $W_{1LH}$, and $W_{1HH}$ at their output terminals.

Thus, according to the wavelet transform apparatus of FIG. 10, the number of convolution calculating circuits is reduced as compared with that of FIG. 9.

As explained above, generally, in the N stage two-dimensional wavelet apparatus, the N-th stage (N=2, 3, ...) is operated at a frequency $f_s/4^{N-1}$. In this case, $$f_s/4 \text{ (2nd stage)} + f_s/8 \text{ (3rd stage)} \ldots +$$

$$f_s/2^{N-1} \text{ (N-th stage)} < f_s/2 < f_s$$

Therefore, the entire of the second to N-th stages can be formed by only one filter module operated at the frequency $f_s$. In other words, the entire of the second and third stages of FIG. 10 can be formed by only one filter module operated at the frequency $f_s$, which is explained below.

Figure 14B:
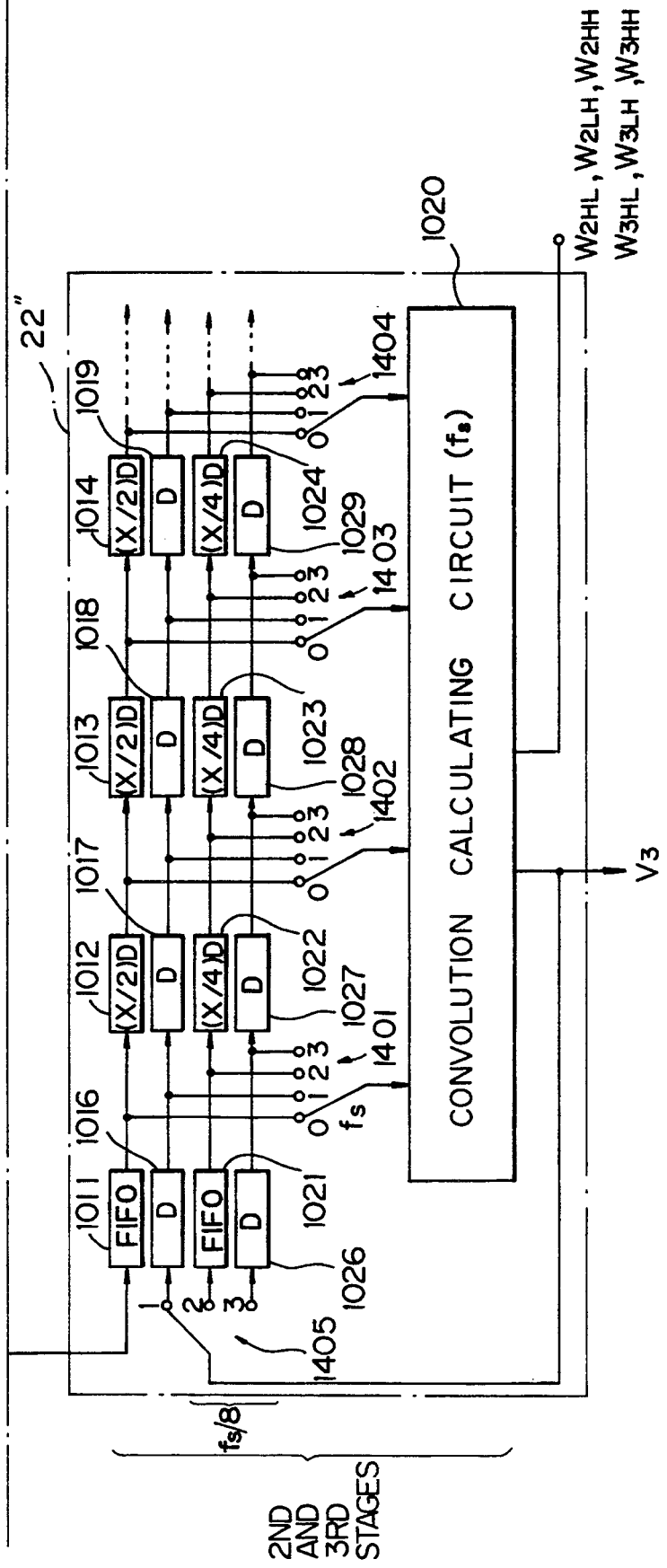

In FIG. 14, which illustrates a forth embodiment of the present invention, only three convolution calculating circuits are provided. In FIG. 14, the two-band analysis filter circuits 22' A, 22' B, 23' A, and 23' B of FIG. 10 are combined to form a two-split subband filter circuit 22" which carries out second and third stages of four-band analysis filter operations. Note that the convolution calculating circuit 1020 of the two-band analysis filter circuit 22" is operated at the frequency $f_s$. In the two-band analysis filter circuit 22", selectors 1401 to 1405 are provided to select one of a vertical subband filtering operation for the second stage of four-band analysis filter operation, a horizontal subband filtering operation for the second stage of four-band analysis filter operation, a vertical subband filtering operation for the third stage of four-band analysis filter operation, and a horizontal subband filtering operation for the third stage of four-band analysis filter operation. Note that the two-band analysis filter circuits 21' A and 21' B are operated for the first-stage of four-band analysis filter operation as shown in FIGS. 11A and 11B. For example, as shown in FIG. 15, when carrying out a second stage of the positions of the selectors 1401 to 1404 are made "0" and the selector 1405 is "1" to operate the convolution calculation circuit 1020 for a second-stage vertical subband filtering operation. Also, as shown in FIG. 15, when carrying out a third stage of four-band analysis filter operation, the positions of the selectors 1401 to 1404 are made "2" and the position of the selector 1405 is made "3" to operate the convolution calculation circuit 1020 for a third stage vertical subband filtering operation, and the positions of the selectors 1401 to 1404 are made "3" and the position of the selector 1405 is not in a selected state to operate the convolution calculation circuit 1020 for a third-stage horizontal subband filtering operation.

In FIG. 15, note that 2VL/H means that one of a lowpass filter and a highpass filter of the second stage vertical subband filtering operation is switched to the other or vice versa at every time period 2XT. Also, in FIG. 15, note that 3VL/H means that one of a lowpass filter and a highpass filter of the second stage vertical subband filtering operation is switched to the other or vice versa at every time period 4XT.

Thus, according to the wavelet transform apparatus of FIG. 14, the number of convolution calculating circuits is also reduced.

As explained above, the entire of the first stage can be formed by two filter modules operated at the frequency $f_s$, and accordingly, the entire of the first stage can be formed by only one filter module operated at a frequency $2f_s$, which is explained below.

Figure 16B:
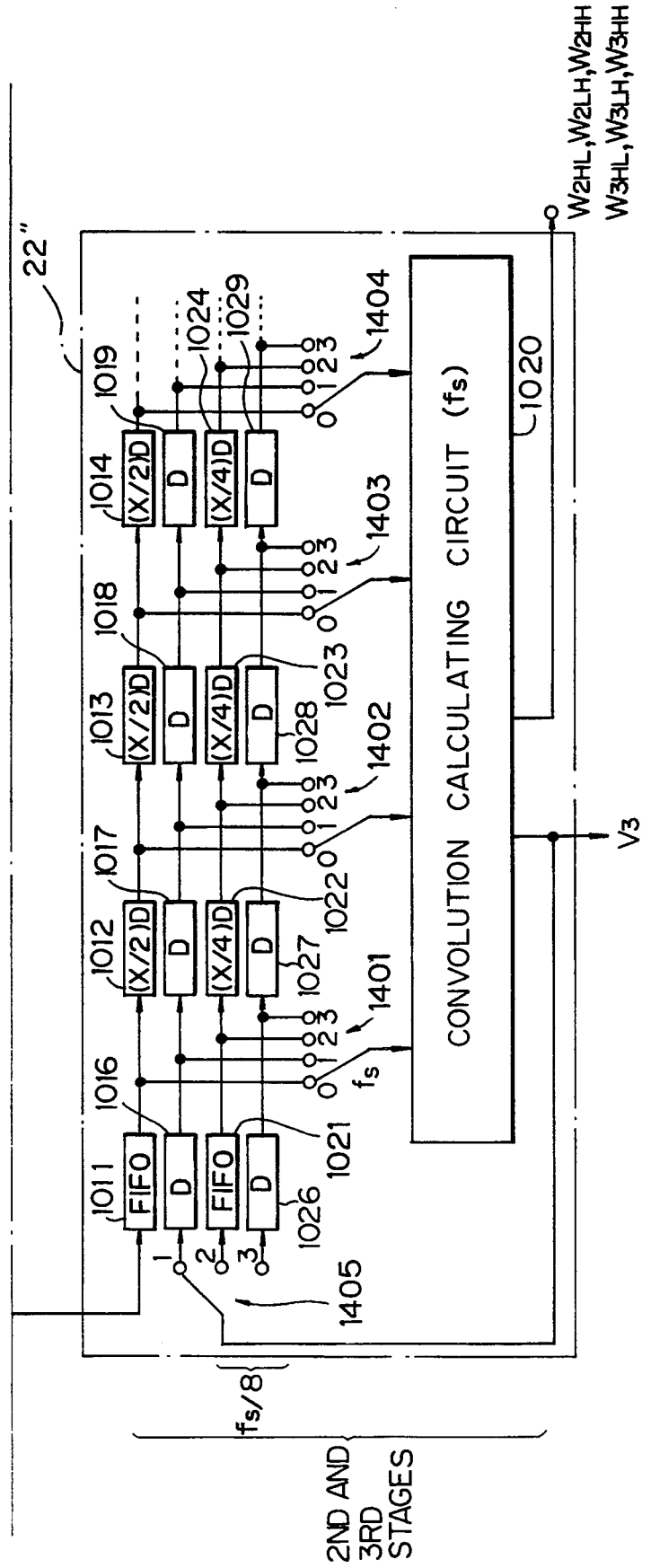
Figure 17:
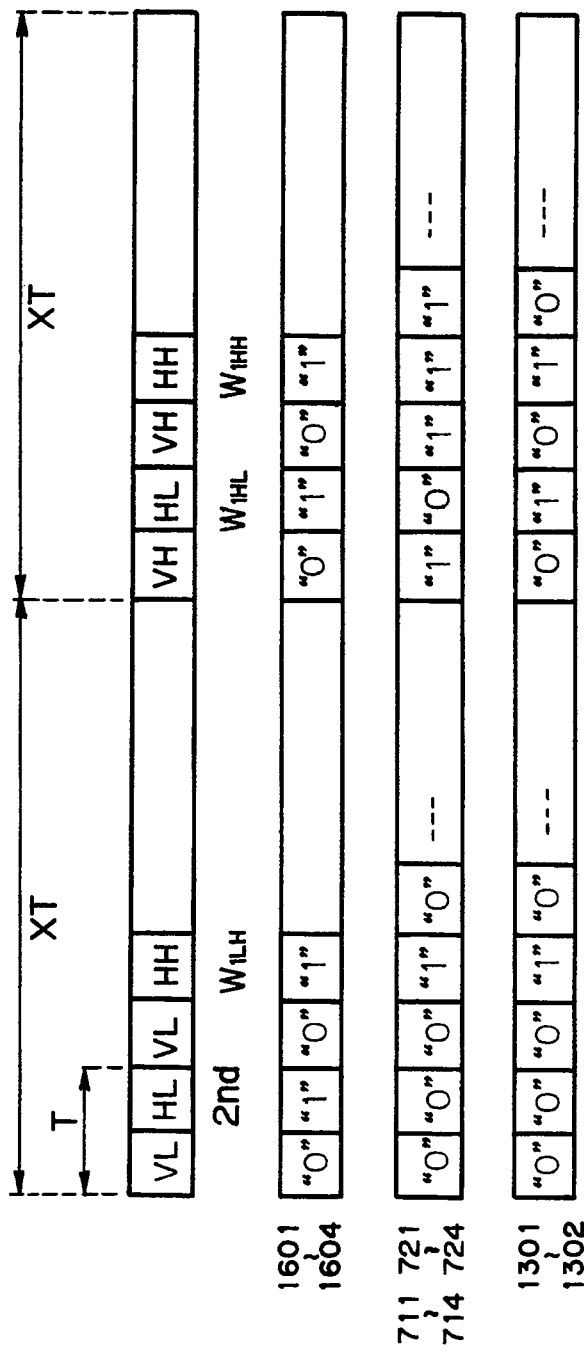
FIG. 17 is a timing diagram for explaining the operation of the circuit of FIG. 16.

In FIG. 16, which illustrates a fifth embodiment of the present invention, only two convolution calculating circuits are provided. That is, the two-band analysis filter circuits 21' A and 21' B of FIG. 14 are combined to form a two-band analysis filter circuit 21' The convolution calculating circuit 1010 of the two-band analysis filter circuit 21' is operated at the frequency $2f_s$. In the two-band analysis filter circuit 21', selectors 1601 to 1604 are provided to change a vertical subband filtering operation from a horizontal subband filtering operation and vice versa. For example, when carrying out a first stage of four-band analysis filter operation, the position of the selectors 1601 to 1604 is made "0" to operate the convolution calculation circuit 1010 for a vertical subband filtering operation, and the position of the selectors 1601 to 1604 is made "1" to operate the convolution calculation circuit 1010 for a horizontal subband filtering operation, as shown in FIG. 17. In this case, the circuits as illustrated in FIGS. 13A and 13B are applied to the convolution calculating circuit 1010 of FIG. 16, and in this case, the positions of the selectors 711 to 714, the selectors 721 to 724 and the selectors 1301 and 1302 are changed as shown in FIG. 17. Note that the two-band analysis filter circuit 22" is operated as shown in FIG. 15.

Thus, according to the wavelet conversion apparatus of FIG. 16, the number of convolution calculating circuits is further reduced as compared with those of FIGS. 10 and 14.

As explained above, generally, in the N stage two-dimensional wavelet apparatus, the first stage is operated at frequency $2f_s$, and the N-th stage (N=2, 3, ... ) is operated at a frequency $f_s/4^{N-1}$. In this case, $$2f_s \text{ (1st stage)} f_s/4 \text{ (2nd stage)} + f_s/8 \text{ (3rd stage)} \ldots +$$

$$f_s/2^{N-1} \text{ (N-th stage)} < 5/2f_s < 3f_s$$

Therefore, the entire of the first to N-th stages can be formed by only one filter module operated at the frequency $3f_s$. In other words, the entire of the first, second and third stages of FIG. 10 can be formed by only one filter module operated at the frequency $3f_s$, which is explained below.

Figure 18:
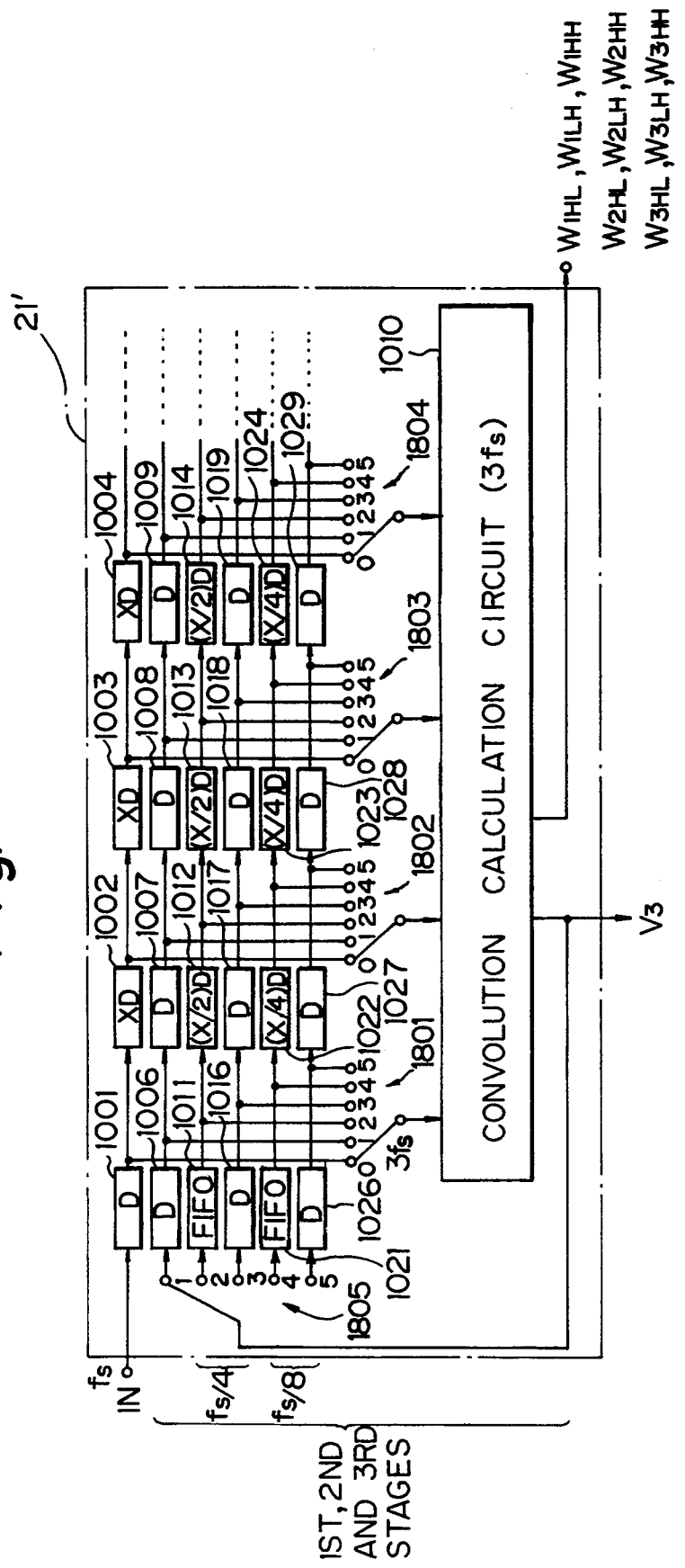
FIG. 18 a block diagram illustrating a sixth embodiment of wavelet transform apparatus according to the present invention.
Figure 19:
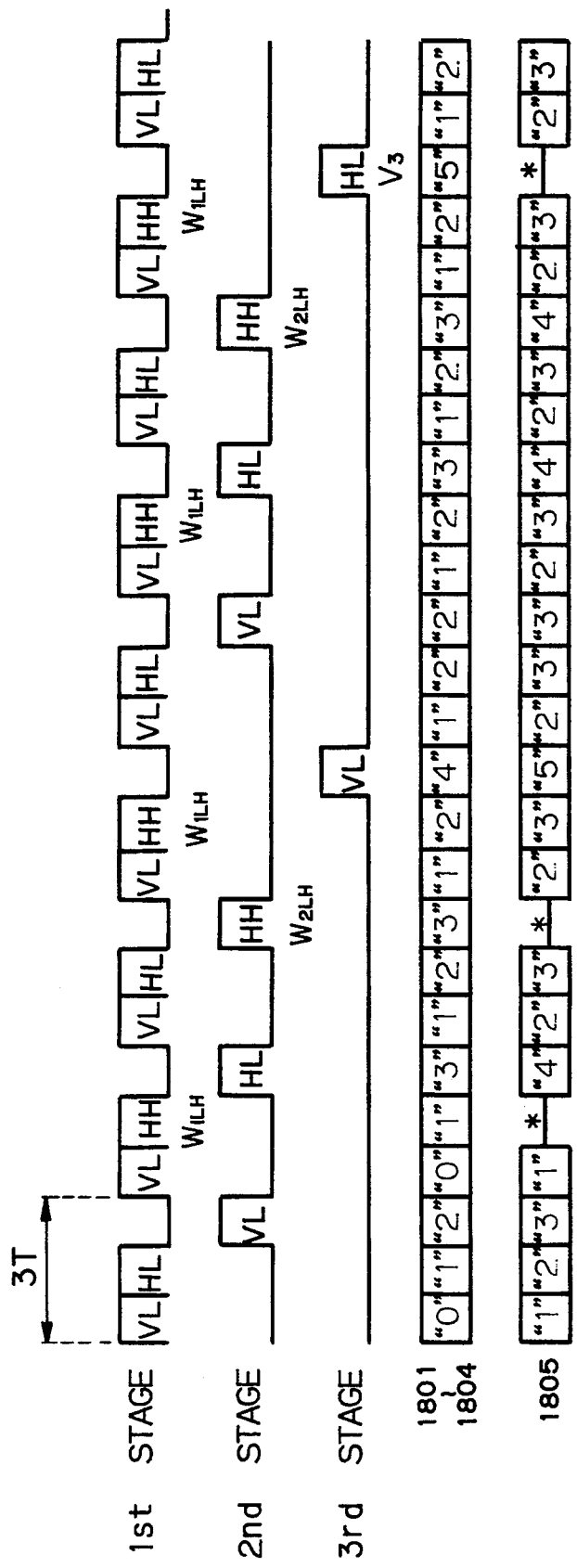
FIG. 19 is a timing diagram for explaining the operation of the circuit of FIG. 18.

In FIG. 18, which illustrates a sixth embodiment of the present invention, only one convolution calculating circuit operated at the frequency $3f_s$ is provided. That is, all the two-band analysis filter circuits of FIG. 10, the circuits 21' A, 21' B, and 22" of FIG. 14, or the circuits 21' and 22" of FIG. 16 are combined to form a sigle two-band analysis filter circuit; 21'. In order to switch vertical and horizontal subband filtering operations and stages of four-band analysis filter operations, selectors 1801 to 1805 are provided. For example, when carrying out a first stage of four-band analysis filter operation, the positions of the selectors 1801 to 1804 are made "0" and the selector 1805 is made "1" to operate the convolution calculation circuit 1010 for a first-stage vertical subband filtering operation, and the position of the selectors 1801 to 1804 are made "1" and the position of the selector 1805 is made "2" to operate the convolution calculation circuit 1010 for a first-stage horizontal subband filtering operation, as shown in FIG. 19. Also, when carrying out a second stage of four-band analysis filter operation, the positions of the selectors 1801 to 1804 are made "2" and the position of the selector 1805 is made "3" to operate the convolution calculation circuit 1010 for a second-stage horizontal subband filtering operation, as shown in FIG. 19. When carrying out a third stage of four-band analysis filter operation, the positions of the selectors 1801 to 1804 are made "4" and the position of the selector is made "5" to operate the convolution calculation circuit 1010 for a third-stage vertical subband filtering operation, and the positions of the selectors 1801 to 1804 are made "5" and the position of the selector 1805 is not in a selected state to operate the convolution calculation circuit 1010 for a third-stage horizontal subband filtering operation, as shown in FIG. 19.

Thus, according to the wavelet transform apparatus of FIG. 18, the number of convolution calculating circuits is further reduced as compared with those of FIGS. 10, 14 and 16.

Figure 20:
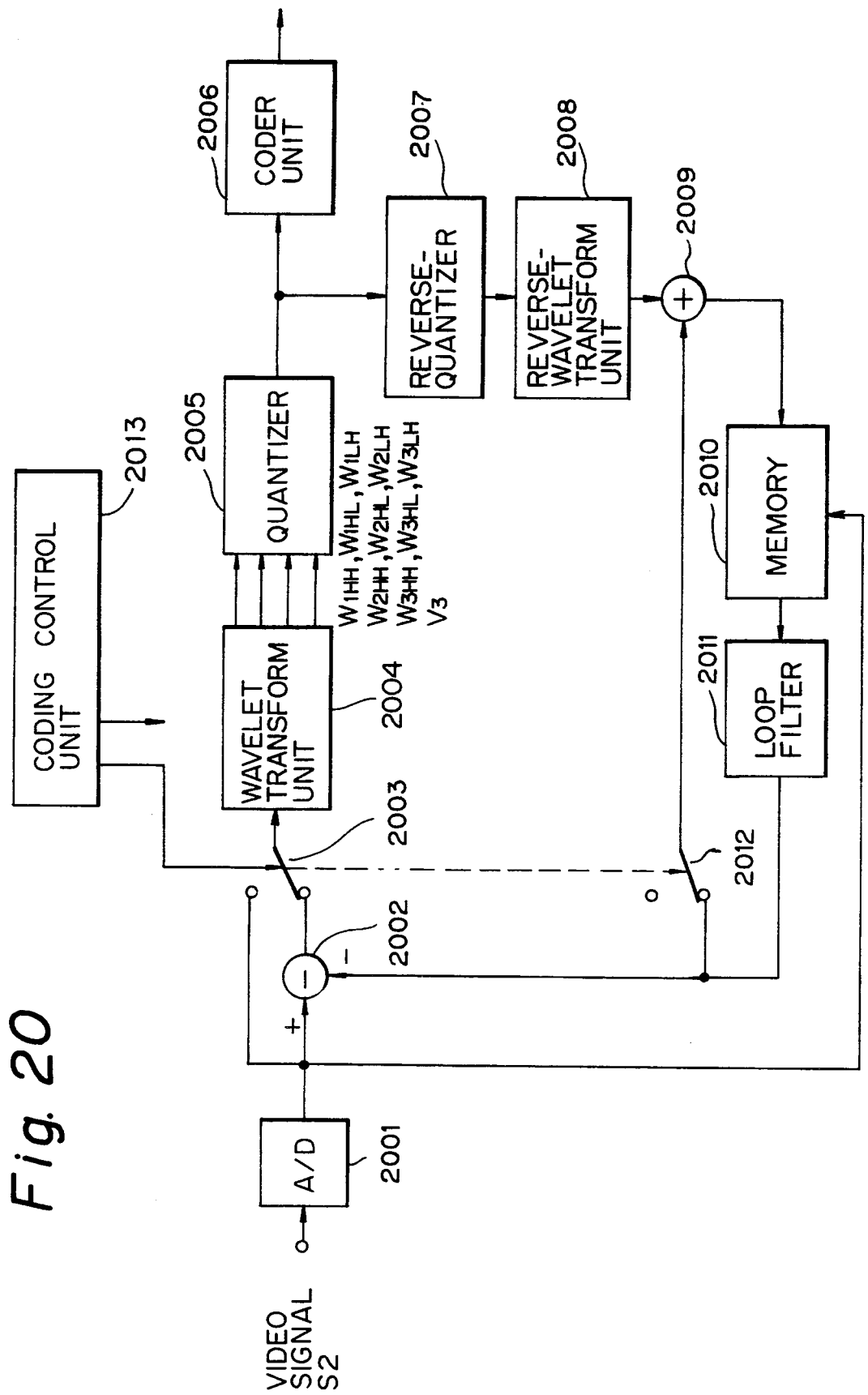
FIG. 20 is a block circuit illustrating a two-dimensional coder to which the two-dimensional wavelet transform apparatuses of FIGS. 10, 14, 16, 18 are applied.

The wavelet transform apparatus of FIGS. 10, 14, 16, or 18 is applied to a coder as illustrated in FIG. 20. In FIG. 20, reference numeral 2001 designates an analog/digital (A/D) converter for performing an A/D conversion upon a two-dimensional signal such as a video signal S2. First, a digital output signal of a plurality of bits of the A/D converter 2001 bypasses a subtractor 2002 and is supplied by a switch 2003 directly to a wavelet transform unit 2004 which has the same configuration as the wavelet transform apparatus of FIGS. 10, 14, 16 or 18. As a result, the wavelet transform unit 2004 divides the frequency band space of the input signal IN thereof into ten frequency band spaces $W_{1HH}$, $W_{1HL}$, $W_{1LH}$, $W_{2HH}$, $W_{2HL}$, $W_{2LH}$, $W_{3HH}$, $W_{3HL}$, $W_{3LH}$ and $V_3$, as explained above. Then, the components $W_{1HH}$, $W_{1HL}$, $W_{1LH}$, $W_{2HH}$, $W_{2HL}$, $W_{2LH}$, $W_{3HH}$, $W_{3HL}$, $W_{3LH}$ and $V_3$ are quantized by a quantizer 2005, and Huffman coding or the like is performed thereon by a coder unit 2006. Coded data is transmitted via a transmission line or the like. On the other hand, in order to reduce data of transmission, a Loop comprised of a reverse-quantizer 2007. a reverse-wavelet transform unit 2007, an adder 2009, a memory 2010 for storing one frame of picture elements, and a digital loop filter 2011 is provided between the output of the quantizer 2005 and the subtractor 2002. That is, usually, a difference in the output data of the A/D converter 2001 and recovered data by the reverse-quantizer 2007, the reverse-wavelet convolution unit 2008, the memory 2010, and the digital loop filter 2011 is supplied to the wavelet transform unit 2004. In this case, the output signal of the digital loop filter 2011 is fed back via a switch 2012 and the adder 2009 to the input of the memory 2010. However, at predetermined time intervals, the output signal of the A/D converter 2001 is supplied directly to the wavelet transform unit 2004, thus carrying out motion compensation. In this case, the memory 2010 is renewed by the output signal of the A/D converter 2001. Reference numeral 2013 designates a coding control unit for controlling the entire system of FIG. 20. For example, the coding control unit 2013 supplies clock signals T, 2T, 4T, 8T and the like to the wavelet transform unit 2004.

In the two-dimensional wavelet transform apparatuses of FIGS. 10, 14, 16 and 18, although a horizontal subband filtering operation is carried out after a vertical subband filtering operation is carried out, it is possible to carry out a vertical subband filtering operation after a horizontal subband filtering operation is carried out.

Also, in the above-mentioned embodiments, although the wavelet transform apparatus for three-stage subband filtering operations is exemplified, the present invention can be applied to wavelet transform apparatus for carrying out N-stages of subband filtering operations ($N \geq 4$). Also, the number of delay units and the number of series of delay units can be voluntarily decided as occasion demands. Further, various modification may be made without departing from the scope of the invention as defined in the appended claims.

As explained above, according to the present invention, since downsamplers are not provided and in addition, the number of two-band analysis filter circuits, i.e., the number of convolution calculating circuits is educed, the wavelet transform apparatus can be small in size.

I claim:

1. A wavelet transform apparatus for a one-dimensional signal, comprising:

N ($N=2,3, \ldots$)-stages of two-band analysis filter circuits, each having a series of delay units for receiving a signal at a predetermined clock rate and a convolution calculating circuit for performing a convolution upon outputs of said delay units with predetermined high and low frequency filtering coefficients and summing them to generate high and low frequency component signals, a first stage of said two-band analysis filter circuits receiving the one-dimensional signal, the low frequency component signal of the i-th ($i=1,2, \ldots, N-1$) stage of said two-band analysis filter circuits being input to the delay units of the (i+1)-th stage of said two-band analysis filter circuits, at least two adjacent two-band analysis filter circuits having a common convolution calculating circuit; and first selector means, connected between the delay units of said at least two adjacent two-band analysis filter circuits and the common convolution calculating circuit thereof, for selectively connecting the outputs of the delay circuits of said at least two adjacent two-band analysis filter circuits to the common convolution calculating circuit, thereby converting the one-dimensional signal into the high frequency component signals of the first to (N−1)-th stages of said two-band analysis filter circuits and the low frequency component signal of the N-th stage of said two-band analysis filter circuits.

2. A wavelet transform apparatus as set forth in claim 1, wherein the common convolution calculating circuit of said at least two adjacent two-band analysis filter circuits comprises:

second selector means, connected to said first selector means, for transferring output values of said first selector means by one location;

a plurality of multipliers, connected to said second selector means, for multiplying output values of said second selector means by the predetermined high frequency component coefficients and the predetermined low frequency component coefficients, selectively;

an adder, connected to said multipliers, for summing output signals of said multipliers;

a selector, connected to said adder, for switchably outputting adder output signal of said adder at two output terminals thereof, thereby splitting the adder output signal of said adder into a corresponding high and low frequency component signals.

3. A wavelet transform apparatus as set forth in claim 1, wherein the common convolution calculating circuit of said at least two adjacent two-band analysis filter circuits comprises:

second selector means, connected to said first selector means, for reversing a sequence of outputs from said first selector means;

a plurality of multipliers, connected to said second selector means, for multiplying output values of said second selector means by one set of the predetermined high frequency component coefficients or the predetermined low frequency component coefficients;

an adder, connected to said multipliers, for summing and subtracting output signals of said multipliers, selectively;

a selector, connected to said adder, for switchably outputting an adder output signal of said adder at two output terminals thereof, thereby splitting the adder output signal of said adder into a corresponding high and low frequency component signals.

4. A wavelet transform apparatus as set forth in claim 1, wherein the common convolution calculating circuit of said at least two adjacent two-band analysis filter circuits comprises:

a plurality of first multipliers, connected to said first selector means, for multiplying output values provided from said first selector means by the predetermined high frequency filtering coefficients;

a first adder, connected to said first multipliers, for summing output signals provided from said first multipliers, to generate a corresponding high frequency component signal;

a plurality of second multipliers, connected to said first selector means, for multiplying the output values provided from said first selector means by the predetermined low frequency filtering coefficients; and a second adder, connected to said second multipliers, for summing output signals provided from said first multipliers to generate a corresponding low frequency component signal.

5. A wavelet transform apparatus for a one-dimensional signal, comprising:

a first two-band analysis filter circuit for performing a first two-band analysis filter operation upon the one-dimensional signal, said first two-band analysis filter circuit having a series of M first delay units ($M=1,2, \ldots$) for receiving the one-dimensional signal at a first clock rate and a first convolution calculating circuit for performing a convolution upon outputs of said first delay units with predetermined high and low frequency filtering coefficients to generate a first high frequency component signal and a first low frequency component signal; and a second two-band analysis filter circuit, connected to said first two-band analysis filter circuit, for performing second to N-th ($N=2,3, \ldots$) two-band analysis filter operations upon the one-dimensional signal, said second two-band analysis filter circuit comprising:

second to N-th series of M delay units, each of said M delay units being clocked at second to N-th clock rates, respectively;

M first selectors, connected to said second to N-th series of M delay units, each for selecting one delay unit among said second to N-th series of M delay units; and a second convolution calculating circuit, connected to said M first selectors, for performing convolutions upon outputs from said M first selectors with the predetermined high and low frequency filtering coefficients to generate second to N-th high frequency component signals and second to N-th low frequency component signals, said first series of M delay units receiving the one-dimensional signal, said second to N-th series of M delay units receiving the first to (N−1)-th low frequency components, respectively, thereby converting the one-dimensional signal into the high frequency component signal of said first two-band analysis filter circuit and the second to N-th high frequency component signals and the N-th low frequency component signal of said second two-band analysis filter circuit.

6. A wavelet transform apparatus as set forth in claim 5, wherein said first convolution calculating circuit comprises:

M first multipliers, connected to said M first delay units, for multiplying output values of said M first delay units with the predetermined high frequency filtering coefficients;

a first adder, connected to said M first multipliers, for summing output signals provided from said M first multipliers to generate the first high frequency component signal;

a plurality of second multipliers, connected to said M first delay units, for multiplying the output values of said M first delay units with the predetermined low frequency filtering coefficients; and a second adder, connected to said second multipliers, for summing output signals provided from said second multipliers to generate the first low frequency component signal.

7. A wavelet transform apparatus as set forth in claim 5, wherein said first convolution calculating circuit comprises:

M second selectors, connected to said first delay units, for transferring the output values of said first delay units by one location;

M multipliers, connected to said M second selectors for multiplying output values of said M second selectors by the predetermined high frequency component coefficients and the predetermined low frequency component coefficients, selectively;

an adder, connected to said M multipliers, for summing output signals of said M multipliers;

a third selector, connected to said adder, for switchably outputting an adder output signal of said adder at two output terminals thereof, thereby splitting the adder output signal of said adder into the first high frequency component signal and the first low frequency component signal.

8. A wavelet transform apparatus as set forth in claim 5, wherein said first convolution calculating circuit comprises:

M second selectors, connected to said M first delay units, for reversing a sequence of outputs from said first delay units;

M multipliers, connected to said M second selectors, for multiplying output values of said M second selectors by one set of the predetermined high frequency component coefficients or the predetermined low frequency component coefficients;

an adder, connected to said M multipliers, for summing output signals of said M multipliers;

a third selector, connected to said adder, for switchably outputting an adder output signal of said adder at two output terminals thereof, thereby splitting the adder output signal of said adder into the first high frequency component signal and the first low frequency component signal.

9. A wavelet transform apparatus as set forth in claim 5, wherein said second convolution calculating circuit comprises:

M first multipliers, connected to said M first selectors, for multiplying output values of said M first selectors by the predetermined high frequency filtering coefficients;

a first adder, connected to said M first multipliers, for summing output signals provided from said M first multipliers to generate the second to N-th high frequency component signals;

a plurality of M second multipliers, connected to said M first selectors, for multiplying the output values of said M first selectors with the predetermined low frequency filtering coefficients; and a second adder, connected to said M second multipliers, for summing output signals provided from said M second multipliers to generate the second to N-th low frequency component signals.

10. A wavelet transform apparatus as set forth in claim 5, wherein said second convolution calculating circuit comprises:

M second selectors, connected to said M first selectors, for transferring the output values of said M first selectors by one location;

M multipliers, connected to said M second selectors, for multiplying output values of said M second selectors by the predetermined high frequency component coefficients and the predetermined low frequency component coefficients, selectively;

an adder, connected to said M multipliers, for summing output signals of said M multipliers;

a third selector, connected to said adder, for switchably outputting an adder output signal of said adder at two output terminals thereof, thereby splitting the adder output signal of said adder into the second to N-th high frequency component signals and second to N-th low frequency component signals.

11. A wavelet transform apparatus as set forth in claim 5, wherein said second convolution calculating circuit comprises:

M second selectors, connected to said M first selectors, for reversing the outputs of said M first selectors;

M multipliers, connected to said M second selectors, for multiplying output values of said M second selectors by one set of the predetermined high frequency component coefficients or the predetermined low frequency component coefficients;

an adder, connected to said M multipliers, for summing and subtracting output signals of said M multipliers, selectively;

a third selector, connected to said adder, for switchably outputting an adder output signal of said adder at two output terminals thereof, thereby splitting the adder output signal of said adder into the second to N-th high frequency component signals and second to N-th low frequency component signal.

12. A wavelet transform apparatus as set forth in claim 5, wherein the (i+1)-th clock rate is half of the i-th clock rate (i=1,2, ... ).

13. A wavelet transform apparatus for a one-dimensional signal, comprising:
  first to N-th (N=2,3, ... ) series of M delay units (M=1,2, ... ) each of said M delay units being clocked at first to N-th clock rates, respectively,
  M first selectors, connected to said first to N-th series of M delay units, each for selecting one delay unit among said first to N-th series of M delay units; and
  a convolution calculating circuit, connected to said M first selectors, for performing convolutions upon outputs of said M first selectors with predetermined high frequency filtering coefficients and predetermined low frequency filtering coefficients to generate first to N-th high frequency component signals and first to N-th low frequency component signals,
  said first series of M delay units receiving the one-dimensional signal, said second to N-th series of M delay units receiving the first to (N−1)-th low frequency components, respectively,
  thereby converting the one-dimensional signal into the first to N-th high frequency component signals and the N-th low frequency component signal.

14. A wavelet transform apparatus as set forth in claim 13, wherein said convolution calculating circuit comprises:
  M first multipliers, connected to said M first selectors, for multiplying output values of said M first selectors with the predetermined high frequency filtering coefficients;
  a first adder, connected to said M first multipliers, for summing output signals provided from said M first multipliers, to generate the first to N-th high frequency component signals;
  M second multipliers, connected to said M first selectors, for multiplying output values of said M first selectors with the predetermined low frequency filtering coefficients; and
  a second adder, connected to said M second multipliers, for summing output signals provided from said M second multipliers to generate the first to N-th low frequency component signals.

15. A wavelet transform apparatus as set forth in claim 13, wherein said convolution calculating circuit comprises:
  M second selectors, connected to said M first selectors, for transferring the output values of said M first selectors by one location;
  M multipliers, connected to said M second selectors, for multiplying output values of said M second selectors by the predetermined high frequency component coefficients and the predetermined low frequency component coefficients, selectively;
  an adder, connected to said M multipliers, for summing output signals of said M multipliers;
  a third selector, connected to said adder, for switchably outputting an adder output signal of said adder at two output terminals thereof, thereby splitting the adder output signal of said adder into the first to N-th high frequency component signals and the first to N-th low frequency component signals.

16. A wavelet transform apparatus as set forth in claim 13, wherein said convolution calculating circuit comprises:
  M second selectors, connected to said M first selectors, for reversing a sequence of the outputs of said M first selectors;
  M multipliers, connected to said M second selectors, for multiplying output values of said M second selectors by one set of the predetermined high frequency component coefficients or the predetermined low frequency component coefficients;
  an adder, connected to said M multipliers, for summing and subtracting output signals of said M multipliers, selectively;
  a third selector, connected to said adder, for switchably outputting an adder output signal of said adder at two output terminals thereof, thereby splitting the adder output signal of said adder into the first to N-th high frequency component signals and the first to N-th low frequency component signal.

17. A wavelet transform apparatus as set forth in claim 13, wherein the (i+1)-th clock rate is half of the i-th clock rate (i=1,2, ... ).

18. A wavelet transform apparatus for a two-dimensional input signal, comprising N(N=2,3, ... ) stages of calculating circuits, each for performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical high frequency component signal and a horizontal low vertical high frequency component signal, and performing a second horizontal two-band analysis filter operation upon the vertical low frequency component signal to generate a horizontal high vertical low frequency component signal and a horizontal low vertical low frequency component signal, the first stage of said calculating circuits receiving the two-dimensional input signal, the horizontal low vertical low frequency component signal of the i-th (i=1,2,..,N−1) stage of said calculating circuits being input to the (i+1)-th stage thereof,
  at least one of said N stages of calculating circuits comprising:
  a series of first delay units for receiving the input signal or the horizontal low frequency vertical low frequency component signal from a pre stage calculating circuit clocked at a clock rate;
  a first convolution calculating circuit, connected to said series of first delay units, for performing convolutions upon outputs of the first delay units to generate the vertical high frequency component signal and the vertical low frequency component signal alternately;
  a series of second delay units, connected to said first convolution circuit, for receiving the vertical high frequency component signal and the vertical low frequency component signal therefrom, clocked at the clock rate; and
  a second convolution calculating circuit, connected to said series of second delay units, for performing convolutions upon outputs of the second delay units to generate the horizontal high vertical high frequency component signal, the horizontal high vertical low frequency component signal, the horizontal low vertical high frequency component signal, and the horizontal low vertical low frequency component signal, alternately, and wherein said first convolution calculating circuit comprises:

a plurality of selectors, connected to said series of first delay units, for transferring the outputs of said first delay units by one location;

a plurality of multipliers, connected to said selectors, for multiplying output values of said selectors by predetermined high frequency filtering coefficients and predetermined low frequency filtering coefficients, selectively; and an adder, connected to said multipliers, for summing output signals of said multipliers.

19. A wavelet transform apparatus for a two-dimensional input signal, comprising N(N=2,3, ...) stages of calculating circuits, each for performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical high frequency component signal and a horizontal low vertical high frequency component signal, and performing a second horizontal two-band analysis filter operation upon the vertical low frequency component signal to generate a horizontal high vertical low frequency component signal and a horizontal low vertical low frequency component signal, the first stage of said calculating circuits receiving the two-dimensional input signal, the horizontal low vertical low frequency component signal of the i-th (i=1,2, ..., N−1) stage of said calculating circuits being input to the (i+1)-th stage thereof, at least one of said N stages of calculating circuits comprising:

a series of first delay units for receiving the input signal or the horizontal low frequency vertical low frequency component signal from a pre stage calculating circuit clocked at a clock rate;

a first convolution calculating circuit, connected to said series of first delay units, for performinq convolutions upon outputs of the first delay units to generate the vertical high frequency component signal and the vertical low frequency component signal alternately;

a series of second delay units, connected to said first convolution circuit, for receiving the vertical high frequency component signal and the vertical low frequency component signal therefrom, clocked at the clock rate; and a second convolution calculating circuit, connected to said series of second delay units, for performing convolutions upon outputs of the second delay units to generate the horizontal high vertical high frequency component signal, the horizontal high vertical low frequency component signal, the horizontal low vertical high frequency component signal, and the horizontal low vertical low frequency component signal, alternately, and wherein said first convolution calculating circuit comprises:

a plurality of selectors, connected to said first delay units, for reversing a sequence of the outputs of said series of first delay units;

a plurality of multipliers, connected to said selectors, for multiplying output values of said selectors by one set of a set of predetermined high frequency filtering coefficients and a set of predetermined low frequency filtering coefficients; and an adder, connected to said multipliers, for summing output signals of said multipliers.

20. A wavelet transform apparatus for a two-dimensional input signal, comprising N(N=2,3, ...) stages of calculating circuits, each for performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical high frequency component signal and a horizontal low vertical high frequency component signal, and performing a second horizontal two-band analysis filter operation upon the vertical low frequency component signal to generate a horizontal high vertical low frequency component signal and a horizontal low vertical low frequency component signal, the first stage of said calculating circuits receiving the two-dimensional input signal, the horizontal low vertical low frequency component signal of the i-th (i=1,2, ..., N−1) stage of said calculating circuits being input to the (i+1)-th stage thereof, at least one of said N stages of calculating circuits comprising:

a series of first delay units for receiving the input signal or the horizontal low frequency vertical low frequency component signal from a pre stage calculating circuit clocked at a clock rate;

a first convolution calculating circuit, connected to said series of first delay units, for performing convolutions upon outputs of the first delay units to generate the vertical high frequency component signal and the vertical low frequency component signal alternately;

a series of second delay units, connected to said first convolution circuit, for receiving the vertical high frequency component signal and the vertical low frequency component signal therefrom, clocked at the clock rate; and a second convolution calculating circuit, connected to said series of second delay units, for performing convolutions upon outputs of the second delay units to generate the horizontal high vertical high frequency component signal, the horizontal high vertical low frequency component signal, the horizontal low vertical high frequency component signal, and the horizontal low vertical low frequency component signal, alternately, wherein said second convolution calculating circuit comprises:

a plurality of first selectors, connected to said series of second delay units, for transferring the outputs of said series of second delay units by one location;

a plurality of multipliers, connected to said series of first selectors, for multiplying output values of said series of first selectors by predetermined high frequency filtering coefficients and predetermined low frequency filtering coefficients, selectively;

an adder, connected to said multipliers, for summing output signals of said multipliers to alternately output a set of the horizontal high vertical high frequency component signal and the horizontal high vertical low frequency component signal and a set of the horizontal low vertical high frequency component signal and the horizontal low vertical low frequency component signal at its terminal; and a selector, connected to said adder for switchably outputting a set of the horizontal high vertical high frequency component signal, the horizontal high vertical low frequency component signal and the horizontal low vertical high frequency component signal, and the horizontal low vertical low frequency component signal at two output terminals of said selector.

21. A wavelet transform apparatus for a two-dimensional input signal, comprising N(N=2,3, ... ) stages of calculating circuits, each for performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical hiqh frequency component signal and a horizontal low vertical high frequency component signal, and performing a second horizontal two-band analysis filter operation upon the vertical low frequency component signal to generate a horizontal high vertical low frequency component signal and a horizontal low vertical low frequency component signal, the first stage of said calculating circuits receiving the two-dimensional input signal, the horizontal low vertical low frequency component signal of the i-th (i=1,2, ... , N−1) stage of said calculating circuits being input to the (i+1)-th stage thereof, at least one of said N stages of calculating circuits comprising:

a series of first delay units for receiving the input signal or the horizontal low frequency vertical low frequency component signal from a pre stage calculating circuit clocked at a clock rate;

a first convolution calculating circuit, connected to said series of first delay units, for performing convolutions upon outputs of the first delay units to generate the vertical high frequency component signal and the vertical low frequency component signal alternately;

a series of second delay units, connected to said first convolution circuit, for receiving the vertical high frequency component signal and the vertical low frequency component signal therefrom, clocked at the clock rate; and a second convolution calculating circuit, connected to said series of second delay units, for performinq convolutions upon outputs of the second delay units to generate the horizontal high vertical high frequency component signal, the horizontal high vertical low frequency component signal, the horizontal low vertical high frequency component signal, and the horizontal low vertical low frequency component signal, alternately, wherein said second convolution calculating circuit comprises:

a plurality of first selectors, connected to said series of second delay units, for reversing a sequence of the outputs of said series of second delay units;

a plurality of multipliers, connected to said first selectors, for multiplying output values of said first selectors by one set of a set of predetermined high frequency filtering coefficients and a set of predetermined low frequency filtering coefficients;

an adder, connected to said multipliers, for summing and subtracting output signals of said multipliers, selectively, to alternately output a set of the horizontal high vertical high frequency component signal and the horizontal high vertical low frequency component signal and a set of the horizontal low vertical high frequency component signal and the horizontal low vertical low frequency component signal at its output terminal; and a selector, connected to said adder for switchably outputting a set of the horizontal high vertical high frequency component signal, the horizontal high vertical low frequency component signal and the horizontal low vertical high frequency component signal, and the horizontal low vertical low frequency component signal at two output terminals of said selector.

22. A wavelet transform apparatus for a two-dimensional input signal, comprising N (N=2,3, ... ) stages of calculating circuits, each for performing a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency component signal, and performing a second vertical two-band analysis filter operation upon the horizontal low frequency component signal to generate a vertical high horizontal low frequency component signal and a vertical low horizontal low frequency component signal, the first stage of said calculating circuits receiving the two-dimensional signal, the vertical low horizontal low frequency component signal of the i-th (i=1,2, ... , (N−1) stage of said calculating circuits being input to the (i+1)-th stage thereof, at least one of said N stages of calculating circuits comprising:

a series of first delay units for receiving the input signal or the vertical low frequency horizontal low frequency component signal from a pre stage calculating circuit clocked at a clock rate;

a first convolution calculating circuit, connected to said series of first delay units, for performing convolutions upon outputs of said first delay units to generate the horizontal high frequency component signal and the horizontal low frequency component signal alternately;

a series of second delay units, connected to said first convolution circuit, for receiving the horizontal high frequency component signal and the horizontal low frequency component signal therefrom, clocked at the clock rate; and a second convolution calculating circuit, connected to said series of second delay units, for performing convolutions upon outputs of said second delay units to generate the vertical high horizontal high frequency component signal, the vertical high horizontal low frequency component signal, the vertical low horizontal high frequency component signal, and the vertical low horizontal low frequency component signal, alternately, wherein said first convolution calculating circuit comprises:

a plurality of selectors, connected to said series of first delay units, for transferring the outputs of said first delay units by one location;

a plurality of multipliers, connected to said selectors, for multiplying output values of said selectors by predetermined high frequency filtering coefficients and predetermined low frequency filtering coefficients, selectively; and an adder, connected to said multipliers, for summing output signals of said multipliers.

23. A wavelet transform apparatus for a two-dimensional input signal, comprising N (N=2,3,...) stages of calculating circuits, each for performing a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency Component signal, and performing a second vertical two-band analysis filter operation upon the horizontal low frequency component signal to generate a vertical high horizontal low frequency component signal and a vertical low horizontal low frequency component signal, the first stage of said calculating circuits receiving the two-dimensional signal, the vertical low horizontal low frequency component siqnal of the i-th (i=1,2, ..., N−1) stage of said calculating circuits being input to the (i+1)-th stage thereof, at least one of said N stages of calculating circuits comprising:

a series of first delay units for receivinq the input signal or the vertical low frequency horizontal low frequency component signal from a pre stage calculating circuit clocked at a clock rate;

a first convolution calculating circuit, connected to said series of first delay units, for performing convolutions upon outputs of said first delay units to generate the horizontal high frequency component signal and the horizontal low frequency component signal alternately;

a series of second delay units, connected to said first convolution circuit, for receiving the horizontal high frequency component signal and the horizontal low frequency component signal therefrom, clocked at the clock rate; and a second convolution calculating circuit, connected to said series of second delay units, for performing convolutions upon outputs of said second delay units to generate the vertical high horizontal high frequency component signal, the vertical high horizontal low frequency component signal, the vertical low horizontal high frequency component signal, and the vertical low horizontal low frequency component signal, alternately, wherein said first convolution calculating circuit comprises:

a plurality of selectors, connected to said first delay units, for reversing a sequence of the outputs of said series of first delay units;

a plurality of multipliers, connected to said selectors, for multiplying output values of said selectors by one set of a set of predetermined high frequency filtering coefficients and a set of predetermined low frequency filtering coefficients; and an adder, connected to said multipliers, for summing output signals of said multipliers.

24. A wavelet transform apparatus for a two-dimensional input signal, comprising N (N=2,3,...) stages of calculating circuits, each for performing a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency component signal, and performing a second vertical two-band analysis filter operation upon the horizontal low frequency component signal to generate a vertical high horizontal low frequency component signal and a vertical low horizontal low frequency component signal, the first stage of said calculating circuits receiving the two-dimensional signal, the vertical low horizontal low frequency component signal of the i-th (i=1,2, ..., N−1) stage of said calculating circuits being input to the (i+1)-th stage thereof, at least one of said N stages of calculating circuits comprising:

a series of first delay units for receiving the input signal or the vertical low frequency horizontal low frequency component signal from a pre stage calculating circuit clocked at a clock rate;

a first convolution calculating circuit, connected to said series of first delay units, for performing convolutions upon outputs of said first delay units to generate the horizontal high frequency component signal and the horizontal low frequency component signal alternately;

a series of second delay units, connected to said first convolution circuit, for receiving the horizontal high frequency component signal and the horizontal low frequency component signal therefrom, clocked at the clock rate; and a second convolution calculating circuits, connected to said series of second delay units, for performing convolutions upon outputs of said second delay units to generate the vertical high horizontal high frequency component siqnal, the vertical high horizontal low frequency component signal, the vertical low horizontal hiqh frequency component signal, and the vertical low horizontal low frequency component signal, alternately, wherein said second convolution calculating circuit comprises:

a plurality of first selectors, connected to said series of second delay units, for transferring the outputs of said series of second delay units by one location;

a plurality of multipliers, connected to said series of first selectors, for multiplying output values of said series of first selectors by predetermined high frequency filtering coefficients and predetermined low frequency filtering coefficients, selectively;

an adder, connected to said multipliers, for summing output signals of said multipliers to alternately output a set of the vertical high horizontal high frequency component signal and the vertical high horizontal low frequency component signal and a set of the vertical low horizontal high frequency component signal and the vertical low horizontal low frequency component signal at an output terminal of said adder; and a selector, connected to said adder for switchably outputting a set of the vertical high horizontal high frequency component signal, the vertical high horizontal low frequency component signal and the vertical low horizontal high frequency component signal, and the vertical low horizontal low frequency component signal at two output terminals of said selector.

25. A wavelet transform apparatus for a two-dimensional input signal, comprising N (N=2,3,...) of calculating circuits, each for performinq a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency component signal, and performing a second vertical two-band analysis filter operation upon the horizontal low frequency component signal to generate a vertical high horizontal low frequency component signal and a vertical low horizontal low frequency component signal, the first stage of said calculating circuits receiving the two-dimensional signal, the vertical low horizontal low frequency component signal of the i-th (i=1,2, ... , N−1) stage of said calculating circuits being input to the (i+1)-th stage thereof, at least one of said N stages of calculating circuits comprising:

a series of first delay units for receiving the input signal or the vertical low frequency horizontal low frequency component signal from a pre stage calculating circuit clocked at a clock rate;

a first convolution calculating circuit, connected to said series of first delay units, for performinq convolutions upon outputs of said first delay units to generate the horizontal high frequency component signal and the horizontal low frequency component signal alternately;

a series of second delay units, connected to said first convolution circuit, for receiving the horizontal high frequency component signal and the horizontal low frequency component signal therefrom, clocked at the clock rate; and a second convolution calculating circuit, connected to said series of second delay units, for performing convolutions upon outputs of said second delay units to generate the vertical high horizontal high frequency component signal the vertical high horizontal low frequency component signal, the vertical low horizontal high freqUenCy component signal, and the vertical low horizontal low frequency component signal, alternately; wherein said second convolution calculating circuit comprises:

a plurality of first selectors, connected to said series of second delay units, for reversing a sequence of the outputs of said series of second delay units;

a plurality of multipliers, connected to said first selectors, for multiplying output values of said first selectors by one set of a set of predetermined high frequency filtering coefficients and a set of predetermined low frequency filtering coefficients;

an adder, connected to said multipliers, for summing and-subtracting output signals of said multipliers, selectively, to alternately output a set of the vertical high horizontal high frequency component signal and the vertical high horizontal low frequency component signal and a set of the vertical low horizontal high frequency component signal and the vertical low horizontal low frequency component signal at an output terminal of said adder; and a selector, connected to said adder for switchably outputting a set of the vertical high horizontal high frequency component signal, the vertical high horizontal low frequency component signal and the vertical low horizontal high frequency component signal, and the vertical low horizontal low frequency component signal at two output terminals of said selector.

26. A wavelet transform apparatus for a two-dimensional input signal having a vertical size of X and a horizontal size of Y, comprising N (N=2,3, ... ) stages of calculating circuits, each for performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical high frequency component signal and a horizontal low vertical high frequency component signal, and performing a second horizontal two-band analysis filter operation upon the vertical low frequency component signal to generate a horizontal high vertical low frequency component signal and a horizontal low vertical low frequency component signal, the first stage of said calculating circuits receiving the two-dimensional signal, the horizontal low vertical low frequency component signal of the i-th (i=1,2, ... , N−1) stage of said calculating circuits being input to the (i+1)th stage thereof, the i-th (i=1,2, ... , N) stage of said calculating circuits comprising:

a series of M (M=1,2, ... ) first delay units each having a size of X/i for receiving the input signal or the horizontal low vertical low frequency component from a pre-stage calculating circuit clocked at a first clock rate;

a series of M second delay units each having a size of 1, clocked at the first clock rate;

a convolution calculating circuit; and a plurality of M selectors, each connected between one of said first delay units and one of said second delay units and said convolution calculating circuit, said M selectors being clocked at a clock rate twice the first clock rate;

said convolution calculating circuit receiving first output signals of said series of M first delay units to perform convolutions upon said first output signals to generate the vertical high frequency component signal and the vertical low frequency component signal alternately, said series of M second delay units receiving the vertical high frequency component signal and the vertical low frequency component signal, said convolution calculating circuit receiving second output signals of said series of M second delay units to perform convolutions upon said second output signals for generating the horizontal high vertical high frequency component signal, the horizontal high vertical low frequency component signal, the horizontal low vertical high frequency component signal, and a horizontal low vertical low frequency component signal, alternately, and splitting into the set of the horizontal high vertical high frequency component signal, the horizontal high vertical low frequency component signal and the horizontal low vertical high frequency component signal, and the horizontal low vertical low frequency component signal, the clock rate of said delay units of the (i+7)-th stage being a quarter of that of the i-th stage.

27. A wavelet transform apparatus for a two-dimensional input signal having a horizontal size of X and a vertical size of Y, comprising N (N=2,3, ... ) stages of calculating circuits, each for performing a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency component signal, and performing a second vertical two-band analysis filter operation upon the horizontal low frequency component signal to generate a vertical high horizontal low frequency component signal and a vertical low horizontal low frequency component signal, the first stage of said calculating circuits receiving the two-dimensional signal, the vertical low horizontal low frequency component signal of the i-th (i=1,2, ..., N−1) stage of said calculating circuits being input to the (i+1)-th stage thereof, the i-th (i=1,2, ..., N) stage of said calculating circuits comprising:

a series of M (M=1,2, ...) first delay units each having a size of X/i for receiving the input signal or the vertical low horizontal low frequency component from a pre-stage calculating circuit clocked at a first clock rate;

a series of M second delay units each having a size of 1, clocked at the first clock rate;

a convolution calculating circuit; and a plurality of M selectors, each connected between one of said first delay units and one of said second delay units and said convolution calculating circuit, said M selectors being clocked at a clock rate twice the first clock rate;

said convolution calculating circuit receiving first output signals of said series of M first delay units to perform convolutions upon said first output signals to generate a horizontal high frequency component signal and the horizontal low frequency component signal alternately, said series of M second delay units receiving the horizontal high frequency component signal and the horizontal low frequency component signal, said convolution calculating circuit receiving second output signals of said series of M second delay units to perform convolutions upon said second output signals for generating a vertical high horizontal high frequency component signal, a vertical high horizontal low frequency component signal, a vertical low horizontal high frequency component signal, and a vertical low horizontal low frequency component signal, alternately, and splitting into the set of the vertical high horizontal high frequency component signal, the vertical high horizontal low frequency component signal and the vertical low horizontal high frequency component signal, and the vertical low horizontal low frequency component signal, the clock rate of said delay units of the (i+1)-th stage being a quarter of that of the i-th stage.

28. A wavelet transform apparatus for a two-dimensional input signal, for carrying out N (N=2,3, ...) stages of two-band analysis filter operations, each including the steps of performing a vertical two-band analysis filter operation upon a signal to generate a vertical high frequency component signal and a vertical low frequency component signal, performing a first horizontal two-band analysis filter operation upon the vertical high frequency component signal to generate a horizontal high vertical high frequency component signal and a horizontal low vertical high frequency component signal, and performing a second horizontal two-band analysis filter operation upon the vertical low frequency component signal to generate a horizontal high vertical low frequency component signal and a horizonal low vertical low frequency component signal, the first state of sad two-band analysis filter operation being performed upon the two-dimensional signal, the (i+1)-th stage of two-band analysis filter operations being performed upon the horizontal low vertical low frequency component signal obtained by the i-th (i=1,2, ..., N−1) stage thereof, comprising a circuit for carrying out at least two stages of two-band analysis filter operations, said circuit comprising:

a plurality of series of first delay units, each series of first delay units provided for a vertical two-band analysis filter operation;

a plurality of series of second delay units, each series of second delay units provided for a horizontal two-band analysis filter operation;

first selector means, connected to said series of first delay units and said series of second delay units, for selecting one series of delay units therefrom;

a convolution calculating circuit, connected to said first selector means, for performing convolutions upon outputs of one of said series of first delay units to generate the vertical high frequency component signal and the vertical low frequency component signal and for performing convolutions upon outputs of one of said series of second delay units to generate a vertical high frequency component signal and a vertical low frequency component signal; and second selector means, connected between said convolution calculating circuit and said series of first and second delay units, for transmitting an output of said convolution calculating circuit to one of said series of first and second delay units.

29. A wavelet transform apparatus as set forth in claim 28, wherein said series of first delay units include means for smoothing the stream of the signals therethrough.

30. A wavelet transform apparatus as set forth in claim 28, wherein said first convolution calculating circuit comprises:

a plurality of selectors, connected to said series of first delay units, for transferring the outputs of said first delay units by one location;

a plurality of multipliers, connected to said selectors, for multiplying output values of said selectors by predetermined high frequency filtering coefficients and predetermined low frequency filtering coefficients, selectively; and an adder, connected to said multipliers, for summing output signals of said multipliers.

31. A wavelet transform apparatus as set forth in claim 28, wherein said first convolution calculating circuit comprises:

a plurality of selectors, connected to said first delay units, for reversing a sequence of the outputs of said series of first delay units;

a plurality of multipliers, connected to said selectors, for multiplying output values of said selectors by one set of a set of predetermined high frequency filtering coefficients and a set of predetermined low frequency filtering coefficients; and an adder, connected to said multipliers, for summing output signals of said multipliers.

32. A wavelet transform apparatus as set forth in claim 28, wherein said second convolution calculating circuit comprises:

a plurality of first selectors, connected to said series of second delay units, for transferring the outputs of said series of second delay units by one location;

a plurality of multipliers, connected to said series of first selectors, for multiplying output values of said series of first selectors by predetermined high frequency filtering coefficients and predetermined low frequency filtering coefficients, selectively;

an adder, connected to said multipliers, for summing output signals of said multipliers to alternately output a set of the horizontal high vertical high frequency component Signal and the horizontal high vertical low frequency component signal and a set of the horizontal low vertical high frequency component signal and the horizontal low vertical low frequency component signal at its terminal; and a selector, connected to said adder for switchably outputting a set of the horizontal high vertical high frequency component signal, the horizontal high vertical low frequency component signal and the horizontal low vertical high frequency component signal, and the horizontal low vertical low frequency component signal at two output terminals of said selector.

33. A wavelet transform apparatus as set forth in claim 32, wherein said second convolution calculating circuit comprises:

a plurality of first selectors, connected to said series of second delay units, for reversing a sequence of the outputs of said series of second delay units;

a plurality of multipliers, connected to said first selectors, for multiplying output values of said first selectors by one set of a set of predetermined high frequency filtering coefficients and a set of predetermined low frequency filtering coefficients;

an adder, connected to said multipliers, for summing and subtracting output signals of said multipliers, selectively, to alternately output a set of the horizontal high vertical high frequency component signal and the horizontal high vertical low frequency component signal and a set of the horizontal low vertical high frequency component signal and the horizontal low vertical low frequency component signal at its output terminal; and a selector, connected to said adder for switchably outputting a set of the horizontal high vertical high frequency component signal, the horizontal high vertical low frequency component signal and the horizontal low vertical high frequency component signal, and the horizontal low vertical low frequency component signal at two output terminals of said selector.

34. A wavelet transform apparatus for a two-dimensional input signal, for carrying out N (N=2,3, ... ) stages of two-band analysis filter operations, each including the steps of performing a horizontal two-band analysis filter operation upon a signal to generate a horizontal high frequency component signal and a horizontal low frequency component signal, performing a first vertical two-band analysis filter operation upon the horizontal high frequency component signal to generate a vertical high horizontal high frequency component signal and a vertical low horizontal high frequency component signal, and performing a second vertical two-band analysis filter operation upon the horizontal low frequency component signal to generate a vertical high horizontal low frequency component signal and a vertical low horizontal low frequency component signal, the first stage of said two-band analysis filter operation being performed upon the two-dimensional signal, the (i+1)-th stage of two-band analysis filter operations being performed upon the vertical low horizontal low frequency component signal obtained by the i-th (i=1,2, ... , N−1) stage thereof, comprising a circuit for carrying out at least two stages of two-band analysis filter operations, said circuit comprising:

a plurality of series of first delay units, each series of first delay units provided for a horizontal two-band analysis filter operation;

a plurality of series of second delay units, each series of second delay units provided for a vertical two-band analysis filter operation;

first selector means, connected to said series of first delay units and said series of second delay units, for selecting one series therefrom;

a convolution calculating circuit, connected to said first selector means, for performing convolutions upon outputs of one of said series of first delay units to generate the horizontal high frequency component signal and the horizontal low frequency component signal and for performing convolutions upon outputs of one of said series of second delay units to generate a horizontal high frequency component signal and a horizonal low frequency component signal; and second selector means, connected between said convolution calculating circuit and said series of first and second delay units, for transmitting an output of said convolution calculating circuit to one of said series of first and second delay units.

35. A wavelet transform apparatus as set forth in claim 34, wherein said series of first delay units include means for smoothing the stream of the signals therethrough.

36. A wavelet transform apparatus as set forth in claim 34, wherein said first convolution calculating circuit comprises:

a plurality of selectors, connected to said series of first delay units, for transferring the outputs of said first delay units by one location;

a plurality of multipliers, connected to said selectors, for multiplying output values of said selectors by predetermined high frequency filtering coefficients and predetermined low frequency filtering coefficients, selectively; and an adder, connected to said multipliers, for summing output signals of said multipliers.

37. A wavelet transform apparatus as set forth in claim 34, wherein said first convolution calculating circuit comprises:

a plurality of selectors, connected to said first delay units, for reversing a sequence of the outputs of said series of first delay units;

a plurality of multipliers, connected to said selectors, for multiplying output values of said selectors by one set of a set of predetermined high frequency filtering coefficients and a set of predetermined low frequency filtering coefficients; and an adder, connected to said multipliers, for summing output signals of said multipliers.

38. A wavelet transform apparatus as set forth in claim 34, wherein said second convolution calculating circuit comprises:

a plurality of first selectors, connected to said series of second delay units, for transferring the outputs of said series of second delay units by one location;

a plurality of multipliers, connected to said series of first selectors, for multiplying values of said series of first selectors by predetermined high frequency filtering coefficients and predetermined low frequency filtering coefficients, selectively;

an adder, connected to said multipliers, for summing the output signals of said multipliers to alternately output a set of the vertical high horizontal high frequency component signal and the vertical high horizontal low frequency component signal and a set of the vertical low horizontal high frequency component signal and the vertical low horizontal low frequency component signal at its terminal; and a selector, connected to said adder for switchably outputting a set of the vertical high horizontal high frequency component signal, the vertical high horizontal low frequency component signal and the vertical low horizontal high frequency component signal, and the vertical low horizontal low frequency component signal at two output terminals of the selector.

39. A wavelet transform apparatus as set forth in claim 38, wherein said second convolution calculating circuit comprises:

a plurality of first selectors, connected to said series of second delay units, for reversing a sequence of the outputs of sad series of second delay units;

a plurality of multipliers, connected to said first selectors, for multiplying output values of said first selectors by one set of a plurality of sets of predetermined high frequency filtering coefficients and a set of predetermined low frequency filtering coefficients;

an adder, connected to said multipliers, for summing and subtracting output signals of said multipliers, selectively, to alternately output a set of the vertical high horizontal high frequency component signal and the vertical high horizonal low frequency component signal and a set of the vertical low horizontal high frequency component signal and the vertical low horizontal low frequency component signal at an output terminal of said adder; and a selector, connected to said adder for switchably outputting a set of the vertical high horizontal high frequency component signal, the vertical high horizontal low frequency component signal and the vertical low horizontal high frequency component signal, and the vertical low horizontal low frequency component signal at two output terminals of said selector.

40. A wavelet transform apparatus for a two-dimensional input signal having a vertical size of X and a horizontal size of Y, comprising:

a first two-band analysis filter circuit including a series of M first delay units each having a size of X for receiving the input signal clocked at a frequency $f_s$, and a first convolution calculating circuit clocked at the frequency $f_s$, connected to said series of first delay units, for performing convolutions upon outputs thereof with predetermined high frequency filtering coefficients and low frequency filtering coefficients to alternately generate a vertical high frequency component signal and a vertical low frequency component signal;

a second two-band analysis filter circuit including a series of M second delay Units each having a size of 1 for receiving the vertical high frequency component signal and the vertical low frequency component signal from said first two-band analysis filter circuit clocked at the frequency $f_s$, and a second convolution calculating circuit clocked at the frequency $f_s$, connected to said series of second delay units, for performing convolutions upon outputs thereof with the predetermined high frequency filtering coefficients and the low frequency filtering coefficients to alternately generate a horizontal high vertical high frequency component signal, a horizontal low vertical high frequency component signal, a horizontal high vertical low frequency component signal and a horizontal low vertical low frequency component signal, the horizontal high vertical high frequency component signal, the horizontal low vertical high frequency component signal, and the horizontal high vertical low frequency component signal being output from said apparatus, a third two-band analysis filter circuit including: a series of M third delay units each having a size of X/2 clocked at a frequency $f_s/4$; a series of M fourth delay units each having a size of 1 clocked at the frequency $f_s/4$; a series of M fifth delay units each having a size of X/4 clocked at the frequency $f_s/8$; a series of M sixth delay units each having a size of 1 clocked at the frequency $f_s/8$; a plurality of M first selectors, connected to said series of third to sixth M delay units, and clocked at the frequency $f_s$; a third convolution calculating circuit, connected to said M first selectors and clocked at the frequency $f_s$, for performing convolutions upon outputs of a selected series of third to sixth delay units with the predetermined high frequency filtering coefficients and the predetermined low frequency filtering coefficients to alternately generate a horizontal high vertical high frequency component signal, a horizontal low vertical high frequency component signal, a horizontal high vertical low frequency component signal, and a horizontal low vertical low frequency component signal, the horizontal high vertical high frequency component signal, the horizontal low vertical high frequency component signal, and the horizontal high vertical low frequency component signal being output from said apparatus; and a second selector, connected to said third convolution circuit, for transmitting the vertical low frequency component signals based upon the outputs of said series of third and fifth delay units to said series of fourth and sixth delay units, respectively, and transmitting the horizontal low vertical low frequency component signals based upon the outputs said series of fourth delay units to said series of fifth delay units.

41. A wavelet transform apparatus as set forth in claim 40, wherein said series of first delay units include means for smoothing the stream of the signals therethrough.

42. A wavelet transform apparatus for a two-dimensional input signal having a horizontal size of X and a vertical size of Y, comprising:

a first two-band analysis filter circuit including a series of M first delay units each having a size of X for receiving the input signal clocked at a frequency $f_S$, and a first convolution calculating circuit clocked at the frequency $f_S$, connected to said series of first delay units, for performing convolutions upon outputs thereof with predetermined high frequency filtering coefficients and low frequency filtering coefficients to alternately generate a horizontal high frequency component signal and a horizontal low frequency component signal;

a second two-band analysis filter circuit including a series of M second delay units each having a size of 1 for receiving the horizontal high frequency component signal and the horizontal low frequency component signal from said first two-band analysis filter circuit clocked at the frequency $f_S$, and a second convolution calculating circuit clocked at the frequency $f_S$, connected to said series of second delay units, for performing convolutions upon outputs thereof with the predetermined high frequency filtering coefficients and the low frequency filtering coefficients to alternately generate a vertical high horizontal high frequency component signal, a vertical low horizontal high frequency component signal, a vertical high horizontal low frequency component signal and a vertical low horizontal low frequency component signal, the vertical high horizontal high frequency component signal, the vertical low horizontal high frequency component signal, and the vertical high horizontal low frequency component signal being output from said apparatus, a third two-band analysis filter circuit including: a series of M third delay units each having a size of X/2 clocked at a frequency $f_S/4$; a series of M fourth delay units each having a size of 1 clocked at the frequency $f_S/4$; a series of M fifth delay units each having a size of X/4 clocked at the frequency $f_S/8$; a series of M sixth delay units each having a size of 1 clocked at the frequency $f_S/8$; a plurality of M first selectors, connected to said series of third to sixth M delay units, and clocked at the frequency $f_S$; a third convolution calculating circuit, connected to said M first selectors and clocked at the frequency $f_S$, for performing convolutions upon outputs of a selected series of third to sixth delay units with the predetermined high frequency filtering coefficients and the predetermined low frequency filtering coefficients to alternately generate a vertical high horizontal high frequency component signal, a vertical low horizontal high frequency component signal, a vertical high horizontal low frequency component signal, and a vertical low horizontal low frequency component signal, the vertical high horizontal high frequency component signal, the vertical low horizontal high frequency component signal, and the vertical high horizontal low frequency component signal being output from said apparatus; and a second selector, connected to said third convolution circuit, for transmitting the horizontal low frequency component signals based upon the outputs of said series of third and fifth delay units to said series of fourth and sixth delay units, respectively, and transmitting the vertical low horizontal low frequency component signals based upon the outputs said series of fourth delay units to said series of fifth delay units.

43. A wavelet transform apparatus as set forth in claim 42, wherein said series of third and fifth delay units include means for smoothing the stream of the signals therethrough.

44. A wavelet transform apparatus for a two-dimensional input signal having a vertical size of X and a horizontal size of Y, comprising:

a first two-band analysis filter circuit including: a series of M first delay units each having a size of X for receiving the input signal clock at a frequency $f_S$; a series of M second delay units each having a size of 1 for receiving a vertical high frequency component signal and a vertical low frequency component signal clocked at the frequency $f_S$; a plurality of M first selectors, connected to said series of first and second delay units and, clocked at a frequency $2f_S$; and a first convolution calculating circuit, connected to said series of second delay units and clocked at the frequency $2f_S$, for performing convolutions upon outputs of a selected series of first and second delay units with predetermined high frequency filtering coefficients and low frequency filtering coefficients to alternately generate a horizontal high vertical high frequency component signal, a horizontal low vertical high frequency component signal, a horizontal high vertical low frequency component signal and a horizontal low vertical low frequency component signal, the horizontal high vertical high frequency component signal, the horizontal low vertical high frequency component signal and the horizontal high vertical low frequency component signal being output from said apparatus, a second two-band analysis filter circuit including: a series of M third delay units each having a size of X/2 clocked at a frequency $f_S/4$; a series of M fourth delay units each having a size of 1 clocked at the frequency $f_S/4$; a series of M fifth delay units each having a size of X/4 clocked at the frequency $f_S/8$; a series of M sixth delay units each having a size of 1 clocked at the frequency $f_S/8$; a plurality of M second selectors, connected to said series of third to sixth M delay units and clocked at the frequency $f_S$; a second convolution calculating circuit, connected to said M second selectors and clocked at the frequency $f_S$, for performing convolutions upon outputs of a selected series of third to sixth delay units with the predetermined high frequency filtering coefficients and the predetermined low frequency filtering coefficients to alternately generate a horizontal high vertical high frequency component signal, a horizontal low vertical high frequency component signal, a horizontal high vertical low frequency component signal and a horizontal low vertical low frequency component signal, the horizontal high vertical high frequency component signal, the horizontal low vertical high frequency component signal and the horizontal high vertical low frequency component signal being output from said apparatus; and a third selector, connected to said second convolution circuit, for transmitting the vertical low frequency component signals based upon the outputs of said series of third and fifth delay units to said series of fourth and sixth delay units, respectively, and transmitting the horizontal low vertical low frequency component signals based upon the outputs said series of fourth delay units to said series of fifth delay units.

45. A wavelet transform apparatus as set forth in claim 44, wherein said series of third and fifth delay units include means for smoothing the stream of the signals therethrough.

46. A wavelet transform apparatus for a two-dimensional input signal having a horizontal size of X and a vertical size of Y, comprising:

a first two-band analysis filter circuit including: a series of M first delay units each having a size of X for receiving the input signal clock at a frequency $f_S$; a series of M second delay units each having a size of 1 for receiving a horizontal high frequency component signal and a horizontal low frequency component signal clocked at the frequency $f_S$; a plurality of M first selectors, connected to said series of first and second delay units and, clocked at a frequency $2f_S$; and a first convolution calculating circuit, connected to said series of second delay units and clocked at the frequency $2f_S$, for performing convolutions upon outputs of a selected series of first and second delay units with predetermined high frequency filtering coefficients and low frequency filtering coefficients to alternately generate a vertical high horizontal high frequency component signal, a vertical low horizontal high frequency component signal, a vertical high horizontal low frequency component signal and a vertical low horizontal low frequency component signal, the vertical high horizontal high frequency component signal, the vertical low horizontal high frequency component signal and the vertical high horizontal low frequency component signal being output from said apparatus, a second two-band analysis filter circuit including: a series of M third delay units each having a size of X/2 clocked at a frequency $f_S/4$; a series of M fourth delay units each having a size of 1 clocked at the frequency $f_S/4$; a series of M fifth delay units each having a size of X/4 clocked at the frequency $f_S/8$; a series of M sixth delay units each having a size of 1 clocked at the frequency $f_S/8$; a plurality of M second selectors, connected to said series of third to sixth M delay units and clocked at the frequency $f_S$; a second convolution calculating circuit, connected to said M second selectors and clocked at the frequency $f_S$, for performing convolutions upon outputs of a selected series of third to sixth delay units with the predetermined high frequency filtering coefficients and the predetermined low frequency filtering coefficients to alternately generate a vertical high horizontal high frequency component signal, a vertical low horizontal high frequency component signal, a vertical high horizontal low frequency component signal and a vertical low horizontal low frequency component signal, the vertical high horizontal high frequency component signal, the vertical low horizontal high frequency component signal and the vertical high horizontal low frequency component signal being output from said apparatus; and a third selector, connected to said second convolution circuit, for transmitting the horizontal low frequency component signals based upon the outputs of said series of third and fifth delay units to said series of fourth and sixth delay units, respectively, and transmitting the vertical low horizontal low frequency component signals based upon the outputs said series of fourth delay units to said series of fifth delay units.

47. A wavelet transform apparatus as set forth in claim 46, wherein said series of third and fifth delay units include means for smoothing the stream of the signals therethrough.

48. A wavelet transform apparatus for s two-dimensional input signal having a vertical size of X and a horizontal size of Y, comprising a single two-band analysis filter circuit including:

a series of M first delay units each having a size of X for receiving the input signal clock at a frequency $f_S$;

a series of M second delay units each having a size of 1 clocked at the frequency $f_S$;

a series of M third delay units each having a size of X/2 clocked at a frequency $f_S/4$;

a series of M fourth delay units each having a size of 1 clocked at the frequency $f_S/4$;

a series of M fifth delay units each having a size of X/4 clocked at a frequency $f_S/8$;

a series of M sixth delay units each having a size of 1 clocked at the frequency $f_S/8$;

a plurality of M first selectors, connected to said series of first to sixth delay units, clocked at the frequency $3f_S$;

a single convolution calculating circuit, connected to said M first selectors and clocked at the frequency $3f_S$, for performing convolutions upon outputs of a selected series of first to sixth delay units with predetermined high frequency filtering coefficients and predetermined low frequency filtering coefficients to alternately generate a horizontal high vertical high frequency component signal, a horizontal low vertical high frequency component signal, a horizontal high vertical low frequency component signal and a horizontal low vertical low frequency component signal, the horizontal high vertical high frequency component signal, the horizontal low vertical high frequency component signal and the horizontal high vertical low frequency component signal being output from said apparatus; and a second selector clocked at the frequency $3f_S$, connected to said single convolution circuit, for transmitting the vertical low frequency component signals based upon the outputs of said series of first, third and fifth delay units to said series of fourth and sixth delay units, respectively, and transmitting the horizontal low vertical low frequency component signals based upon the outputs said series of second and fourth delay units to said series of third and fifth delay units, respectively.

49. A wavelet transform apparatus as set forth in claim 48, wherein said series of third and fifth delay units include means for smoothing the stream of the signals therethrough.

50. A wavelet transform apparatus for a two-dimensional input signal having a horizontal size of X and a vertical size of Y, comprising a single two-band analysis filter circuit including:

a series of M first delay units each having a size of X for receiving the input signal clock at a frequency $f_S$;

a series of M second delay units each having a size of 1 clocked at the frequency $f_S$;

a series of M third delay units each having a size of X/2 clocked at a frequency $f_S/4$;

a series of M fourth delay units each having a size of 1 clocked at the frequency $f_S/4$;

a series of M fifth delay units each having a size of X/4 clocked at a frequency $f_S/8$;

a series of M sixth delay units each having a size of 1 clocked at the frequency $f_s/8$;

a plurality of M first selectors, connected to said series of first to sixth delay units, clocked at the frequency $3f_s$;

a single convolution calculating circuit, connected to said M first selectors and clocked at the frequency $3f_s$, for performing convolutions upon outputs of a selected series of first to sixth delay units with predetermined high frequency filtering coefficients and predetermined low frequency filtering coefficients to alternately generate a vertical high horizontal high frequency component signal, a vertical low horizontal high frequency component signal, a vertical high horizontal low frequency component signal and a vertical low horizontal low frequency component signal, the vertical high horizontal high frequency component signal, the vertical low horizontal high frequency component signal and the vertical high horizontal low frequency component signal being output from said apparatus; and a second selector clocked at the frequency $3f_s$, connected to said single convolution circuit, for transmitting the horizontal low frequency component signals based upon the outputs of said series of first, third and fifth delay units to said series of fourth and sixth delay units, respectively, and transmitting the vertical low horizontal low frequency component signals based upon the outputs said series of second and fourth delay units to said series of third and fifth delay units, respectively.

51. A wavelet transform apparatus as set forth in claim 50, wherein said series of third and fifth delay units include means for smoothing the stream of the signals therethrough.

* * * * *